(12) United States Patent
Ma et al.

(10) Patent No.: US 11,889,576 B2
(45) Date of Patent: Jan. 30, 2024

(54) TECHNIQUES FOR RADIO LINK MANAGEMENT

(71) Applicant: QUALCOMM Incorporated, San Diego, CA (US)

(72) Inventors: Liangping Ma, San Diego, CA (US); Xiao Feng Wang, San Diego, CA (US); Alberto Rico Alvarino, San Diego, CA (US); Ayan Sengupta, San Diego, CA (US); Bharat Shrestha, San Diego, CA (US); Umesh Phuyal, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 17/399,865

(22) Filed: Aug. 11, 2021

(65) Prior Publication Data

US 2022/0053590 A1 Feb. 17, 2022

Related U.S. Application Data

(60) Provisional application No. 63/066,060, filed on Aug. 14, 2020, provisional application No. 63/066,056, filed on Aug. 14, 2020.

(51) Int. Cl.
*H04W 76/19* (2018.01)
*H04W 76/25* (2018.01)
(Continued)

(52) U.S. Cl.
CPC .......... *H04W 76/19* (2018.02); *H04W 24/04* (2013.01); *H04W 24/10* (2013.01);
(Continued)

(58) Field of Classification Search
CPC ..... H04W 76/19; H04W 76/25; H04W 24/04; H04W 24/10; H04W 72/044;
(Continued)

(56) References Cited

U.S. PATENT DOCUMENTS 10,979,128 B1 * 4/2021 Babaei ................ H04B 7/0695
2019/0104416 A1 * 4/2019 Yerramalli ........ H04W 74/0808
(Continued)

FOREIGN PATENT DOCUMENTS

EP 3697139 A1 * 8/2020 ........... H04B 17/318

OTHER PUBLICATIONS

International Search Report and Written Opinion—PCT/US2021/045649—ISA/EPO—dated Nov. 19, 2021 (207239WO).

*Primary Examiner* — Ian N Moore
*Assistant Examiner* — Latresa A McCallum
(74) *Attorney, Agent, or Firm* — Holland & Hart LLP

(57) ABSTRACT

Methods, systems, and devices for radio link management are described. In a first example, a user equipment (UE) and a base station may employ a procedure for configuring radio link monitoring reference signals (RLM-RS) for multiple bandwidth parts. In a second example, a UE and a base station may employ a beam failure recovery procedure. In a third example, a UE and a base station may employ one or more radio link failure detection procedures. In a fourth example, a UE and a base station may employ a procedure for establishing a new connection after radio link failure. In a fifth example, a UE and a base station may employ a monitoring procedure that involves a single RLM-RS across multiple bandwidth parts.

29 Claims, 25 Drawing Sheets

(51) Int. Cl.
  *H04W 24/10*   (2009.01)
  *H04W 72/044*  (2023.01)
  *H04W 24/04*   (2009.01)
  *H04W 74/08*   (2009.01)

(52) U.S. Cl.
  CPC ......... *H04W 72/044* (2013.01); *H04W 76/25* (2018.02); *H04W 74/0833* (2013.01)

(58) Field of Classification Search
  CPC ......... H04W 74/0833; H04W 36/0033; H04W 8/30; H04W 8/005; H04W 24/02; H04W 36/00; H04W 36/0083; H04W 36/0088; H04L 67/14; H04L 41/0654; H04B 1/74
  See application file for complete search history.

(56) References Cited

U.S. PATENT DOCUMENTS

| | | | |
|---|---|---|---|
| 2019/0159175 A1* | 5/2019 | Islam | H04W 76/10 |
| 2019/0166555 A1 | 5/2019 | Cheng et al. | |
| 2019/0253949 A1* | 8/2019 | Park | H04B 7/0695 |
| 2019/0297514 A1* | 9/2019 | Pao | H04W 36/06 |
| 2019/0306842 A1 | 10/2019 | Cirik et al. | |
| 2019/0357292 A1* | 11/2019 | Cirik | H04W 24/08 |
| 2020/0137821 A1* | 4/2020 | Cirik | H04W 76/19 |
| 2020/0145087 A1* | 5/2020 | Li | H04B 7/0408 |
| 2020/0260303 A1* | 8/2020 | Chen | H04W 24/02 |
| 2021/0328650 A1* | 10/2021 | Awad | H04B 7/088 |
| 2021/0410186 A1* | 12/2021 | Hajir | H04W 74/0816 |
| 2022/0150982 A1* | 5/2022 | Lee | H04W 74/0841 |

\* cited by examiner

TECHNIQUES FOR RADIO LINK MANAGEMENT

CROSS REFERENCE

The present Application for Patent claims the benefit of U.S. Provisional Patent Application No. 63/066,060 by MA et al., entitled "RADIO LINK MANAGEMENT," filed Aug. 14, 2020, and the benefit of U.S. Provisional Patent Application No. 63/066,056 by M A et al., entitled "TECHNIQUES FOR RADIO LINK MANAGEMENT," filed Aug. 14, 2020, each of which is assigned to the assignee hereof, and each of which is expressly incorporated by reference herein.

FIELD OF TECHNOLOGY

The following relates to wireless communications, including techniques for radio link management.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support non-terrestrial networks, which may provide broad coverage areas by using high-altitude vehicles (e.g., satellites or other non-terrestrial-based high-altitude equipments) between base stations and user terminals (e.g., UEs) or by having base stations onboard the high-altitude vehicles (e.g., satellites). Although use of high-altitude vehicles may provide benefits, such as larger coverage areas for wireless communications systems, due to the relative high speeds of some high-altitude vehicles (e.g., satellites) with certain orbits communications between user terminals and the high-altitude vehicles may be challenging.

SUMMARY

The described techniques relate to improved methods, systems, devices, and apparatuses that support techniques for radio link management. In a first example, a user equipment (UE) and a base station may employ a procedure for configuring radio link monitoring reference signals (RLM-RS) for multiple bandwidth parts. In a second example, a UE and a base station may employ a beam failure recovery procedure. In a third example, a UE and a base station may employ one or more radio link failure detection procedures. In a fourth example, a UE and a base station may employ a procedure for establishing a new connection after radio link failure. In a fifth example, a UE and a base station may employ a monitoring procedure that involves a single RLM-RS across multiple bandwidth parts.

A method for wireless communication at a UE is described. The method may include receiving, from a base station, a first message including a configuration of a first radio link monitoring reference signal for a first bandwidth part associated with a first beam, determining a second bandwidth part to monitor for radio link management in addition to the first bandwidth part, the second bandwidth part associated with a second beam, and determining a configuration of a second radio link monitoring reference signal for the second bandwidth part based on the configuration for the first radio link monitoring reference signal and a frequency offset associated with the second bandwidth part.

An apparatus for wireless communication at a UE is described. The apparatus may include a processor, memory in electronic communication with the processor, and instructions stored in the memory. The instructions may be executable by the processor to cause the apparatus to receive, from a base station, a first message including a configuration of a first radio link monitoring reference signal for a first bandwidth part associated with a first beam, determine a second bandwidth part to monitor for radio link management in addition to the first bandwidth part, the second bandwidth part associated with a second beam, and determine a configuration of a second radio link monitoring reference signal for the second bandwidth part based on the configuration for the first radio link monitoring reference signal and a frequency offset associated with the second bandwidth part.

Another apparatus for wireless communication at a UE is described. The apparatus may include means for receiving, from a base station, a first message including a configuration of a first radio link monitoring reference signal for a first bandwidth part associated with a first beam, means for determining a second bandwidth part to monitor for radio link management in addition to the first bandwidth part, the second bandwidth part associated with a second beam, and means for determining a configuration of a second radio link monitoring reference signal for the second bandwidth part based on the configuration for the first radio link monitoring reference signal and a frequency offset associated with the second bandwidth part.

A non-transitory computer-readable medium storing code for wireless communication at a UE is described. The code may include instructions executable by a processor to receive, from a base station, a first message including a configuration of a first radio link monitoring reference signal for a first bandwidth part associated with a first beam, determine a second bandwidth part to monitor for radio link management in addition to the first bandwidth part, the second bandwidth part associated with a second beam, and determine a configuration of a second radio link monitoring reference signal for the second bandwidth part based on the configuration for the first radio link monitoring reference signal and a frequency offset associated with the second bandwidth part.

Some examples of the method, apparatuses, and non-transitory computer-readable medium described herein may further include operations, features, means, or instructions for receiving an indication of the second bandwidth part from the base station, where the second bandwidth part may be determined based on the indication.

In some examples of the method, apparatuses, and non-transitory computer-readable medium described herein, the indication of the second bandwidth part includes an identifier for the second bandwidth part.

Some examples of the method, apparatuses, and non-transitory computer-readable medium described herein may further include operations, features, means, or instructions for determining that the UE may be within a threshold proximity of a coverage area of the second beam, where the second bandwidth part may be determined based on determining that the UE may be within the threshold proximity of the coverage area of the second beam.

Some examples of the method, apparatuses, and non-transitory computer-readable medium described herein may further include operations, features, means, or instructions for receiving an indication of the frequency offset from the base station.

Some examples of the method, apparatuses, and non-transitory computer-readable medium described herein may further include operations, features, means, or instructions for receiving a configuration for the second bandwidth part from the base station, where the configuration includes the indication of the frequency offset.

Some examples of the method, apparatuses, and non-transitory computer-readable medium described herein may further include operations, features, means, or instructions for determining a frequency difference between the first bandwidth part and the second bandwidth part, where the frequency offset may be determined based on the frequency difference.

Some examples of the method, apparatuses, and non-transitory computer-readable medium described herein may further include operations, features, means, or instructions for receiving from the base station an indication of a type of radio link monitoring reference signal for the first bandwidth part, and determining that the type of radio link monitoring reference signal for the first bandwidth part applies to the second radio link monitoring reference signal for the second bandwidth part.

A method for wireless communication at a base station is described. The method may include transmitting, to a UE, a first message including a first configuration of a radio link monitoring reference signal for a first bandwidth part associated with a first beam, determining a second bandwidth part the UE is to monitor, in addition to the first bandwidth part, for radio link management, the second bandwidth part associated with a second beam, transmitting, to the UE, a second message including an identifier for the second bandwidth part the UE is to monitor, and transmitting a first radio link reference signal with the first configuration over the first beam and a second radio link reference signal with a second configuration over the second beam, where the first configuration and the second configuration are the same except for a frequency offset.

An apparatus for wireless communication at a base station is described. The apparatus may include a processor, memory in electronic communication with the processor, and instructions stored in the memory. The instructions may be executable by the processor to cause the apparatus to transmit, to a UE, a first message including a first configuration of a radio link monitoring reference signal for a first bandwidth part associated with a first beam, determine a second bandwidth part the UE is to monitor, in addition to the first bandwidth part, for radio link management, the second bandwidth part associated with a second beam, transmit, to the UE, a second message including an identifier for the second bandwidth part the UE is to monitor, and transmit a first radio link reference signal with the first configuration over the first beam and a second radio link reference signal with a second configuration over the second beam, where the first configuration and the second configuration are the same except for a frequency offset.

Another apparatus for wireless communication at a base station is described. The apparatus may include means for transmitting, to a UE, a first message including a first configuration of a radio link monitoring reference signal for a first bandwidth part associated with a first beam, means for determining a second bandwidth part the UE is to monitor, in addition to the first bandwidth part, for radio link management, the second bandwidth part associated with a second beam, means for transmitting, to the UE, a second message including an identifier for the second bandwidth part the UE is to monitor, and means for transmitting a first radio link reference signal with the first configuration over the first beam and a second radio link reference signal with a second configuration over the second beam, where the first configuration and the second configuration are the same except for a frequency offset.

A non-transitory computer-readable medium storing code for wireless communication at a base station is described. The code may include instructions executable by a processor to transmit, to a UE, a first message including a first configuration of a radio link monitoring reference signal for a first bandwidth part associated with a first beam, determine a second bandwidth part the UE is to monitor, in addition to the first bandwidth part, for radio link management, the second bandwidth part associated with a second beam, transmit, to the UE, a second message including an identifier for the second bandwidth part the UE is to monitor, and transmit a first radio link reference signal with the first configuration over the first beam and a second radio link reference signal with a second configuration over the second beam, where the first configuration and the second configuration are the same except for a frequency offset.

Some examples of the method, apparatuses, and non-transitory computer-readable medium described herein may further include operations, features, means, or instructions for determining that the UE may be within a threshold proximity of a coverage area of the second beam, where the second bandwidth part may be determined based on determining that the UE may be within the threshold proximity of the coverage area of the second beam.

Some examples of the method, apparatuses, and non-transitory computer-readable medium described herein may further include operations, features, means, or instructions for transmitting an indication of the frequency offset to the UE.

Some examples of the method, apparatuses, and non-transitory computer-readable medium described herein may further include operations, features, means, or instructions for transmitting a configuration for the second bandwidth part to the UE, where the configuration includes the indication of the frequency offset.

Some examples of the method, apparatuses, and non-transitory computer-readable medium described herein may further include operations, features, means, or instructions for determining a frequency difference between the first bandwidth part and the second bandwidth part, where the frequency offset may be determined based on the frequency difference.

Some examples of the method, apparatuses, and non-transitory computer-readable medium described herein may further include operations, features, means, or instructions for transmitting an indication of a type of radio link monitoring reference signal for the first bandwidth part, where the type applies to the first radio link reference signal and the second radio link reference signal.

A method for wireless communication at a UE is described. The method may include receiving an indication of a type of beam failure recovery procedure, determining a set of bandwidth parts to monitor based on the type of beam failure recovery procedure, the set of bandwidth parts including a bandwidth part associated with a failed beam between the UE and a base station, determining, based on monitoring the set of bandwidth parts, a subset of bandwidth parts from the set of bandwidth parts for the beam failure recovery procedure, and attempting, as part of the beam failure recovery procedure, a random access procedure over a bandwidth part of the subset of bandwidth parts.

An apparatus for wireless communication at a UE is described. The apparatus may include a processor, memory in electronic communication with the processor, and instructions stored in the memory. The instructions may be executable by the processor to cause the apparatus to receive an indication of a type of beam failure recovery procedure, determine a set of bandwidth parts to monitor based on the type of beam failure recovery procedure, the set of bandwidth parts including a bandwidth part associated with a failed beam between the UE and a base station, determine, based on monitoring the set of bandwidth parts, a subset of bandwidth parts from the set of bandwidth parts for the beam failure recovery procedure, and attempt, as part of the beam failure recovery procedure, a random access procedure over a bandwidth part of the subset of bandwidth parts.

Another apparatus for wireless communication at a UE is described. The apparatus may include means for receiving an indication of a type of beam failure recovery procedure, means for determining a set of bandwidth parts to monitor based on the type of beam failure recovery procedure, the set of bandwidth parts including a bandwidth part associated with a failed beam between the UE and a base station, means for determining, based on monitoring the set of bandwidth parts, a subset of bandwidth parts from the set of bandwidth parts for the beam failure recovery procedure, and means for attempting, as part of the beam failure recovery procedure, a random access procedure over a bandwidth part of the subset of bandwidth parts.

A non-transitory computer-readable medium storing code for wireless communication at a UE is described. The code may include instructions executable by a processor to receive an indication of a type of beam failure recovery procedure, determine a set of bandwidth parts to monitor based on the type of beam failure recovery procedure, the set of bandwidth parts including a bandwidth part associated with a failed beam between the UE and a base station, determine, based on monitoring the set of bandwidth parts, a subset of bandwidth parts from the set of bandwidth parts for the beam failure recovery procedure, and attempt, as part of the beam failure recovery procedure, a random access procedure over a bandwidth part of the subset of bandwidth parts.

Some examples of the method, apparatuses, and non-transitory computer-readable medium described herein may further include operations, features, means, or instructions for determining a quality of each radio link monitoring reference signal associated with the set of bandwidth parts, and comparing the quality of each radio link monitoring reference signal with a threshold quality, where the subset of bandwidth parts may be determined based on each bandwidth part in the subset of bandwidth parts being associated with at least one radio link reference signal that satisfies the threshold quality.

In some examples of the method, apparatuses, and non-transitory computer-readable medium described herein, each bandwidth part in the set of bandwidth parts may be associated with multiple respective radio link monitoring reference signals, the method further including determining, for each bandwidth part in the set of bandwidth parts, a unique physical random access channel (PRACH) sequence for each radio link monitoring reference signal associated with that bandwidth part.

In some examples of the method, apparatuses, and non-transitory computer-readable medium described herein, attempting the random access procedure may include operations, features, means, or instructions for transmitting a message including a PRACH sequence for a radio link monitoring reference signal of the bandwidth part that satisfies a threshold quality.

Some examples of the method, apparatuses, and non-transitory computer-readable medium described herein may further include operations, features, means, or instructions for determining that the random access procedure may have failed, and attempting, as part of the beam failure recovery procedure and based on determining that the random access procedure may have failed, a second random access procedure over the bandwidth part using a second transmit power higher than the first transmit power.

Some examples of the method, apparatuses, and non-transitory computer-readable medium described herein may further include operations, features, means, or instructions for determining that the random access procedure may have failed, and attempting, as part of the beam failure recovery procedure and based on determining that the random access procedure may have failed, a second random access procedure over a second bandwidth part of the subset of bandwidth parts.

Some examples of the method, apparatuses, and non-transitory computer-readable medium described herein may further include operations, features, means, or instructions for starting a beam failure recovery timer based on attempting the beam failure recovery procedure, determining that the beam failure recovery timer may have expired, and determining that the beam failure recovery procedure may have failed based on expiry of the beam failure recovery timer.

Some examples of the method, apparatuses, and non-transitory computer-readable medium described herein may further include operations, features, means, or instructions for starting a beam failure recovery timer based on attempting the beam failure recovery procedure, determining that the random access procedure may have been successfully completed, and stopping and resetting the beam failure recovery timer based on determining that the random access procedure may have been successfully completed.

Some examples of the method, apparatuses, and non-transitory computer-readable medium described herein may further include operations, features, means, or instructions for receiving from the base station an indication of the set of bandwidth parts, where the set of bandwidth parts may be determined based on the indication.

Some examples of the method, apparatuses, and non-transitory computer-readable medium described herein may further include operations, features, means, or instructions for determining the set of bandwidth parts based on location of the UE relative to coverage areas of beams associated with the set of bandwidth parts.

A method for wireless communication at a base station is described. The method may include transmitting to a UE an indication of a type of beam failure recovery procedure, transmitting to the UE an indication of a set of bandwidth parts the UE is to monitor as part of the beam failure recovery procedure, the set of bandwidth parts including a bandwidth part associated with an active beam between the UE and the base station, receiving a random access message from the UE over a bandwidth part in the set of bandwidth parts, and establishing a connection with the UE over the bandwidth part based on a random access procedure triggered by the random access message.

An apparatus for wireless communication at a base station is described. The apparatus may include a processor, memory in electronic communication with the processor, and instructions stored in the memory. The instructions may be executable by the processor to cause the apparatus to transmit to a UE an indication of a type of beam failure recovery procedure, transmit to the UE an indication of a set of bandwidth parts the UE is to monitor as part of the beam failure recovery procedure, the set of bandwidth parts including a bandwidth part associated with an active beam between the UE and the base station, receive a random access message from the UE over a bandwidth part in the set of bandwidth parts, and establish a connection with the UE over the bandwidth part based on a random access procedure triggered by the random access message.

Another apparatus for wireless communication at a base station is described. The apparatus may include means for transmitting to a UE an indication of a type of beam failure recovery procedure, means for transmitting to the UE an indication of a set of bandwidth parts the UE is to monitor as part of the beam failure recovery procedure, the set of bandwidth parts including a bandwidth part associated with an active beam between the UE and the base station, means for receiving a random access message from the UE over a bandwidth part in the set of bandwidth parts, and means for establishing a connection with the UE over the bandwidth part based on a random access procedure triggered by the random access message.

A non-transitory computer-readable medium storing code for wireless communication at a base station is described. The code may include instructions executable by a processor to transmit to a UE an indication of a type of beam failure recovery procedure, transmit to the UE an indication of a set of bandwidth parts the UE is to monitor as part of the beam failure recovery procedure, the set of bandwidth parts including a bandwidth part associated with an active beam between the UE and the base station, receive a random access message from the UE over a bandwidth part in the set of bandwidth parts, and establish a connection with the UE over the bandwidth part based on a random access procedure triggered by the random access message.

Some examples of the method, apparatuses, and non-transitory computer-readable medium described herein may further include operations, features, means, or instructions for determining the set of bandwidth parts based on location of the UE relative to coverage areas of beams associated with the set of bandwidth parts.

In some examples of the method, apparatuses, and non-transitory computer-readable medium described herein, each bandwidth part in the set of bandwidth parts may be associated with multiple respective radio link monitoring reference signals, further including transmitting the multiple radio link monitoring reference signals associated with each bandwidth part over that bandwidth part.

Some examples of the method, apparatuses, and non-transitory computer-readable medium described herein may further include operations, features, means, or instructions for determining a unique physical random access channel (PRACH) sequence for each of the multiple radio link monitoring reference signals associated with the bandwidth part, where the random access message includes a PRACH sequence for one of the radio link monitoring reference signals associated with the bandwidth part, and determining a beam selected by the UE based on a PRACH sequence included in the random access message and the bandwidth part over which the random access may be received.

A method for wireless communication at a UE is described. The method may include detecting that radio link failure has occurred for a first connection between the UE and a base station, saving configuration information for the first connection based on detecting the radio link failure, communicating to the base station an indication that the configuration information for the first connection has been saved, and establishing a second connection with the base station based on the saved configuration information for the first connection and communicating the indication.

An apparatus for wireless communication at a UE is described. The apparatus may include a processor, memory in electronic communication with the processor, and instructions stored in the memory. The instructions may be executable by the processor to cause the apparatus to detect that radio link failure has occurred for a first connection between the UE and a base station, save configuration information for the first connection based on detecting the radio link failure, communicate to the base station an indication that the configuration information for the first connection has been saved, and establish a second connection with the base station based on the saved configuration information for the first connection and communicating the indication.

Another apparatus for wireless communication at a UE is described. The apparatus may include means for detecting that radio link failure has occurred for a first connection between the UE and a base station, means for saving configuration information for the first connection based on detecting the radio link failure, means for communicating to the base station an indication that the configuration information for the first connection has been saved, and means for establishing a second connection with the base station based on the saved configuration information for the first connection and communicating the indication.

A non-transitory computer-readable medium storing code for wireless communication at a UE is described. The code may include instructions executable by a processor to detect that radio link failure has occurred for a first connection between the UE and a base station, save configuration information for the first connection based on detecting the radio link failure, communicate to the base station an indication that the configuration information for the first connection has been saved, and establish a second connection with the base station based on the saved configuration information for the first connection and communicating the indication.

Some examples of the method, apparatuses, and non-transitory computer-readable medium described herein may further include operations, features, means, or instructions for performing a random access procedure with the base station, where the indication may be communicated during the random access procedure.

Some examples of the method, apparatuses, and non-transitory computer-readable medium described herein may further include operations, features, means, or instructions for transmitting an identifier of the UE to the base station as part of the random access procedure, where the identifier includes an identifier the UE used to establish the first connection.

Some examples of the method, apparatuses, and non-transitory computer-readable medium described herein may further include operations, features, means, or instructions for transmitting to the base station as part of the random access procedure a message requesting RRC information, where the indication may be included in the message.

In some examples of the method, apparatuses, and non-transitory computer-readable medium described herein, the indication includes a bit.

In some examples of the method, apparatuses, and non-transitory computer-readable medium described herein, the indication further includes an identifier of the base station or an identifier of a cell associated with the base station.

In some examples of the method, apparatuses, and non-transitory computer-readable medium described herein, the configuration information includes a radio bearer configuration, a radio bearer state variable, a medium access control (MAC) configuration, a MAC state variable, a master cell group secondary cell configuration, or a cell configuration, or a combination thereof.

A method for wireless communication at a base station is described. The method may include receiving, from a UE during a random access procedure, an indication that the UE has saved configuration information for a previous connection between the UE and the base station, determining the configuration information for the previous connection based on the indication and an identifier of the UE, and establishing a second connection with the UE based on the configuration for the previous connection.

An apparatus for wireless communication at a base station is described. The apparatus may include a processor, memory in electronic communication with the processor, and instructions stored in the memory. The instructions may be executable by the processor to cause the apparatus to receive, from a UE during a random access procedure, an indication that the UE has saved configuration information for a previous connection between the UE and the base station, determine the configuration information for the previous connection based on the indication and an identifier of the UE, and establish a second connection with the UE based on the configuration for the previous connection.

Another apparatus for wireless communication at a base station is described. The apparatus may include means for receiving, from a UE during a random access procedure, an indication that the UE has saved configuration information for a previous connection between the UE and the base station, means for determining the configuration information for the previous connection based on the indication and an identifier of the UE, and means for establishing a second connection with the UE based on the configuration for the previous connection.

A non-transitory computer-readable medium storing code for wireless communication at a base station is described. The code may include instructions executable by a processor to receive, from a UE during a random access procedure, an indication that the UE has saved configuration information for a previous connection between the UE and the base station, determine the configuration information for the previous connection based on the indication and an identifier of the UE, and establish a second connection with the UE based on the configuration for the previous connection.

Some examples of the method, apparatuses, and non-transitory computer-readable medium described herein may further include operations, features, means, or instructions for receiving the identifier of the UE during the random access procedure, where the identifier includes an identifier the UE used to establish the previous connection, and determining the configuration information for the UE based on the configuration information being associated with the identifier of the UE.

Some examples of the method, apparatuses, and non-transitory computer-readable medium described herein may further include operations, features, means, or instructions for receiving from the UE a message, where the indication may be included in the message.

In some examples of the method, apparatuses, and non-transitory computer-readable medium described herein, the indication may be a bit.

In some examples of the method, apparatuses, and non-transitory computer-readable medium described herein, the indication further may include operations, features, means, or instructions for determining the configuration information for the UE based on the configuration information being associated with the identifier of base station or the identifier of the cell associated with the base station.

In some examples of the method, apparatuses, and non-transitory computer-readable medium described herein, the configuration information includes a radio bearer configuration, a radio bearer state variable, a MAC configuration, a MAC state variable, a master cell group secondary cell configuration, or a cell configuration, or a combination thereof.

A method for wireless communication at a UE is described. The method may include determining that a radio link monitoring reference signal for a set of bandwidth parts includes multiple signals, monitoring the set of bandwidth parts for the radio link monitoring reference signal, measuring a quality of each signal of the multiple signals of the radio link monitoring reference signal, and determining a radio link failure status for a base station based on the qualities of the multiple signals of the radio link monitoring reference signal.

An apparatus for wireless communication at a UE is described. The apparatus may include a processor, memory in electronic communication with the processor, and instructions stored in the memory. The instructions may be executable by the processor to cause the apparatus to determine that a radio link monitoring reference signal for a set of bandwidth parts includes multiple signals, monitor the set of bandwidth parts for the radio link monitoring reference signal, measure a quality of each signal of the multiple signals of the radio link monitoring reference signal, and determine a radio link failure status for a base station based on the qualities of the multiple signals of the radio link monitoring reference signal.

Another apparatus for wireless communication at a UE is described. The apparatus may include means for determining that a radio link monitoring reference signal for a set of bandwidth parts includes multiple signals, means for monitoring the set of bandwidth parts for the radio link monitoring reference signal, means for measuring a quality of each signal of the multiple signals of the radio link monitoring reference signal, and means for determining a radio link failure status for a base station based on the qualities of the multiple signals of the radio link monitoring reference signal.

A non-transitory computer-readable medium storing code for wireless communication at a UE is described. The code may include instructions executable by a processor to determine that a radio link monitoring reference signal for a set of bandwidth parts includes multiple signals, monitor the set of bandwidth parts for the radio link monitoring reference signal, measure a quality of each signal of the multiple signals of the radio link monitoring reference signal, and determine a radio link failure status for a base station based on the qualities of the multiple signals of the radio link monitoring reference signal.

Some examples of the method, apparatuses, and non-transitory computer-readable medium described herein may further include operations, features, means, or instructions for managing a radio link failure timer for the set of bandwidth parts, where the radio link failure status for the base station may be determined based on a status of the radio link failure timer.

In some examples of the method, apparatuses, and non-transitory computer-readable medium described herein, managing the radio link failure timer may include operations, features, means, or instructions for starting the radio link failure timer when a threshold quantity of the multiple signals may have a quality lower than a threshold quality.

In some examples of the method, apparatuses, and non-transitory computer-readable medium described herein, managing the radio link failure timer may include operations, features, means, or instructions for stopping and resetting the radio link failure timer when a threshold quantity of the multiple signals may have a quality higher than a threshold quality.

Some examples of the method, apparatuses, and non-transitory computer-readable medium described herein may further include operations, features, means, or instructions for receiving from the base station an indication of the set of bandwidth parts, where the set of bandwidth parts may be determined based on the indication.

Some examples of the method, apparatuses, and non-transitory computer-readable medium described herein may further include operations, features, means, or instructions for determining the set of bandwidth parts based on a location of the UE relative to coverage areas of beams associated with the set of bandwidth parts.

A method for wireless communication at a base station is described. The method may include determining a set of bandwidth parts for a UE to monitor for radio link management, transmitting an indication of the set of bandwidth parts to the UE, and transmitting a radio link monitoring reference signal for the set of bandwidth parts, the radio link monitoring reference signal including multiple signals.

An apparatus for wireless communication at a base station is described. The apparatus may include a processor, memory in electronic communication with the processor, and instructions stored in the memory. The instructions may be executable by the processor to cause the apparatus to determine a set of bandwidth parts for a UE to monitor for radio link management, transmit an indication of the set of bandwidth parts to the UE, and transmit a radio link monitoring reference signal for the set of bandwidth parts, the radio link monitoring reference signal including multiple signals.

Another apparatus for wireless communication at a base station is described. The apparatus may include means for determining a set of bandwidth parts for a UE to monitor for radio link management, means for transmitting an indication of the set of bandwidth parts to the UE, and means for transmitting a radio link monitoring reference signal for the set of bandwidth parts, the radio link monitoring reference signal including multiple signals.

A non-transitory computer-readable medium storing code for wireless communication at a base station is described. The code may include instructions executable by a processor to determine a set of bandwidth parts for a UE to monitor for radio link management, transmit an indication of the set of bandwidth parts to the UE, and transmit a radio link monitoring reference signal for the set of bandwidth parts, the radio link monitoring reference signal including multiple signals.

Some examples of the method, apparatuses, and non-transitory computer-readable medium described herein may further include operations, features, means, or instructions for multiplexing the multiple signals in the time domain or the frequency domain before transmitting the radio link monitoring reference signal.

In some examples of the method, apparatuses, and non-transitory computer-readable medium described herein, the multiple signals include one or more synchronization signal block (SSB) signals, one or more CSI reference signals (CSI-RS), or a combination thereof.

In some examples of the method, apparatuses, and non-transitory computer-readable medium described herein, each bandwidth part in the set of bandwidth parts may be associated with a respective beam having a respective coverage area, the method further including determining that the UE may be within a threshold proximity of the coverage areas associated with the set of bandwidth parts, where the set of bandwidth parts may be determined based on determining that the UE may be within the threshold proximity.

Some examples of the method, apparatuses, and non-transitory computer-readable medium described herein may further include operations, features, means, or instructions for determining a speed of the UE, a trajectory of the UE, or a combination thereof, where the set of bandwidth parts may be determined based on the speed of the UE, the trajectory of the UE, or the combination thereof.

A method of wireless communication at a UE is described. The method may include receiving from a base station an indication of a type of radio link failure detection procedure, monitoring a set of bandwidth parts based on the indicated type of radio link failure detection procedure, the set of bandwidth parts including a bandwidth part associated with an active beam between the UE and the base station, and determining a radio link failure status based on monitoring the set of bandwidth parts.

An apparatus for wireless communication at a UE is described. The apparatus may include a processor, memory coupled with the processor, and instructions stored in the memory. The instructions may be executable by the processor to cause the apparatus to receive from a base station an indication of a type of radio link failure detection procedure, monitor a set of bandwidth parts based on the indicated type of radio link failure detection procedure, the set of bandwidth parts including a bandwidth part associated with an active beam between the UE and the base station, and determine a radio link failure status based on monitoring the set of bandwidth parts.

Another apparatus for wireless communication at a UE is described. The apparatus may include means for receiving from a base station an indication of a type of radio link failure detection procedure, monitoring a set of bandwidth parts based on the indicated type of radio link failure detection procedure, the set of bandwidth parts including a bandwidth part associated with an active beam between the UE and the base station, and determining a radio link failure status based on monitoring the set of bandwidth parts.

A non-transitory computer-readable medium storing code for wireless communication at a UE is described. The code may include instructions executable by a processor to receive from a base station an indication of a type of radio link failure detection procedure, monitor a set of bandwidth parts based on the indicated type of radio link failure detection procedure, the set of bandwidth parts including a bandwidth part associated with an active beam between the UE and the base station, and determine a radio link failure status based on monitoring the set of bandwidth parts.

In some examples of the method, apparatuses, and non-transitory computer-readable medium described herein, the set of bandwidth parts may include operations, features, means, or instructions for attempting a beam failure recovery procedure over one or more bandwidth parts in the set of bandwidth parts based on detecting that the active beam may have failed, where the radio link failure status may be determined based on a status of the beam failure recovery procedure.

Some examples of the method, apparatuses, and non-transitory computer-readable medium described herein may further include operations, features, means, or instructions for determining a pool of bandwidth parts, where each bandwidth part in the pool of bandwidth parts may be associated with multiple respective radio link monitoring reference signals, measuring the radio link monitoring reference signals associated with the pool of bandwidth parts, and determining the set of bandwidth parts based on the measuring, where the set of bandwidth parts may be a subset of the pool of bandwidth parts.

Some examples of the method, apparatuses, and non-transitory computer-readable medium described herein may further include operations, features, means, or instructions for receiving from the base station an indication of the pool of bandwidth parts, where the pool of bandwidth parts may be determined based on the indication.

Some examples of the method, apparatuses, and non-transitory computer-readable medium described herein may further include operations, features, means, or instructions for determining the pool of bandwidth parts based on a location of the UE relative to coverage areas of beams associated with the pool of bandwidth parts.

Some examples of the method, apparatuses, and non-transitory computer-readable medium described herein may further include operations, features, means, or instructions for starting a radio link failure timer based on attempting the beam failure recovery procedure, and stopping the radio link failure timer based on the beam failure recovery procedure being successful.

Some examples of the method, apparatuses, and non-transitory computer-readable medium described herein may further include operations, features, means, or instructions for starting a radio link failure timer based on attempting the beam failure recovery procedure, and determining that the beam failure recovery procedure may have failed, where radio link failure may be determined based on the radio link failure timer expiring due to the failure of the beam failure recovery procedure.

In some examples of the method, apparatuses, and non-transitory computer-readable medium described herein, attempting the beam failure recovery procedure may include operations, features, means, or instructions for attempting a random access procedure with the base station over the one or more bandwidth parts in the set of bandwidth parts, where the UE increases a transmit power used for sequential attempted random access procedures over a bandwidth part until a maximum transmit power may be reached, a random access procedure may be completed, or a beam failure recovery timer expires.

In some examples of the method, apparatuses, and non-transitory computer-readable medium described herein, attempting the beam failure recovery procedure may include operations, features, means, or instructions for determining that a random access procedure attempted with the maximum transmit power over the bandwidth part may have failed, and attempting to complete a random access procedure with the base station over a second bandwidth part of the set of bandwidth parts, where the UE increases a transmit power used for sequential attempted random access procedures over the second bandwidth part until the maximum transmit power may be reached, a random access procedure may be completed, or the beam failure recovery timer expires.

Some examples of the method, apparatuses, and non-transitory computer-readable medium described herein may further include operations, features, means, or instructions for determining, based on the monitoring, a failure status for each bandwidth part in the set of bandwidth parts, where the radio link failure status may be determined based on the failure statuses for the set of bandwidth parts.

In some examples of the method, apparatuses, and non-transitory computer-readable medium described herein, determining the failure status for each bandwidth part may include operations, features, means, or instructions for determining that each bandwidth part may have failed, and where determining the radio link failure status includes, and determining that radio link failure may have occurred.

Some examples of the method, apparatuses, and non-transitory computer-readable medium described herein may further include operations, features, means, or instructions for managing a respective failure timer for each bandwidth part in the set of bandwidth parts based on indications for that bandwidth part communicated from a physical layer of the UE to a RRC layer of the UE, where the failure status for a bandwidth part may be determined based on a status of the failure timer for that bandwidth part.

In some examples of the method, apparatuses, and non-transitory computer-readable medium described herein, each bandwidth part in the set of bandwidth parts may be associated with multiple respective radio link monitoring reference signals, and where managing a failure timer for a bandwidth part may include operations, features, means, or instructions for starting the failure timer based on the RRC layer receiving a threshold quantity of out-of-sync indications for the bandwidth part, where an out-of-sync indication may be transmitted by the physical layer when all of the radio link monitoring reference signals associated with the bandwidth part may have a quality lower than a threshold quality.

In some examples of the method, apparatuses, and non-transitory computer-readable medium described herein, each bandwidth part in the set of bandwidth parts may be associated with multiple respective radio link monitoring reference signals, and where managing a failure timer for a bandwidth part may include operations, features, means, or instructions for stopping and resetting the failure timer based on the RRC layer receiving a threshold quantity of in-sync indications for the bandwidth part, where an in-sync indication may be transmitted by the physical layer when at least one radio link monitoring reference signal associated with the bandwidth part may have a quality higher than a threshold quality.

Some examples of the method, apparatuses, and non-transitory computer-readable medium described herein may further include operations, features, means, or instructions for completing a random access procedure with the base station over the bandwidth part, where the in-sync indication for the bandwidth part may be transmitted by the physical layer based on completing the random access procedure over the bandwidth part.

Some examples of the method, apparatuses, and non-transitory computer-readable medium described herein may further include operations, features, means, or instructions for receiving from the base station an indication of the set of bandwidth parts, where the set of bandwidth parts may be determined based on the indication.

Some examples of the method, apparatuses, and non-transitory computer-readable medium described herein may further include operations, features, means, or instructions for determining the set of bandwidth parts based on a location of the UE relative to coverage areas of beams associated with the set of bandwidth parts.

Some examples of the method, apparatuses, and non-transitory computer-readable medium described herein may further include operations, features, means, or instructions for managing, based on the monitoring, a common radio link failure timer for the set of bandwidth parts, where the radio link failure status may be determined based on a status of the radio link failure timer for the set of bandwidth parts.

Some examples of the method, apparatuses, and non-transitory computer-readable medium described herein may further include operations, features, means, or instructions for determining a quality of each radio link monitoring reference signal associated with the set of bandwidth parts, where the radio link failure timer may be managed based on the qualities of the radio link monitoring reference signals associated with the set of bandwidth parts.

In some examples of the method, apparatuses, and non-transitory computer-readable medium described herein, each bandwidth part in the set of bandwidth parts may be associated with multiple respective radio link monitoring reference signals, and where managing the radio link failure timer may include operations, features, means, or instructions for starting the radio link failure timer based on a RRC layer of the UE receiving a threshold quantity of out-of-sync indications for the set of bandwidth parts, where an out-of-sync indication may be transmitted by a physical layer of the UE when all of the radio link monitoring reference signals associated with the set of bandwidth parts may have a quality lower than a threshold quality.

In some examples of the method, apparatuses, and non-transitory computer-readable medium described herein, each bandwidth part in the set of bandwidth parts may be associated with multiple respective radio link monitoring reference signals, and where managing the radio link failure timer may include operations, features, means, or instructions for stopping and resetting the radio link failure timer based on a RRC layer of the UE receiving a threshold quantity of in-sync indications for the set of bandwidth parts, where an in-sync indication may be transmitted by a physical layer of the UE when at least one radio link monitoring reference signal associated with the set of bandwidth parts may have a quality higher than a threshold quality.

Some examples of the method, apparatuses, and non-transitory computer-readable medium described herein may further include operations, features, means, or instructions for completing a random access procedure with the base station over the bandwidth part, where the in-sync indication for the set of bandwidth parts may be transmitted by the physical layer based on completing the random access procedure over the bandwidth part.

Some examples of the method, apparatuses, and non-transitory computer-readable medium described herein may further include operations, features, means, or instructions for receiving from the base station an indication of the set of bandwidth parts, where the set of bandwidth parts may be determined based on the indication.

Some examples of the method, apparatuses, and non-transitory computer-readable medium described herein may further include operations, features, means, or instructions for determining the set of bandwidth parts based on location of the UE relative to coverage areas of beams associated with the set of bandwidth parts.

DETAILED DESCRIPTION

Figure 1:
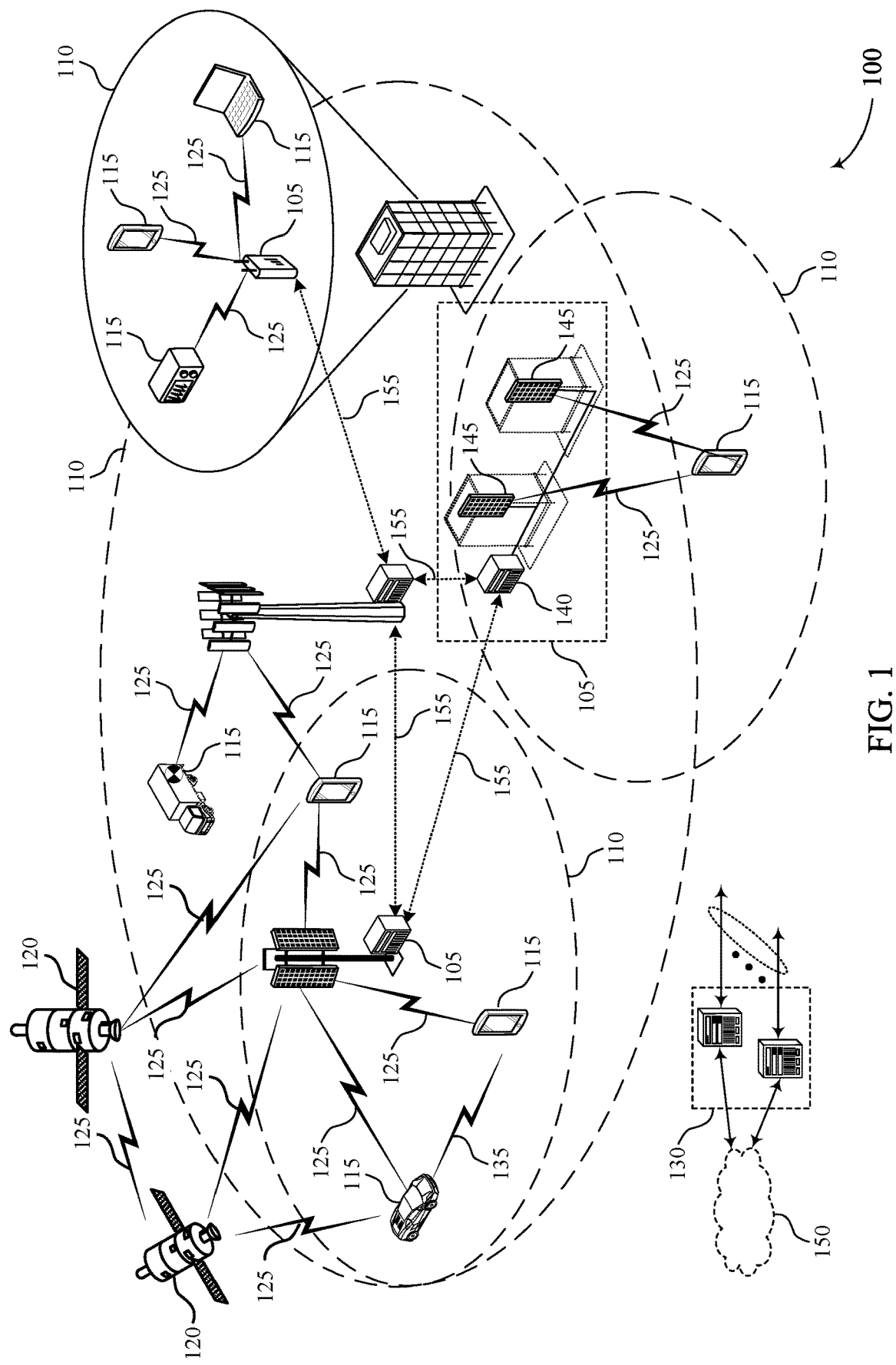
FIG. 1 illustrates an example of a system for wireless communications that supports techniques for radio link management in accordance with aspects of the present disclosure.

Non-terrestrial networks (sometimes referred to as NTNs) may provide coverage by using high-altitude vehicles between user terminals and base stations (e.g., next-generation NodeBs or giga-NodeBs (either of which may be referred to as a gNB)) (also referred to as access stations or access gateways)). A base station may, for example, transmit to a satellite data which may then be relayed to a user terminal or vice-versa. A high-altitude vehicle itself may be a base station, in some examples. A user terminal may be any device capable of transmitting signals to a satellite. Examples of a user terminal may include a user equipment (UE), a relay equipment configured to relay a signal between a satellite and a user terminal, or a combination thereof.

A satellite may use multiple satellite beams (also referred herein to as beams) to provide coverage to user terminals on the ground. For example, the satellite may use different transmission beams to communicate with user terminals in different locations on the ground. Although the transmission beams may be fixed relative to the satellite, the footprints (e.g., coverage areas) of the beams may move with respect to a user terminal due to the movement of the satellite. Even in the 'fixed-beam' case, where a satellite steers a beam toward a fixed location on the ground, the shape of the beam may keep changing and the beam may eventually move when the elevation angle becomes lower than some threshold angle. To maintain connectivity with the satellite, a user terminal may switch beams (i.e., communicate with the satellite on a first beam of the satellite at a first time and on a second beam of the satellite at a second time) as the user terminal enters different coverage areas (e.g., footprints) of the satellite. The user terminal may use various radio link management procedures to facilitate beam switching. However, such procedures may not be optimized for various aspects of a non-terrestrial, or similar, communications environment. For example, the radio link management procedures may be inadequate for communication scenarios in which a UE frequently changes transmission beams, and thus may result in reduced system performance.

To improve system performance, a user terminal and base station (e.g., a satellite base station or other type of base station) may implement one or more of the radio link management procedures described herein, which may be tailored to a non-terrestrial, or similar, communications environment. In a first example, the user terminal and the base station may employ a procedure for efficiently configuring radio link monitoring reference signals (RLM-RS) for multiple bandwidth parts. In a second example, the user terminal and the base station may employ a beam failure recovery procedure that increases the likelihood of recovering from beam failure. In a third example, the user terminal and the base station may employ one or more radio link failure detection procedures that reduce the likelihood of declaring radio link failure. In a fourth example, the user terminal and the base station may employ a procedure for efficiently establishing a new connection after radio link failure. In a fifth example, the user terminal and the base station may employ a monitoring procedure that involves a single RLM-RS across multiple bandwidth parts, which may reduce signaling complexity.

Aspects of the disclosure are initially described in the context of a wireless communications system. Aspects of the disclosure are further described in the context of an additional wireless communications system and process flows. Aspects of the disclosure are further illustrated by and described with reference to apparatus diagrams, system diagrams, and flowcharts that relate to various aspects of radio link management.

FIG. 1 illustrates an example of a wireless communications system 100 that supports beam measurement reporting for a non-terrestrial network in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 155 (e.g., via an S1, N2, N3, or other interface). The base stations 105 may communicate with one another over the backhaul links 155 (e.g., via an X2, Xn, or other interface) either directly (e.g., directly between base stations 105), or indirectly (e.g., via core network 130), or both. In some examples, the backhaul links 155 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). A bandwidth part may refer to a frequency range or set of contiguous frequencies. Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may also include one or more satellites 120 (e.g., in a non-terrestrial network (NTN) configuration), which may communicate with base stations 105 or the core network 130 via gateways (e.g., ground-based terminals, NTN gateways). Satellites 120 may also communicate with UEs 115, which may include other high altitude or terrestrial communications devices. In various examples, a satellite 120 itself may be an example of a base station 105 (e.g., supporting a gNB processed payload), or a satellite 120 may provide a relay of signals between a base station 105 and UEs 115 (e.g., in a transparent satellite configuration, where a satellite 120 and a gateway may be configured together as a remote radio unit). A satellite 120 may be any suitable type of communication satellite configured to relay or otherwise support communications between different devices in the wireless communications system 100. A satellite 120 may be an example of a space satellite, a balloon, a dirigible, an airplane, a drone, an unmanned aerial vehicle, or other vehicle which may support communications from a generally non-terrestrial, overhead, or elevated position. In some examples, a satellite 120 may be in a geosynchronous or geostationary earth orbit, a low earth orbit, or a medium earth orbit. A satellite 120 may be a multi-beam satellite configured to provide service for multiple service beam coverage areas in a configured geographical service area. The satellite 120 may be any distance away from the surface of the earth or other reference surface.

In some examples, a cell may be provided or established by a satellite 120 as part of a non-terrestrial network. A satellite 120 may, in some cases, perform the functions of a base station 105, act as a bent-pipe satellite, or act as a regenerative satellite, or a combination thereof. In some examples, a satellite 120 may be an example of a smart satellite, or a satellite with intelligence or other communications processing capability. For example, a smart satellite may be configured to perform more functions than a regenerative satellite (e.g., may be configured to perform particular algorithms beyond those used in regenerative satellites, to be reprogrammed). In a bent-pipe transponder configuration, a satellite 120 may be configured to receive signals from ground stations (e.g., gateways, base stations 105, a core network 130) and transmit those signals to different ground stations or terminals (e.g., UEs 115, base stations 105). In some cases, a satellite 120 supporting a bent-pipe transponder configuration may amplify signals or shift from uplink frequencies to downlink frequencies. In some examples, a satellite 120 supporting a regenerative transponder configuration may relay signals like a bent-pipe transponder configuration but may also use onboard processing to perform other functions. Examples of these other functions may include demodulating a received signal, decoding a received signal, re-encoding a signal to be transmitted, or modulating the signal to be transmitted, or a combination thereof. In some examples, a satellite 120 supporting a bent pipe transponder configuration or regenerative transponder configuration may receive a signal from a base station 105 and may relay the signal to a UE 115 or base station 105, or vice-versa.

In some examples, a satellite 120 may use multiple transmission beams and multiple bandwidth parts to serve devices on the ground, such as base stations 105 and UEs 115. The transmission beams may have respective coverage areas that are arranged to allow the satellite 120 to provide service to a wide area. However, the movement of the satellite 120 relative to the ground may cause a UE 115 to frequently change transmission beams as the UE 115 enters new coverage areas. To facilitate changing to a new transmission beam, the UE 115 and the satellite 120 may implement one or more of the radio link management techniques described herein. These radio link management techniques may provide distinct advantages relative to other radio link management techniques, particularly in communication environments, such as a non-terrestrial environment, in which a user terminal frequently switches transmission beams.

As a first example, consider a satellite 120 that is to configure multiple radio link monitoring reference signals (RLM-RS) for multiple bandwidth parts. To do so, the satellite 120 may individually configure the RLM-RS for each bandwidth part by sending the configuration for each RLM-RS to a UE 115. But sending the configuration for each RLM-RS may increase signaling overhead. According to the techniques described herein and with reference to FIG. 3, a satellite 120 may avoid sending the configuration information for each RLM-RS by re-using the same configuration (except, e.g., for a frequency offset) for multiple RLM-RS. This way, the satellite 120 can send the configuration for a single RLM-RS and a UE 115 may apply that configuration (e.g., with a frequency offset) to other RLM-RS, thereby eliminating the need to signal a respective configuration for each individual RLM-RS.

As a second example, consider a beam failure recovery procedure in which a UE 115 only monitors the RLM-RS of the active bandwidth part (e.g., a bandwidth part over which the UE 115 and a satellite 120 have a connection). Although such a technique may be satisfactory in certain communication environments, limiting RLM-RS monitoring to the RLM-RS of the active bandwidth part may prevent a UE 115 from using other available bandwidth parts to save a connection. According to the techniques described herein and with reference to FIG. 4, a UE 115 may determine a set of multiple bandwidth parts to monitor as part of a beam failure recovery procedure. The set of bandwidth parts may include the active bandwidth parts as well as one or more bandwidth parts with high quality RLM-RS, which may increase the likelihood that the UE 115 recovers from beam failure.

As a third example, consider a UE 115 in a non-terrestrial network (or network with similar characteristics, such as frequent beam switching) that uses a radio link failure detection procedure designed for terrestrial networks. In such a scenario, the UE 115 may prematurely or inappropriately declare radio link failure because the criteria for declaring radio link failure are more suited for a communication environment in which beam switching occurs infrequently. According to the techniques described herein and with reference to FIGS. 5-7, a UE 115 may employ one or more radio link failure detection procedures that are based on criteria conducive to frequent beam switching and that reduce the likelihood of declaring radio link failure.

As a fourth example, consider a scenario in which a UE 115 and a satellite 120 establish a new connection after an old connection is lost (e.g., due to radio link failure). To establish the new connection, the UE 115 and the satellite 120 may exchange control signaling to configure the new connection from scratch. But exchanging control signaling to configure a new connection from scratch may increase overhead, latency, and consume excess resources. According to the techniques described herein and with reference to FIG. 8, a UE 115 may save configuration information for a lost connection and instruct a satellite 120 to use that configuration information (also saved at the satellite 120) for a new connection. Thus, the UE 115 and satellite 120 may avoid exchanging control signaling to configure a new connection, which may reduce overhead, latency, and conserve resources.

As a fifth example, consider a scenario in which a satellite 120 transmits multiple RLM-RS per bandwidth part monitored by a UE 115. If the UE 115 monitors multiple bandwidth parts, such a technique may become complex and cumbersome. According to the techniques described herein and with reference to FIG. 9, a satellite 120 may construct a single RLM-RS for multiple bandwidth parts by multiplexing multiple reference signals. Thus, the satellite 120 may transmit, and the UE 115 may monitor for, a single RLM-RS that applies to multiple bandwidth parts, which may reduce signaling complexity and burden.

Although described separately in some instances, it should be appreciated that the radio link management techniques described herein may be used together. Additionally, the radio link management techniques described herein may be implemented by types of base stations other than non-terrestrial base stations, such as terrestrial base stations. Accordingly, it follows that the radio link management techniques described herein may be implemented in networks other than non-terrestrial networks. Although described with reference to UEs 115, the techniques described herein may be used for any type of user terminal, such as relay equipment.

Figure 2:
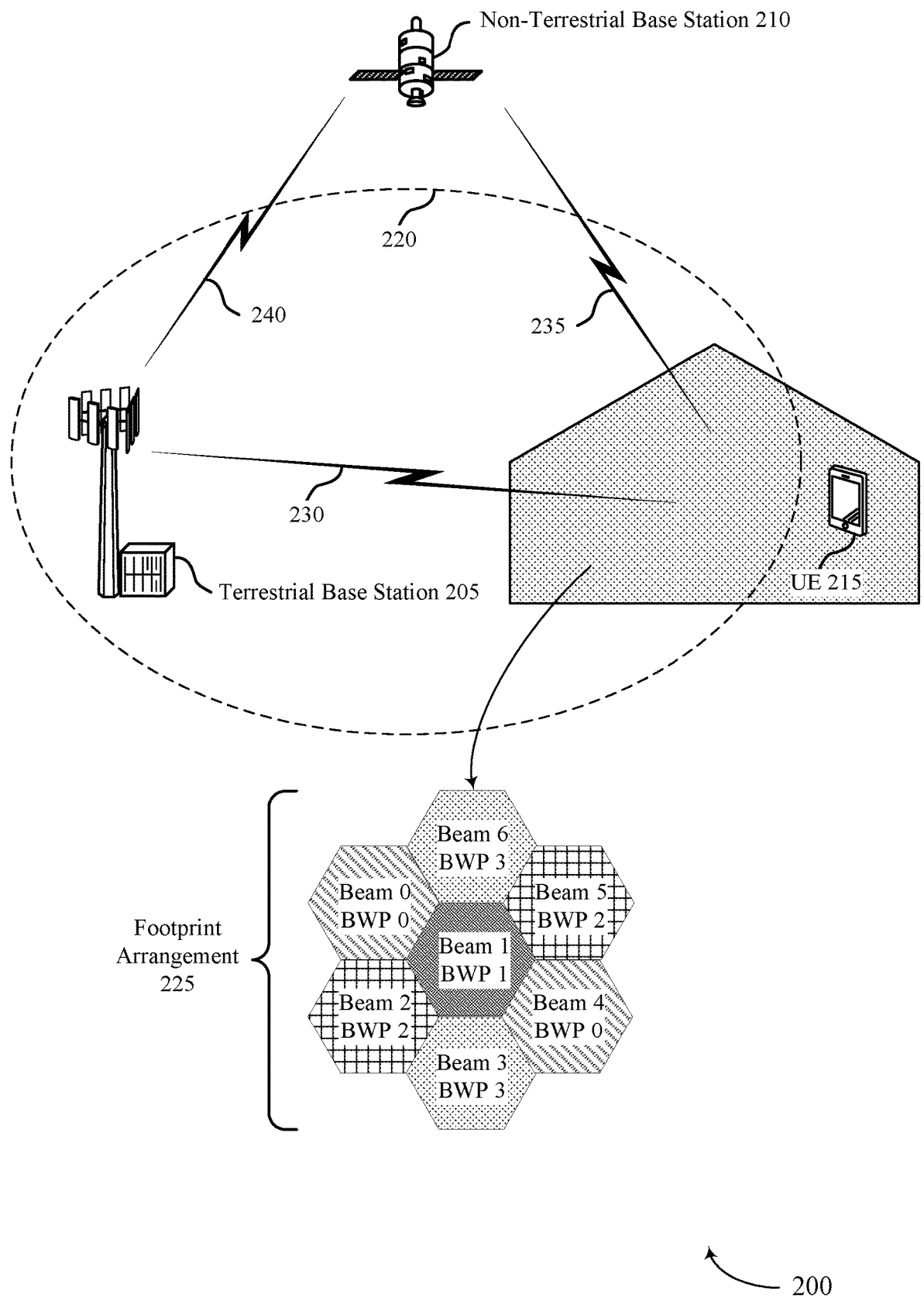
FIG. 2 illustrates an example of a wireless communications system that supports techniques for radio link management in accordance with aspects of the present disclosure.

FIG. 2 illustrates an example of a wireless communications system 200 that supports radio link management in accordance with one or more aspects of the present disclosure. In some examples, the wireless communications system 200 may implement aspects of the wireless communications system 100. For example, the wireless communications system 200 may include a terrestrial base station 205 a, a non-terrestrial base station 210, and a UE 215, which may be examples of a base station 105, a satellite 120, and a UE 115, as described with reference to FIG. 1. Although described with reference to a UE and non-terrestrial base station operating in a non-terrestrial network, the radio link management techniques described herein may be implemented by a UE and terrestrial base station operating in a terrestrial network.

The terrestrial base station 205 may provide direct coverage to wireless devices within the coverage area 220 and may provide indirect coverage to wireless devices outside of the coverage area 220 with assistance of or through the non-terrestrial base station 210. Thus, the terrestrial base station 205 may communicate directly with the non-terrestrial base station 210 over communication link 240 and communicate directly with the UE 215 over communication link 230. In some examples, the terrestrial base station 205 may not have its own coverage area 220 and may instead act as a gateway for the non-terrestrial base station 210, which may function as a base station (e.g., perform scheduling, radio link control, etc.)). For instance, the terrestrial base station 205 may communicate with the non-terrestrial base station 210 exclusively without directly communicating with any ground user terminals, such as, for example the UE 215.

In some examples (e.g., when the UE 215 is outside the coverage area 220), the non-terrestrial base station 210 may relay communications between the terrestrial base station 205 and the UE 215, thereby extending the coverage of the terrestrial base station 205. For example, the non-terrestrial base station 210 may relay communications from the terrestrial base station to the UE 215 over communication link 235 (or vice-versa using the communication link 240). Additionally or alternative, the non-terrestrial base station 210 may communicate with the UE 215 independently of the terrestrial base station 205.

In some examples, the non-terrestrial base station 210 may provide wireless communications coverage over a large geographical area by using multiple transmission beams. For example, the non-terrestrial base station 210 may use different transmission beams to serve (e.g., provide connectivity to) different geographical areas. As an illustration, the non-terrestrial base station 210 may use seven transmission beams (denoted Beam 0 through Beam 6) to serve seven respective geographical areas (illustrated as hexagons). The area served by a particular transmission beam may be referred to as the footprint or coverage area of that transmission beam. In the depicted example, UE 215 may be in the coverage area of transmission beam 6 and thus may receive communications from the non-terrestrial base station 210 over transmission beam 6. Collectively, the footprints may be referred to as a footprint arrangement 225.

Some or all of the transmission beams employed by the non-terrestrial base station 210 may be assigned a respective bandwidth part for data communications so that interference between transmission beams (which may be used simultaneously) is reduced. For example, transmission beam 0 and transmission beam 4 may be assigned bandwidth part 0, transmission beam 1 may be assigned bandwidth part 1, transmission beam 2 and transmission beam 5 may be assigned bandwidth part 2, and transmission beam 3 and transmission beam 6 may be assigned bandwidth part 3. As illustrated, the same bandwidth part may be assigned to multiple transmission beams—provided that the transmission beam footprints are appropriately spaced to reduce interference—so that the spectral efficiency of the wireless communications system 200 is increased. For example, bandwidth part 0 may be assigned to transmission beam 0 and transmission beam 4 because these transmission beams have non-adjacent footprints. For ease of illustration, transmission beams with a shared bandwidth part are shown with similar shading patterns. It should be appreciated that the beams associated with the footprint arrangement 225 may be beams from the same cell or beams from two or more different cells.

Although the footprint arrangement 225 is fixed relative to the non-terrestrial base station 210, the location of the footprint arrangement 225 may move with respect to a user terminal due to the mobile nature of the non-terrestrial base station 210. Thus, a transmission beam (e.g., transmission beam 6) that initially provides robust service to UE 215 may deteriorate (e.g., weaken) over time as the footprint of the transmission beam moves. To establish and maintain connectivity between the UE 215 and the non-terrestrial base station 210, the UE 215 and the non-terrestrial base station 210 may implement one or more of the radio link management techniques described herein.

The radio link management techniques described herein may involve radio link monitoring reference signals (RLM-RS), which may be signals with properties and characteristics that allow the UE 215 to determine the downlink quality of a transmission beam. For example, an RLM-RS may be a synchronization signal block (SSB) signal or a CSI-RS, among other signals. The non-terrestrial base station 210 may assign multiple RLM-RS to each bandwidth part associated with footprint arrangement 225 and may transmit the RLM-RS over the assigned bandwidth parts to assist with radio link management at the UE 215.

In some examples, the radio link management techniques described herein may involve intra-device communications between layers of a protocol stack of the UE 215. For example, the UE 215 may send indications between the physical layer (PHY) of the UE 215, the medium access control (MAC) layer of the UE 215, and the RRC layer of the UE 315, among other layers. The indications between layers may assist with or be part of a beam failure detection procedure, a beam failure recovery procedure, and/or a radio link failure detection procedure, among other procedures. For example, the indications may be used to manage one or more timers at the UE 215, which may in turn be used to detect various types of failure, such as beam failure, beam failure recovery failure, and radio link failure.

As an example, consider a radio link failure detection procedure that involves a radio link failure ("RLF") timer, the expiry of which triggers the UE 215 to declare radio link failure. According to the techniques described herein, the UE 215 may manage the RLF timer based on indications communicated from the PHY layer to the RRC layer. For example, the UE 215 may start the RLF timer based on a quantity of consecutive out-of-sync indications transmitted from the PHY layer to the RRC layer. And the UE 215 may stop and/or reset the RLF timer based on a quantity of consecutive in-sync indications transmitted from the PHY layer to the RRC layer. Out-of-sync indications and in-sync indications may be different control signals that are generated and transmitted by the PHY layer in response to different conditions. As described herein and with reference to FIGS. 5-7 and 9, the basis for generating and transmitting an out-of-sync indication or an in-sync indication may vary with the type of procedure implemented by the UE 215.

Figure 3:
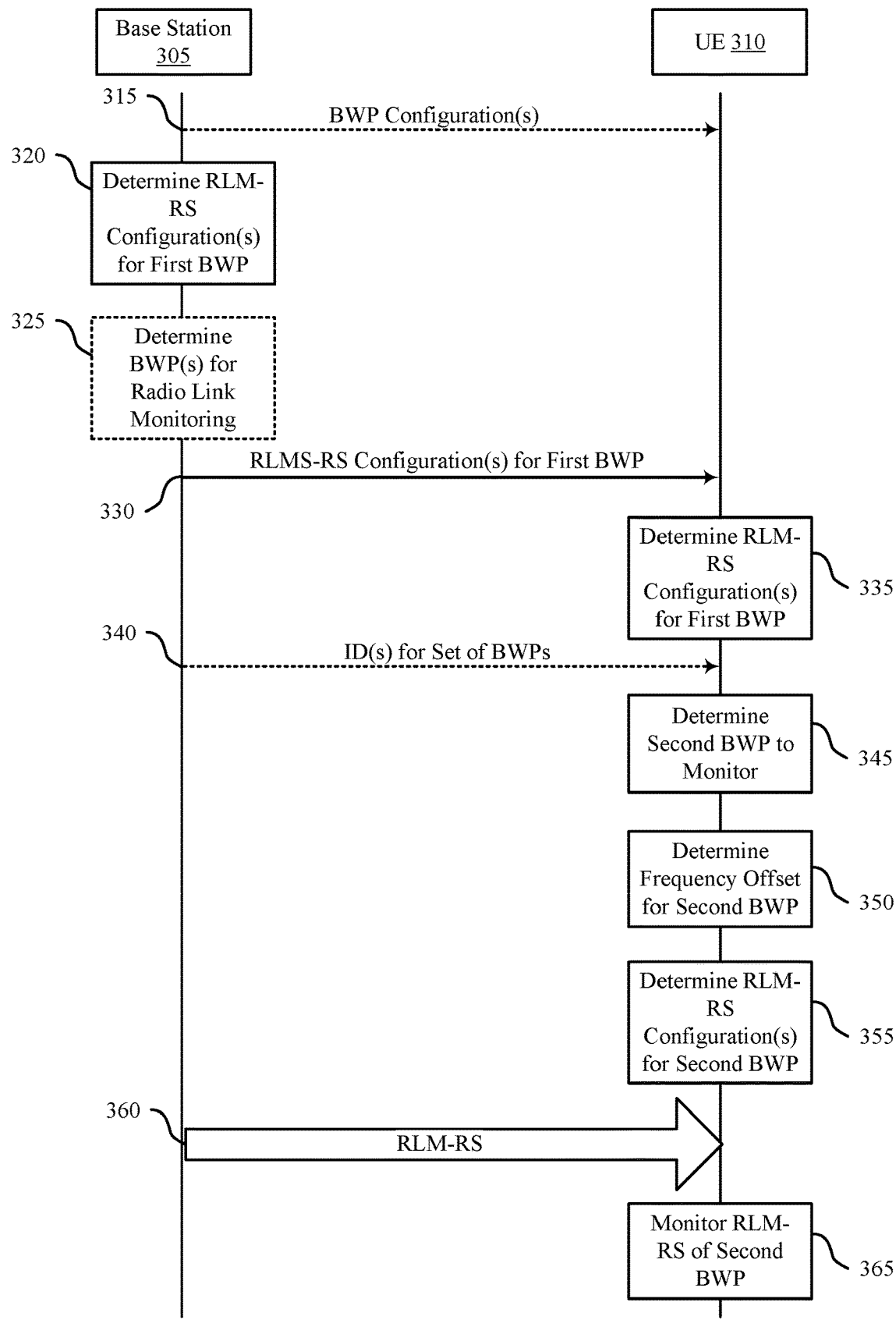
FIG. 3 illustrates an example of a process flow that supports techniques for radio link management in accordance with aspects of the present disclosure.

FIG. 3 illustrates an example of a process flow 300 that supports radio link management in accordance with one or more aspects of the present disclosure. In some examples, process flow 300 may implement aspects of wireless communications system 100 or 200. For example, process flow 300 may be implemented by a base station 305 and a UE 310, which may be examples of a terrestrial base station, a non-terrestrial base station, or a UE as described herein. Process flow 300 may be an example of an RLM-RS configuration procedure for multiple bandwidth parts that reduces signaling overhead relative to other RLM-RS configuration procedures.

Alternative examples of the following may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

At 315, the base station 305 may transmit one or more bandwidth part configurations to the UE 310. A bandwidth part configuration may indicate, among other parameters, a frequency range for the bandwidth part, an identifier for the bandwidth part, and/or a frequency offset (or frequency "shift") for the bandwidth part. At 320, the base station 305 may determine one or more RLM-RS configurations for a first bandwidth part. The first bandwidth part may be an active bandwidth part, which may refer to a bandwidth part over which the base station 305 and the UE 310 have a connection. An RLM-RS configuration may include reference signal identifier, a resource mapping, a power control offset, a scrambling identifier, a periodicity, a timing offset, and/or a frequency offset, among other parameters.

At 325, the base station 305 may determine a set of bandwidth parts to be monitored by the UE 310 for radio link management. The set of bandwidth parts may include the first bandwidth part (e.g., the active bandwidth part) and at least a second bandwidth part. The base station 305 may determine the set of bandwidth parts based on, for example, the location of the UE 310 relative to footprints of beams associated with the bandwidth parts, among other metrics. At 330, the base station 305 may transmit an indication of the one or more RLM-RS configurations for the first bandwidth part. In some examples, the base station 305 may also transmit an indication of the type of RLM-RS (e.g., SSB, CSI-RS), and that indication may apply to some or all of the RLM-RS in the set of bandwidth parts. The indication of the type of RLM-RS may be transmitted in the same message as, or a different message than, the indication of the one or more RLM-RS configurations.

At 335, the UE 310 may determine the one or more RLM-RS configurations for the first bandwidth part based at least in part on the indication of the one or more RLM-RS configurations received at 330. At 340, the base station 305 may transmit, and the UE 310 may receive, an indication of the identifiers for the set of bandwidth parts the UE 310 is to monitor. For example, the base station 305 may transmit an identifier for the first bandwidth part and an identifier for a second bandwidth part. Although shown transmitted at 340, it should be appreciated that the identifiers of the bandwidth parts the UE 310 is to monitor may be transmitted elsewhere in process flow 300, such as at 330.

At 345, the UE 310 may determine the set of bandwidth parts the UE 310 is to monitor. For example, the UE 310 may determine that the UE 310 is to monitor the first bandwidth part and the second bandwidth part. The UE 310 may determine the set of bandwidth parts based on an explicit indication from the base station 305 (e.g., the indication of the identifiers at 340) or the UE 310 may determine the set of bandwidth parts autonomously (e.g., based on configured default bandwidth parts, configured default parameters, and/or the location of the UE 310 relative to beam footprints associated with the bandwidth parts, among other metrics).

At 350, the UE 310 may determine a frequency offset for the second bandwidth part. The UE 310 may determine the frequency offset based on the bandwidth part configuration information received at 315 or the UE 310 may determine the frequency offset based on a frequency difference between the first bandwidth part and the second bandwidth part. Alternatively, the frequency offset may be signaled to the UE 310 along with the bandwidth part identifiers at 340, or in another message altogether.

At 355, the UE 310 may determine one or more RLM-RS configurations for the set of bandwidth parts the UE 310 is to monitor. For example, the UE 310 may determine one or more RLM-RS configurations for the second bandwidth part. The UE 310 may determine the RLM-RS configuration(s) for the second bandwidth part based on the RLM-RS configuration(s) for the first bandwidth part. For example, the UE 310 may determine that other than a frequency offset, an RLM-RS configuration for the first bandwidth part is the same for the second bandwidth part. Thus, the RLM-RS configuration(s) for the second bandwidth part may be the same as the RLM-RS configuration(s) for the first bandwidth part, except for the frequency offset.

At 360, the base station 305 may transmit one or more RLM-RS over the set of bandwidth parts the UE 310 is to monitor. For example, the base station 305 may transmit a first RLM-RS with the configuration over the first bandwidth part. And the base station 305 may transmit a second RLM-RS with the same configuration (other than the frequency offset) over the second bandwidth part. At 365, the UE 310 may monitor for the RLM-RS over the set of bandwidth parts based on the configuration and frequency offset.

Thus, RLM-RS configurations for multiple bandwidth parts may be communicated without sending the full RLM-RS configuration for each bandwidth part. For example, rather than sending the complete RLM-RS configuration for the second bandwidth part, the base station 305 may transmit only the identifier of the second bandwidth part, which may reduce signaling overhead.

Figure 4:
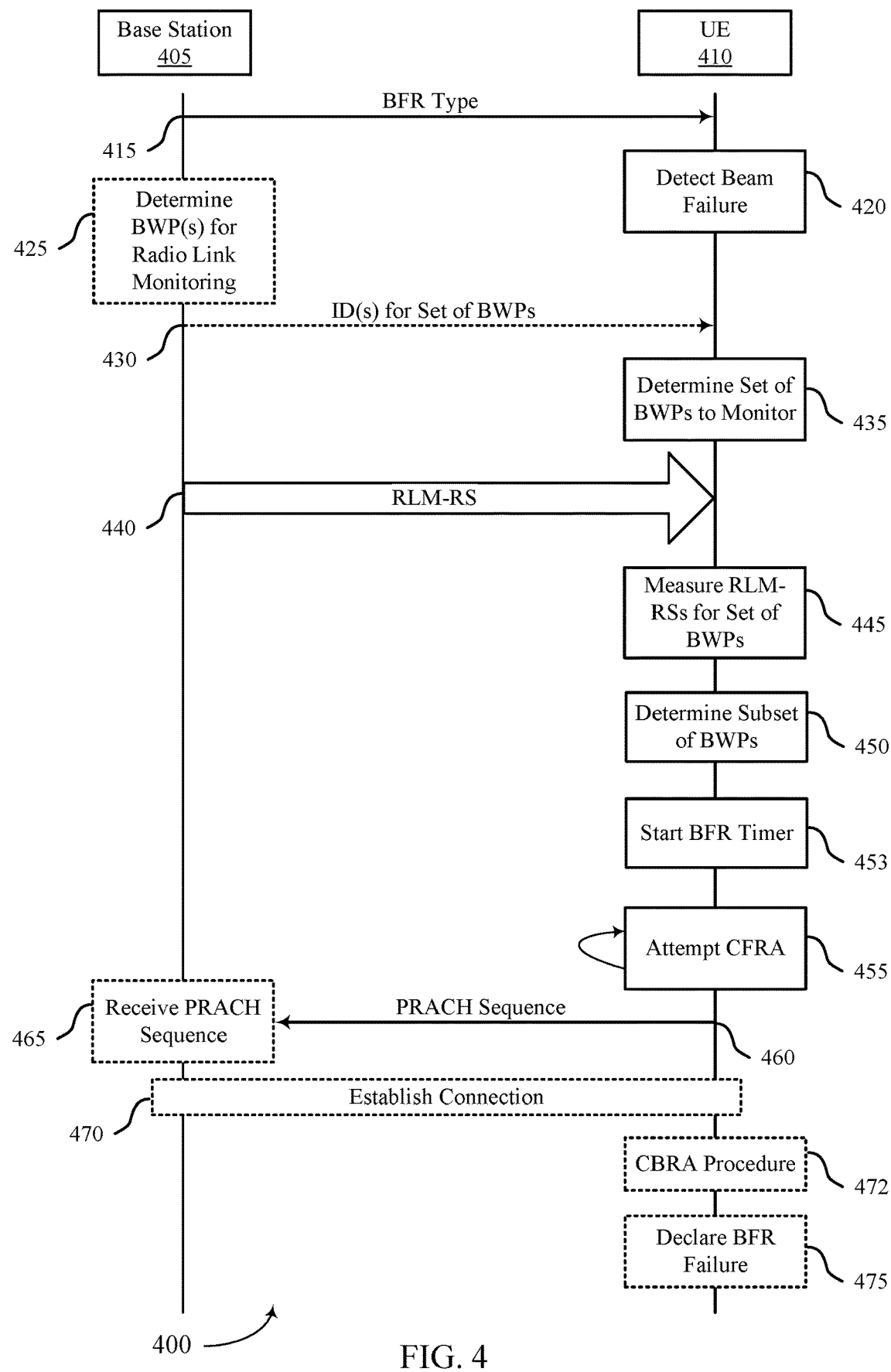
FIG. 4 illustrates an example of a process flow that supports techniques for radio link management in accordance with aspects of the present disclosure.

FIG. 4 illustrates an example of a process flow 400 that supports radio link management in accordance with one or more aspects of the present disclosure. In some examples, process flow 400 may implement aspects of wireless communications system 100 or 200. For example, process flow 400 may be implemented by a base station 405 and a UE 410, which may be examples of a terrestrial base station, a non-terrestrial base station, or a UE as described herein. Process flow 400 may be an example of a beam failure recovery procedure that increases the likelihood of recovering from beam failure (e.g., the beam failure recovery procedure may increase the likelihood that connectivity between the base station 405 and the UE 410 is maintained).

Alternative examples of the following may be implemented, where some operations are performed in a different order than described or are not performed at all. In some cases, operations may include additional features not mentioned herein, or further operations may be added. Additionally, certain operations may be performed multiple times or certain combinations of operations may repeat or cycle.

At 415, the base station 405 may transmit an indication of a type of beam failure recovery (BFR) procedure the UE 410 is to use in the event of a beam failure. At 420, the UE 410 may detect that a beam between the UE 410 and the base station 405 has failed. The bandwidth part associated with the beam may be referred to as the active bandwidth part. Beam failure may occur (and be detected) when a quality of a beam is below a threshold quality for a threshold amount of time. At 425, the base station 405 may determine a set of bandwidth parts for the UE 410 to monitor for radio link management. The set of bandwidth parts may include the active bandwidth part between the UE 410 and the base station 405 and at least one other bandwidth part. The base station 405 may determine the set of bandwidth parts to monitor based on, for example, the location of the UE 410 relative to footprints of beams associated with the bandwidth parts, among other metrics.

At 430, the base station 405 may transmit, and the UE 410 may receive, an indication of the set of bandwidth parts the UE 410 is to monitor. For example, the base station 405 may transmit the identifiers of the bandwidth parts included in the set of bandwidth parts. At 435, the UE 410 may determine the set of bandwidth parts the UE 410 is to monitor.

Monitoring a bandwidth part may include tuning a transceiver or receiver to receive signals (e.g., radio link monitoring reference signals) at one or more frequencies within the bandwidth part.

The UE 410 may determine the set of bandwidth parts based on an explicit indication from the base station 405 (e.g., the indication at 430) or the UE 410 may determine the set of bandwidth parts autonomously (e.g., based on configured default bandwidth parts, configured default parameters, and/or the location of the UE 410 relative to beam footprints associated with the bandwidth parts, among other metrics). Thus, the UE 410 may determine multiple bandwidth parts to monitor as part of the beam failure recovery procedure (as opposed to only monitoring the active bandwidth part), which may increase the likelihood that the UE 410 finds a quality bandwidth part for re-establishing a connection with the base station 405.

At 440, the base station 405 may transmit RLM-RS over the set of bandwidth parts the UE 410 is to monitor. The base station may transmit multiple RLM-RS per bandwidth part, and each RLM-RS may be assigned a physical random access channel (PRACH) sequence or preamble that is unique to that RLM-RS (at least, unique for the RLM-RS assigned to that bandwidth part) so that the UE 410 can perform contention free random access (CFRA). However, the techniques described herein are not limited to contention free random access.

At 445, the UE 410 may monitor the set of bandwidth parts for RLM-RS and measure the RLM-RS received over set of bandwidth parts. Thus, the UE 410 may measure the RLM-RS over multiple bandwidth parts, including the RLM-RS of the active bandwidth part (e.g., the bandwidth part associated with the failed beam).

At 450, the UE 410 may determine a subset of bandwidth parts from the set of bandwidth parts. The subset of bandwidth parts may be selected for a possible random access procedure attempt at 455, which may be part of a beam failure recovery procedure. The UE 410 may select for the subset any bandwidth part in the set of bandwidth parts that has a sufficient quality (e.g., a quality greater than a threshold quality). For example, the UE 410 may determine the quality of each RLM-RS for each bandwidth part in the set of bandwidth parts and compare that quality to a threshold quality. If any RLM-RS for a bandwidth part exceeds (or, in some examples, is equal to) the threshold quality, the bandwidth part may be added to the subset of bandwidth parts. By focusing on bandwidth parts with high quality RLM-RS, the UE 410 may increase the likelihood that a random access attempt at 455 is successful. It should be appreciated that the threshold quality for a first type of RLM-RS (e.g., an SSB) may be different than the threshold quality for a second type of RLM-RS (e.g., a CSI-RS). Additionally, a subset of bandwidth parts may be referred to using other suitable terminology, such as a list of bandwidth parts.

At 453, the UE 410 may start a beam failure recovery (BFR) timer, upon the expiry of which the UE 410 may stop using CFRA for the beam failure recovery procedure and instead initiate contention based random access (CBRA) for the beam failure recovery procedure, where the failure of CBRA indicates radio link failure (RLF). The UE 410 may start the beam failure recovery timer based on detecting the beam failure at 420 and/or based on starting a beam failure recovery procedure.

At 455, the UE 410 may attempt (e.g., as part of the beam failure recovery procedure) a series of random access procedures with the base station 405 (assuming the first attempt fails, which it may not). Each attempted random access procedure may involve transmission of a PRACH sequence to the base station 405, as shown at 460. If the base station 405 successfully receives and decodes the PRACH sequence (e.g., at 465), the base station 405 and the UE 410 may complete the random access procedure and establish a new connection at 470. The new connection may be established over the bandwidth part associated with the RLM-RS assigned to that PRACH sequence. Additionally, the UE 410 may stop and reset the beam failure recovery timer.

A PRACH sequence may be transmitted with an initial (e.g., default) transmission power. If the UE 410 does not receive a random access response (RAR) message transmitted by the base station 405 and addressed to an identifier (e.g., RA-RNTI) of the UE 410 for a bandwidth part within a time window (e.g., Random Access Response window), the UE 410 may re-transmit the PRACH sequence with an increased transmission power. The UE 410 may continue to increase the transmission power for a PRACH sequence of a bandwidth part until a maximum transmission power is reached, at which point the UE 410 may transmit a new PRACH sequence for the bandwidth part using the initial transmission power. If the base station 405 does not receive any of the PRACH sequences for a bandwidth part (or the associated random access procedures fail for other reasons), the UE 410 may attempt a random access procedure on a new bandwidth part (from the subset of bandwidth parts) using the same process. It should be appreciated that the PRACH sequences transmitted by the UE 410 may be PRACH sequences assigned to RLM-RS that satisfied the quality threshold at 450, which may increase the likelihood of successful receipt at the base station 405.

The UE 410 may continue to attempt to complete a random access procedure over one of the bandwidth parts in the subset of bandwidth parts until the beam failure recovery timer expires. If the beam failure recovery timer expires, the UE 410 may, at 472, initiate a contention based random access procedure on a set of bandwidth parts that may include the active bandwidth part. The UE 410 may, at 475, declare a beam failure recovery failure based on the beam failure recovery timer expiring or the contention based random access procedure failing. As noted, if the beam failure recovery procedure is successful (e.g., in a random access procedure is successfully complete) the UE 410 may stop and reset the beam failure recovery timer and establish a new connection with the base station 405.

Thus, the UE 410 may strategically monitor multiple bandwidth parts as part of a beam failure recovery procedure for an active bandwidth part, which may increase the likelihood of saving connectivity after beam failure.

In some examples, aspects of the process flow 400 may be combined with aspects of the process flow 300. For example, the RLM-RS for each bandwidth part in the set of bandwidth parts may be configured using aspects of the process flow 300 so that the UE 410 can monitor for the RLM-RS at 445.

Figure 5:
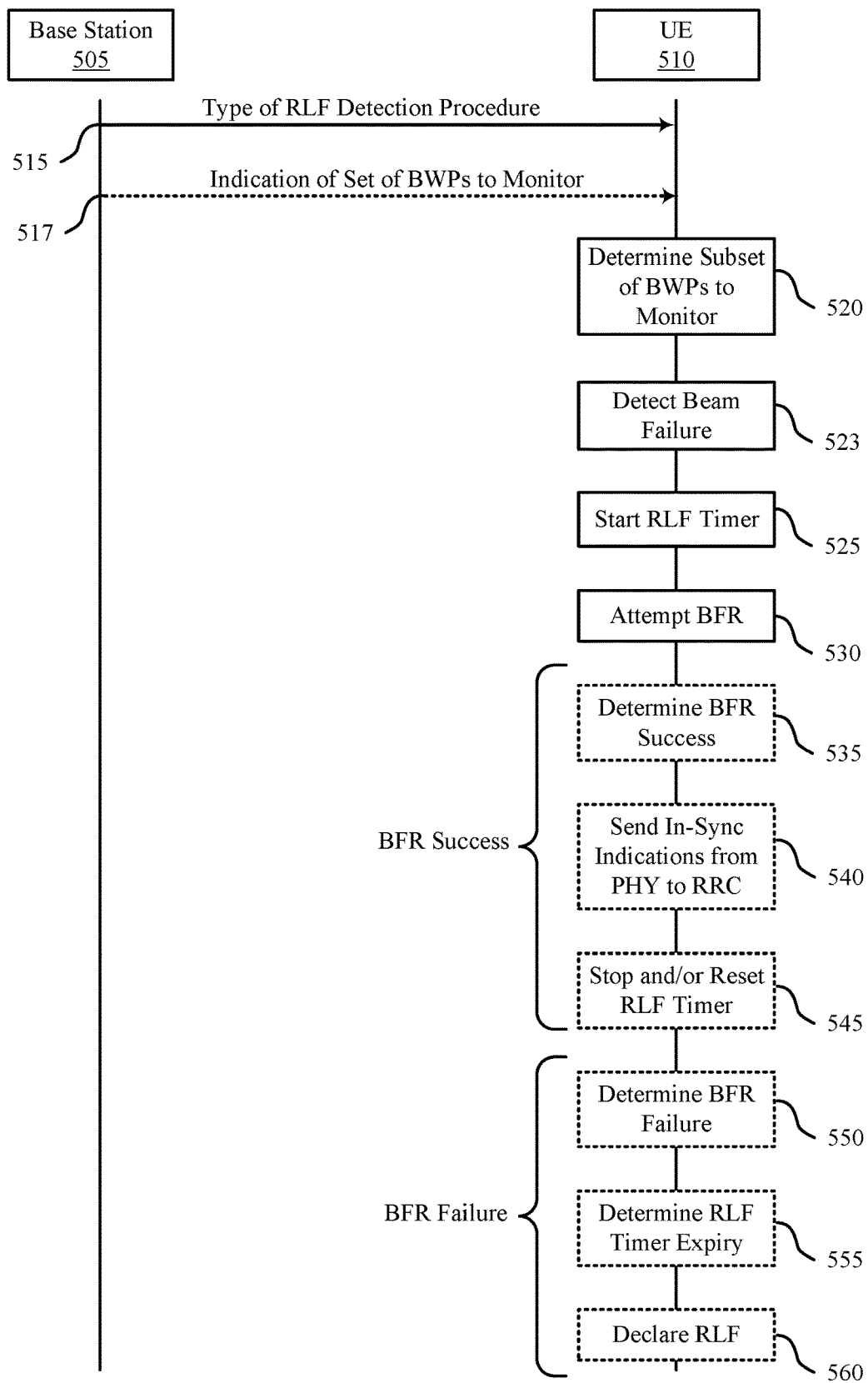
FIG. 5 illustrates an example of a process flow that supports techniques for radio link management in accordance with aspects of the present disclosure.

FIG. 5 illustrates an example of a process flow 500 that supports radio link management in accordance with one or more aspects of the present disclosure. In some examples, process flow 500 may implement aspects of wireless communications system 100 or 200. For example, process flow 500 may be implemented by a base station 505 and a UE 510, which may be examples of a terrestrial base station, a non-terrestrial base station, or a UE as described herein. Process flow 500 may be an example of a first type (e.g., Type 1) of a radio link failure detection procedure that involves multiple bandwidth parts. Compared to other types of radio link failure detection procedures that involve only the active bandwidth part, the first type of radio link failure detection procedure may prevent the UE 510 from prematurely or inappropriately declaring radio link failure.

Alternative examples of the following may be implemented, where some operations are performed in a different order than described or are not performed at all. In some cases, operations may include additional features not mentioned herein, or further operations may be added. Additionally, certain operations may be performed multiple times or certain combinations of operations may repeat or cycle.

At 515, the base station 505 may transmit an indication of a type of radio link failure detection procedure the UE 510 is to use in the event of a beam failure. At 517, the base station 505 may transmit an indication of a set of bandwidth parts the UE 510 is to monitor for radio link management. The set of bandwidth parts may include the active bandwidth part between the UE 510 and the base station 505 and at least one other bandwidth part. The base station 505 may determine the set of bandwidth parts to monitor based on, for example, the location of the UE 510 relative to footprints of beams associated with the bandwidth parts, among other metrics. At 520, the UE 510 may determine a subset of bandwidth parts to monitor. The subset of bandwidth parts may be determined as described with reference to FIG. 4.

At 523, the UE 510 may detect that a beam between the UE 510 and the base station 505 has failed. As noted, beam failure may occur (and be detected) when a quality of the beam (e.g., the active beam) is below a threshold quality for a threshold amount of time.

At 525, the UE 510 may start a radio link failure timer. The radio link failure timer may be started based on the detection of the beam failure and/or based on one or more other metrics. At 530, the UE 510 may attempt a beam failure recovery procedure. The beam failure recovery procedure may include aspects of the beam failure recovery procedure described with reference to FIG. 4. Thus, success of the beam failure recovery procedure may refer to a successful random access attempt as described with reference to FIG. 4. And failure of the beam failure recovery procedure may refer to expiry of the beam failure timer before random access is successful. Thus, the status (e.g., success, failure) of the beam failure recovery procedure may serve as a basis for managing the radio link failure timer.

For instance, if the UE 510 determines (e.g., at 535) that the beam failure recovery procedure is a success, the UE 510 may (e.g., at 540) generate and send one or more in-sync indications from the PHY layer of the UE 510 to the RRC layer of the UE 510. If the PHY layer sends a first quantity of consecutive in-sync indications (e.g., y in-sync indications), the UE 510 may stop the radio link failure timer at 545 but not reset it. If the PHY later sends a second quantity of consecutive in-sync indications (e.g., x in-sync indications), the UE 510 may stop the radio link failure timer at 545 and reset it.

If the UE 510 determines (e.g., at 550) that the beam failure recovery procedure has failed, the UE 510 may permit the radio link failure timer to continue to run. At 555, the UE 510 may determine that the radio link failure timer has expired. Accordingly, at 560, the UE 510 may declare radio link failure. It should be appreciated that the radio link failure timer may be longer than the beam failure recovery timer so that the UE 510 has an opportunity to attempt a beam failure recovery.

Thus, the UE 510 may declare radio link failure based on a radio link failure timer that is managed on the basis of a beam failure recovery procedure performed over multiple bandwidth parts. Such timer management may differ from, and provide advantages relative to, other types of radio failure detection procedures that manage the radio link failure timer based on the quality of RLM-RS in the active bandwidth part. For example, using the success/failure of a beam failure recovery procedure over multiple bandwidth parts as a basis for radio link failure timer management may prevent the UE 510 from prematurely declaring radio link failure when the quality of RLM-RS in the active bandwidth part deteriorates (because the UE 510 has nevertheless been able to save connectivity via the beam failure recovery procedure).

Figure 6:
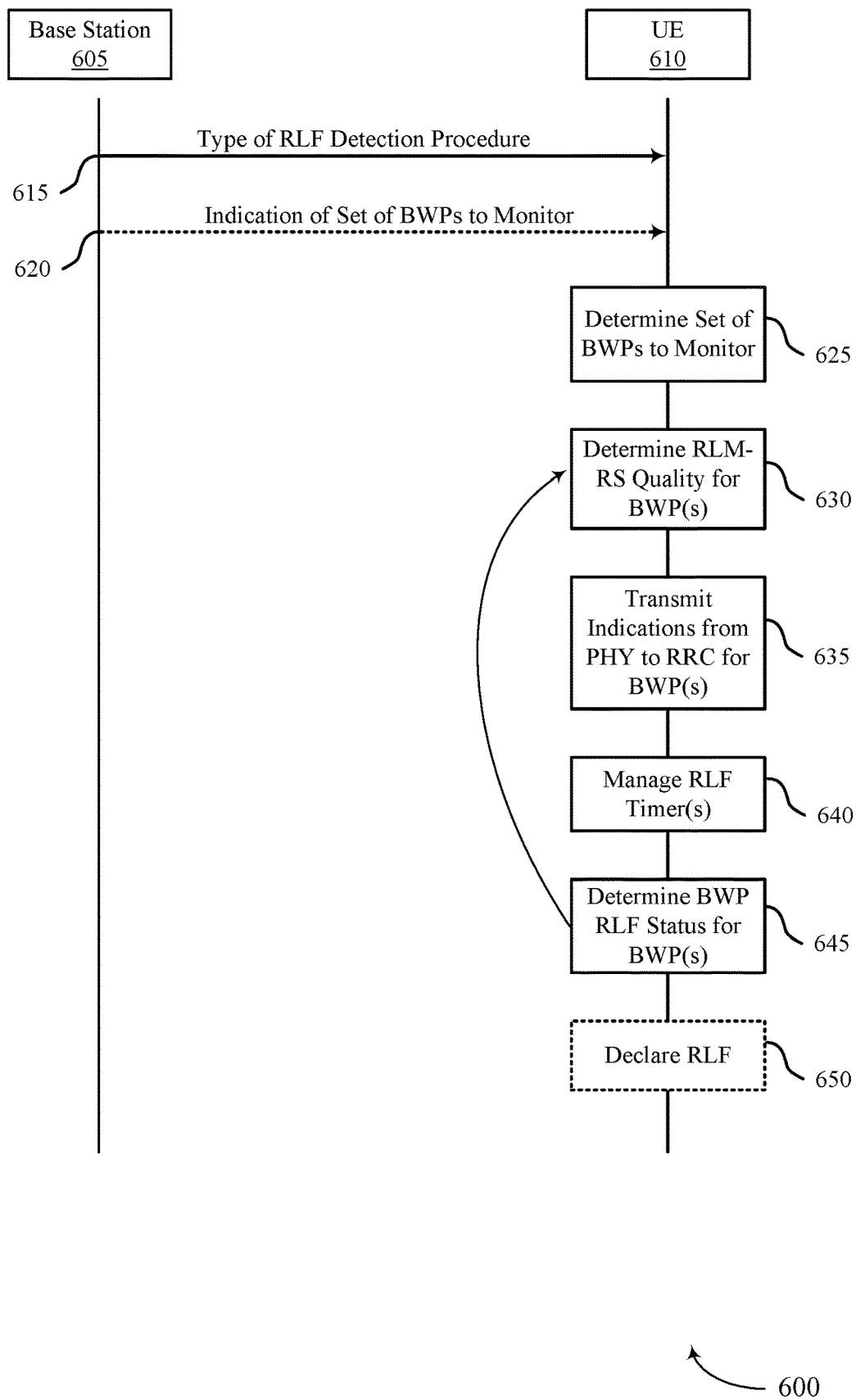
FIG. 6 illustrates an example of a process flow that supports techniques for radio link management in accordance with aspects of the present disclosure.

FIG. 6 illustrates an example of a process flow 600 that supports radio link management in accordance with one or more aspects of the present disclosure. In some examples, process flow 600 may implement aspects of wireless communications system 100 or 200. For example, process flow 600 may be implemented by a base station 605 and a UE 610, which may be examples of a terrestrial base station, a non-terrestrial base station, or a UE as described herein. Process flow 600 may be an example of a second type (e.g., Type 2) of a radio link failure detection procedure that involves multiple bandwidth parts. Compared to other types of radio link failure detection procedures that involve only the active bandwidth part, the second type of radio link failure detection procedure may prevent the UE 610 from prematurely or inappropriately declaring radio link failure.

Unlike the first type of radio link failure detection procedure, which manages a radio link failure timer based on the status of a beam failure recovery procedure, the second type of radio link failure detection procedure may manage a radio link failure timer based on the radio link failure statuses of individual bandwidth parts.

Alternative examples of the following may be implemented, where some operations are performed in a different order than described or are not performed at all. In some cases, operations may include additional features not mentioned herein, or further operations may be added. Additionally, certain operations may be performed multiple times or certain combinations of operations may repeat or cycle.

At 615, the base station 605 may transmit an indication of a type of radio link failure detection procedure the UE 610 is to use in the event of a beam failure. At 620, the base station 605 may transmit an indication of a set of bandwidth parts the UE 610 is to monitor for radio link management. The set of bandwidth parts may include the active bandwidth part between the UE 610 and the base station 605 and at least one other bandwidth part. The base station 605 may determine the set of bandwidth parts to monitor based on, for example, the location of the UE 610 relative to footprints of beams associated with the bandwidth parts, among other metrics. At 625, the UE 610 may determine a set of bandwidth parts to monitor. The UE 610 may determine the set of bandwidth parts based on an explicit indication from the base station 605 (e.g., based on the indication received at 620) or UE 610 may determine the set of bandwidth parts autonomously (e.g., based on configured default bandwidth parts, configured default parameters, and/or the location of the UE 610 relative to beam footprints associated with the bandwidth parts, among other metrics).

At 630, the UE 610 may determine the quality (e.g., a quality metric, such as a reference signal receive power (RSRP) or a signal-to-interference-plus-noise ratio (SINR)) of one or more of RLM-RS in one or more of the bandwidth parts in the set of bandwidth parts. In some examples, the UE 610 may determine the quality of RLM-RS for the active bandwidth part before determining the quality of the RLM-RS for other bandwidth parts. In some examples, determining the quality of an RLM-RS may involve comparing the quality of the RLM-RS to a threshold quality.

At 635, the UE 610 may transmit one or more indications from the PHY layer to the RRC layer of the UE 610. The indications may be in-sync indications and/or out-of-sync indications and each indication may be associated with a respective bandwidth part in the set of bandwidth parts.

For example, with respect to a first bandwidth part, the UE 610 may generate and send an out-of-sync indication for the first bandwidth part if all of the RLM-RS in the first bandwidth part have a quality lower than a first threshold quality. The condition for generating and sending an out-of-sync indication may be the same for all monitored bandwidth parts. However, the condition(s) for generating and sending an in-sync indication may vary depending on the status of bandwidth part. For example, if the first bandwidth part is the active bandwidth part, the UE 610 may generate and send an in-sync indication for the first bandwidth part if at least one RLM-RS associated with the first bandwidth part has a quality higher than a second threshold quality. If the first bandwidth part a bandwidth part other than the active bandwidth part (e.g., the first bandwidth part is an inactive bandwidth part), the UE 610 may generate and send an in-sync indication for the first bandwidth part if 1) if at least one RLM-RS in the first bandwidth part has a quality higher than the second threshold quality and 2) the UE 610 successfully performs random access on the first bandwidth part. The second condition for inactive bandwidth parts may ensure that the UE 610 has the correct time and frequency synchronization for the first bandwidth part.

At 640, the UE 610 may manage a set of radio link failure timers for the set of bandwidth parts. Each radio link failure timer may be associated with a respective bandwidth part so that there is a one-to-on ratio of radio link failure timers to bandwidth parts. Managing a radio link failure timer may include starting, stopping, and resetting the radio link failure timer based on the in-sync and out-of-sync indications transmitted at 635. For example, the UE 610 may start a radio link failure timer for a bandwidth part if the RRC layer receives a first quantity of consecutive out-of-sync indications for the bandwidth part. The UE 610 may stop and reset the radio link failure timer for a bandwidth part if the RRC layer receives a second quantity of consecutive in-sync indications for the bandwidth part. In some examples, the UE 610 may manage the radio link failure timer for the active bandwidth part before managing the radio link failure timers for other bandwidth parts.

At 645, the UE 610 may determine the statuses of the radio link failure timers for the set of bandwidth parts. The UE 610 may declare radio link failure for a bandwidth part if the radio link failure timer for that bandwidth part expires. However, the UE 610 may not declare radio link failure for the set of bandwidth parts until radio link failure has been declared for each bandwidth part in the set of bandwidth parts. It should be appreciated that the operations between 630 and 645 may repeat until radio link failure has been detected and declared for each bandwidth part in the set of bandwidth parts.

At 650, the UE 610 may declare radio link failure for the set of bandwidth parts. The declaration may be based on radio link failure being declared for each bandwidth part in the set of bandwidth parts. Thus, the UE 610 may declare radio link failure based on a radio link failure timer that is managed on the basis other radio link failure timers.

Figure 7:
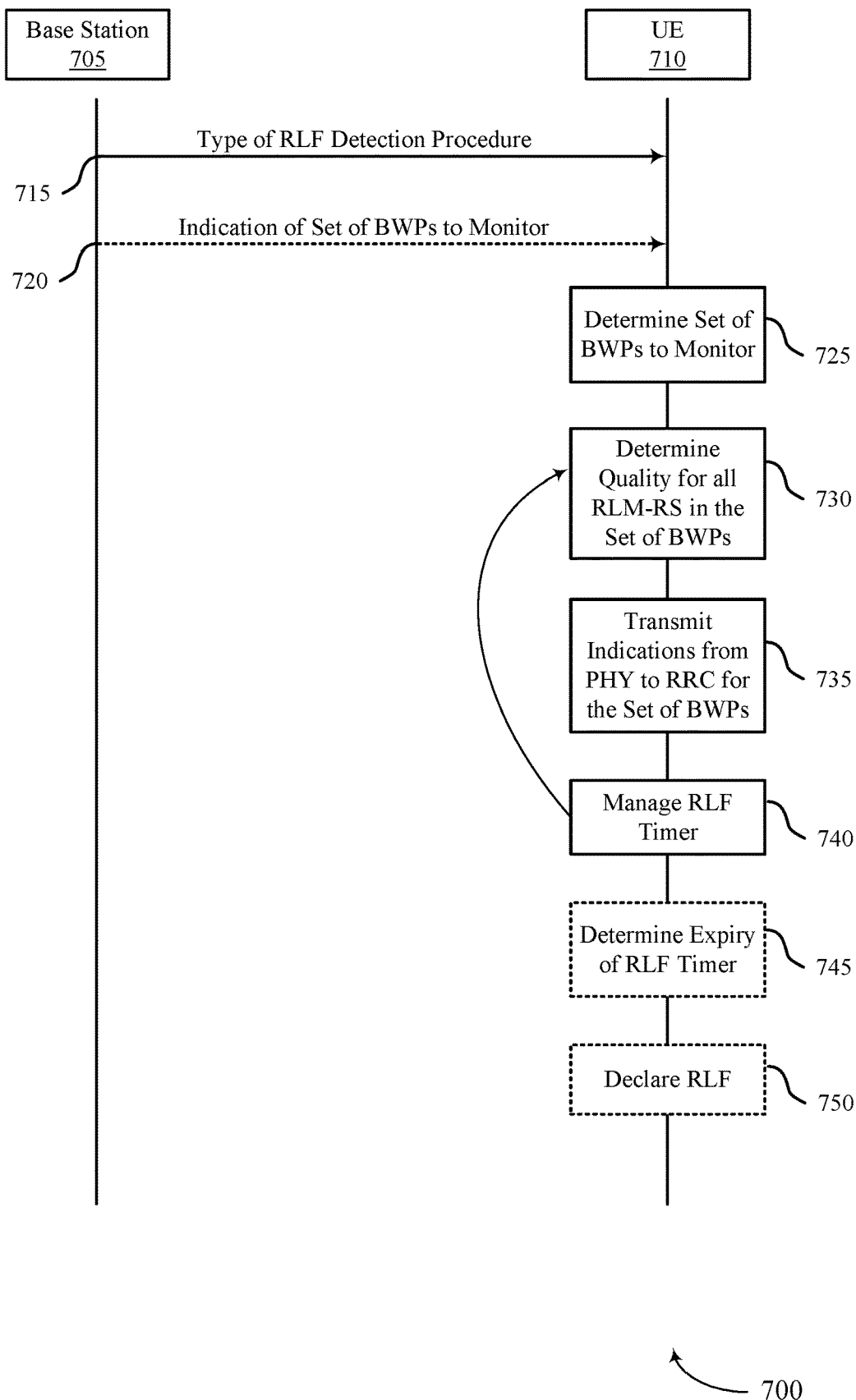
FIG. 7 illustrates an example of a process flow that supports techniques for radio link management in accordance with aspects of the present disclosure.

FIG. 7 illustrates an example of a process flow 700 that supports radio link management in accordance with one or more aspects of the present disclosure. In some examples, process flow 700 may implement aspects of wireless communications system 100 or 200. For example, process flow 700 may be implemented by a base station 705 and a UE 710, which may be examples of a terrestrial base station, a non-terrestrial base station, or a UE as described herein. Process flow 700 may be an example of a third type (e.g., Type 3) of a radio link failure detection that involves multiple bandwidth parts. Compared to other types of radio link failure detection procedures that involve only the active bandwidth part, the third type of radio link failure detection procedure may prevent the UE 710 from prematurely or inappropriately declaring radio link failure.

Unlike the second type of radio link failure detection procedure, which bases radio link failure detection on radio link failure timers for each bandwidth part, the third type of radio link failure detection procedure may base radio link failure detection on a radio link failure timer that is common (e.g., shared by, associated with) all of the bandwidth parts monitored by the UE 710.

Alternative examples of the following may be implemented, where some operations are performed in a different order than described or are not performed at all. In some cases, operations may include additional features not mentioned herein, or further operations may be added. Additionally, certain operations may be performed multiple times or certain combinations of operations may repeat or cycle.

At 715, the base station 705 may transmit an indication of a type of radio link failure detection procedure the UE 710 is to use in the event of a beam failure. At 720, the base station 705 may transmit an indication of a set of bandwidth parts the UE 710 is to monitor for radio link management. The set of bandwidth parts may include the active bandwidth part between the UE 710 and the base station 705 and at least one other bandwidth part. The base station 705 may determine the set of bandwidth parts to monitor based on, for example, the location of the UE 710 relative to footprints associated with the bandwidth parts, among other metrics. At 725, the UE 710 may determine a set of bandwidth parts to monitor. The UE 710 may determine the set of bandwidth parts based on an explicit indication from the base station 705 (e.g., based on the indication received at 720) or UE 710 may determine the set of bandwidth parts autonomously (e.g., based on configured default bandwidth parts, configured default parameters, and/or the location of the UE 710 relative to beam footprints associated with the bandwidth parts, among other metrics).

At 730, the UE 710 may determine the quality of each RLM-RS in the set of bandwidth parts. The UE 710 may determine the quality of an RLM-RS by monitoring the bandwidth part for that RLM-RS and measuring the one or more characteristics of the RLM-RS. In some examples, the UE 710 may compare the quality of each RLM-RS to a threshold quality.

At 735, the UE 710 may transmit one or more internal indications from the PHY layer of the UE 710 to the RRC layer of the UE 710. The indications may be in-sync indications and/or out-of-sync indications and each indication may be associated with the set of bandwidth parts (as opposed to being associated with a respective bandwidth part, as in the second type of radio link failure detection procedure described with reference to FIG. 6).

For example, the UE 710 may generate and send an out-of-sync indication for the set of bandwidth parts if all of the RLM-RS in the set of bandwidth parts have a quality lower than a first threshold quality. The UE 710 may generate and send an in-sync indication for the set of bandwidth parts if 1) at least one bandwidth part in the set of bandwidth parts is associated with an RLM-RM with a quality higher than a second threshold quality and 2) (if that bandwidth part is not the active bandwidth part) the UE 710 successfully performs random access over the bandwidth part. The second condition for inactive bandwidth parts may ensure that the UE 710 has the correct time and frequency synchronization for that bandwidth part.

At 740, the UE 710 may manage a radio link failure timer for the set of bandwidth parts. As noted, the radio link failure timer may be shared among (e.g., common to) the set of bandwidth parts. Managing the radio link failure timer may include starting, stopping, and resetting the radio link failure timer based on the in-sync and out-of-sync indications transmitted at 735. For example, the UE 710 may start a radio link failure timer for the set of bandwidth parts if the RRC layer receives a first quantity of consecutive out-of-sync indications from the PHY layer. The UE 710 may stop and reset the radio link failure timer for the set of bandwidth parts if the RRC layer receives a second quantity of consecutive in-sync indications from the PHY layer.

At 745, the UE 710 may determine the status of the radio link failure timer for the set of bandwidth parts. It should be appreciated that the operations between 730 and 745 may repeat until radio link failure has been detected and declared for the set of bandwidth parts. If the radio link failure timer for set of bandwidth parts has expired, the UE 710 may, at 750 declare radio link failure for the set of bandwidth parts. Thus, the UE 710 may declare radio link failure based on the expiry of the radio link failure timer for the set of bandwidth parts.

Thus, the UE 710 may perform radio link failure detection by managing a radio link failure timer for the set of bandwidth parts based on the quality of the RLM-RS across the set of bandwidth parts.

Figure 8:
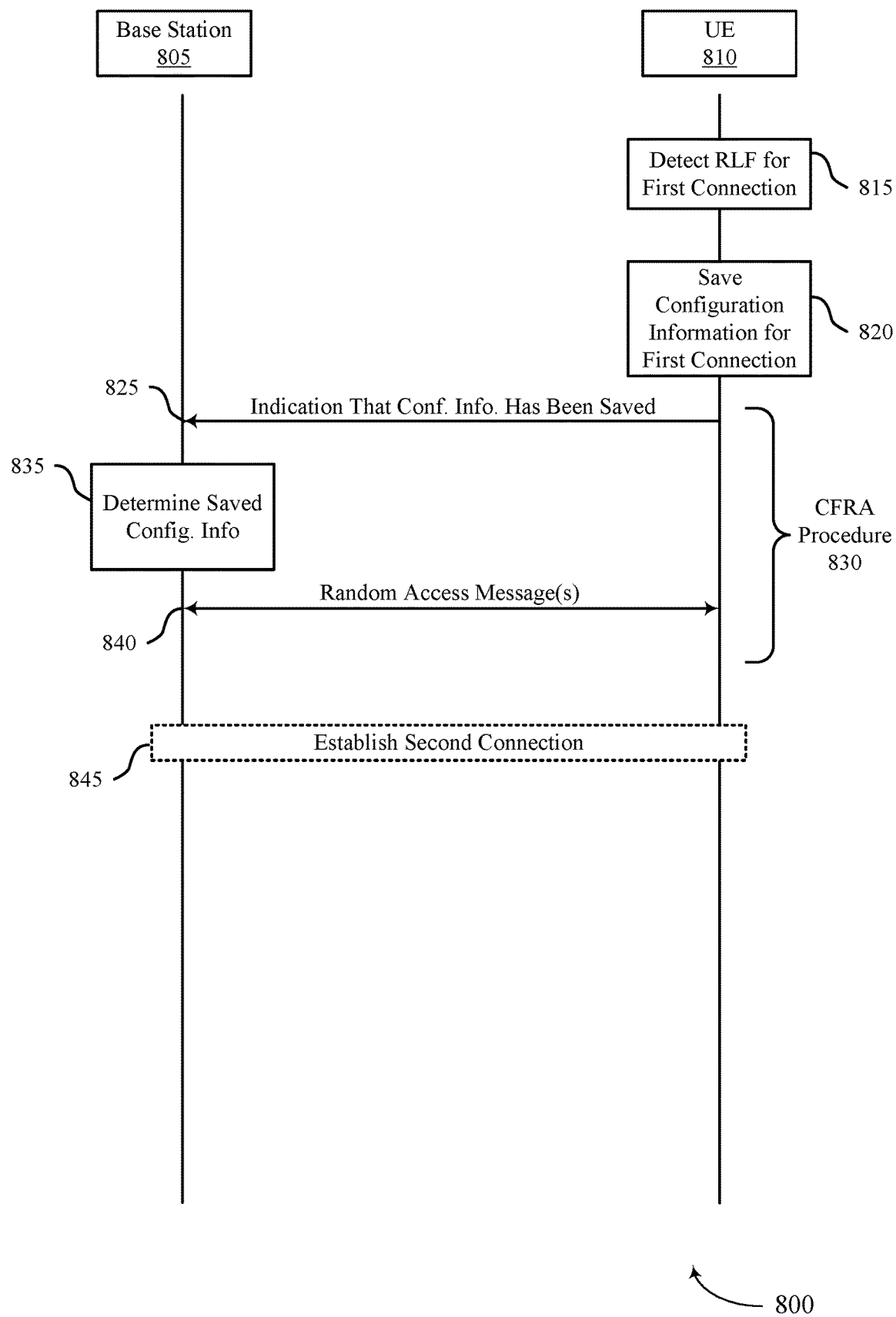
FIG. 8 illustrates an example of a process flow that supports techniques for radio link management in accordance with aspects of the present disclosure.

FIG. 8 illustrates an example of a process flow 800 that supports radio link management in accordance with one or more aspects of the present disclosure. In some examples, process flow 800 may implement aspects of wireless communications system 100 or 200. For example, process flow 800 may be implemented by a base station 805 and a UE 810, which may be examples of a terrestrial base station, a non-terrestrial base station, or a UE as described herein. Process flow 800 may be an example of a procedure for efficiently establishing a new connection after radio link failure.

Alternative examples of the following may be implemented, where some operations are performed in a different order than described or are not performed at all. In some cases, operations may include additional features not mentioned herein, or further operations may be added. Additionally, certain operations may be performed multiple times or certain combinations of operations may repeat or cycle.

At 815, the UE 810 may detect and declare radio link failure for a first connection between the base station 805 and the UE 810. The first connection may be associated with a first beam over a first bandwidth part. In some examples, the UE 810 may use a type of radio link failure detection procedure as described with reference to FIGS. 5 through 7 to detect and declare the radio link failure. However, other types of radio link failure detection procedures may be used.

At 820, the UE 810 may save configuration information for the first connection based on detecting radio link failure for the first connection. For example, the UE 810 may store the configuration information in a memory included in the UE 810. Configuration information for a connection may include information related to radio bearer configurations, radio bearer state variables, MAC configuration, MAC state variables, Master Cell Group Secondary Cell(s) (MCG SCell(s)) configuration(s), and/or special cell configurations, among other parameters.

At 825, the UE 810 may transmit to the base station 805 an indication that the UE 810 has saved the configuration information for the first connection. In some examples, the indication may be included in a random access message. For example, in a four-step random access procedure, the indication may be included in Message 3 (e.g., the third message exchanged between the UE 810 and the base station 105). It should be appreciated that a four-step random access procedure may include a first message from the UE 810 that includes a PRACH sequence, a second message from the base station 805 in response to the first message, a third message (e.g., Message 3) from the UE 810 that requests RRC connection configuration (e.g., setup, resume or re-establishment), and a fourth message from the base station 805 that provides, possibly among other parameters, the requested RRC connection configuration. In a two-step random access procedure, the indication may be included in Message A, which may be a message from the UE 810 that includes a PRACH sequence and requests connection configuration, such as RRC configuration. Thus, the indication may be transmitted during the CFRA procedure 830.

In some examples, the indication is a one-bit indicator that indicates 1) that the base station 805 (or the cell associated with the base station 805, or the satellite associated with the base station 805) had a prior connection with the UE 810 and/or 2) that the UE has saved the configuration information (at least for some entities) for the prior connection. In some examples, the indication includes the one-bit indicator plus an identifier (e.g., the physical cell identifier (PCID)) of the base station 805 (or the cell associated with the base station 805, or the satellite associated with the base station 805) to which the UE 810 was previously connected. Sending the indicator as a single bit may reduce overhead whereas the addition of the identifier may simplify and/or speed up a look-up process for the configuration information at the base station 805.

In some examples, the UE 810 may perform the CFRA procedure 830 using a UE identifier (UE ID) that the UE 810 used to establish and/or maintain the first connection. For example, the UE 810 may include the UE ID from the first connection in one of the messages transmitted to the base station 805 during the CFRA procedure 830 for the second connection. The UE ID may be, for example, a preconfigured UE ID or a randomly generated x-bit (e.g., 39 bit) value.

At 835, the base station 805 may determine the configuration information that has been saved at the UE 810. The base station 805 may determine the configuration information based on the indication received at 825, the UE ID received during the CFRA procedure 830, and/or the identifier (e.g., the PCID) received during the CFRA procedure 830. For example, the base station 805 may determine that the UE 810 saved configuration information (and that the base station 805 should look up the configuration information) based on the indication that the UE 810 has saved the configuration information. And the base station 805 may identify the configuration information the UE 810 saved based on the UE ID and/or the PCID. For example, the base station 805 may identify the proper configuration information based on the configuration information being associated with the UE ID and or the PCID.

At 840, the base station 805 and the UE 810 may exchange one or more random access messages to complete the random access procedure (e.g., CFRA procedure 830).

The random access messages may include a random access response message transmitted by the base station 805, a message transmitted by the UE 810 requesting RRC information and/or synchronization information, and/or a message transmitted by the base station 805 indicating RRC information and/or other connection information, such as synchronization information. Of course, additional, fewer, or different messages indicating different or additional information may be involved in the exchange at 840.

At 845, the base station 805 and the UE 810 may establish a second connection using the configuration information from the first connection. Thus, the base station 805 and UE 810 may avoid additional signaling to set up the configuration for the second connection. In some examples, the second connection may be established over a second beam associated with a second bandwidth part.

Figure 9:
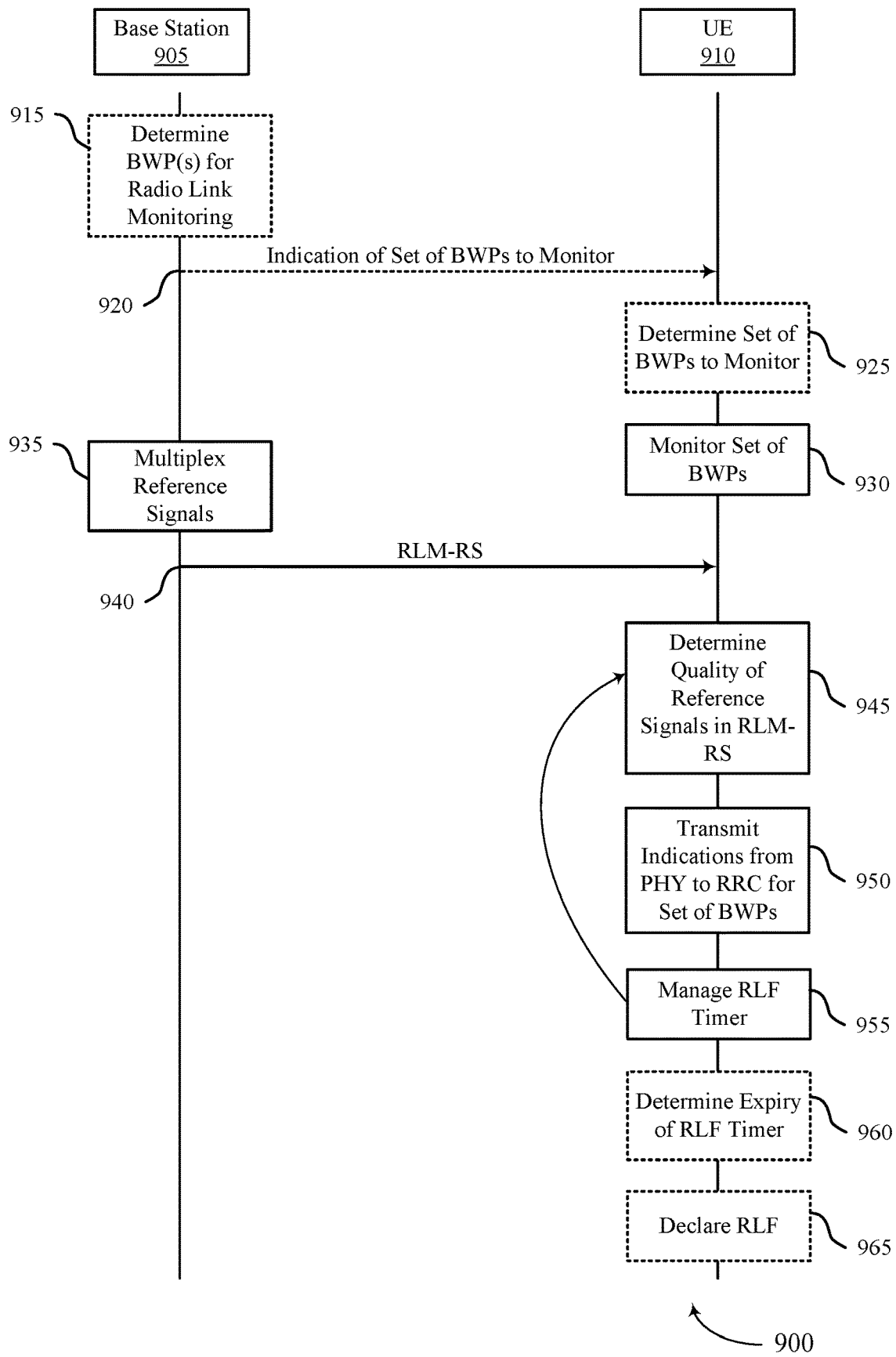
FIG. 9 illustrates an example of a process flow that supports techniques for radio link management in accordance with aspects of the present disclosure.

FIG. 9 illustrates an example of a process flow 900 that supports radio link management in accordance with one or more aspects of the present disclosure. In some examples, process flow 900 may implement aspects of wireless communications system 100 or 200. For example, process flow 900 may be implemented by a base station 905 and a UE 910, which may be examples of a terrestrial base station, a non-terrestrial base station, or a UE as described herein. Process flow 900 may be an example of a procedure that allows a single RLM-RS reference signal to be used for a set of bandwidth parts, which may reduce signaling complexity.

Alternative examples of the following may be implemented, where some operations are performed in a different order than described or are not performed at all. In some cases, operations may include additional features not mentioned herein, or further operations may be added. Additionally, certain operations may be performed multiple times or certain combinations of operations may repeat or cycle.

At 915, the base station 905 may determine a set of bandwidth parts for the UE 910 to monitor for radio link management. The set of bandwidth parts may include the active bandwidth part between the UE 910 and the base station 905 and at least one other bandwidth part. The base station 905 may determine the set of bandwidth parts to monitor based on, for example, the location of the UE 910 relative to footprints of beams associated with the bandwidth parts, the trajectory of the UE 910, the trajectory of the base station 905, the velocity of the UE 910, the velocity of the base station 905, or a combination of these or other metrics.

At 920, the base station 905 may transmit, and the UE 910 may receive, an indication of the set of bandwidth parts the UE 910 is to monitor. For example, the base station 905 may transmit the identifiers of the bandwidth parts in the set of bandwidth parts. At 925, the UE 910 may determine the set of bandwidth parts the UE 910 is to monitor. The UE 910 may determine the set of bandwidth parts based on an explicit indication from the base station 905 (e.g., the indication at 930). Additionally or alternatively, the UE 910 may determine the set of bandwidth parts based on one or more metrics, such as the location of the UE 910, the trajectory of the UE 910, the trajectory of the base station 905, the velocity of the UE 910, and the velocity of the base station 905.

At 930, the UE 910 may monitor the set of bandwidth parts for a radio link monitoring reference signal. Monitoring a set of bandwidth parts may involve tuning a transceiver or receiver to receive signals at one or more frequencies within the set of bandwidth parts.

At 935, the base station 905 may multiplex multiple reference signals in the time domain or the frequency domain to generate a radio link monitoring reference signal for multiple bandwidth parts. The reference signals may be SSBs and/or CSI-RSs, among other reference signals. At 940, the base station 905 may transmit, and the UE 910 may receive, the radio link monitoring reference signal.

At 945, the UE 915 may determine the quality of each reference signal of the radio link monitoring reference signal by measuring one or more characteristics (e.g., SINR, RSRP) of the reference signals included in the radio link monitoring reference signal. At 950, the UE 910 may transmit indications for the set of bandwidth parts from the PHY layer of the UE 910 to the RRC layer of the UE 910. For example, the PHY layer may transmit an in-sync reference signal to the RRC layer when a threshold quantity of the reference signals have a quality higher than a threshold quality. And the PHY layer may transmit an out-of-sync reference signal to the RRC layer when a threshold quantity of the reference signals have a quality lower than a threshold quality.

At 955, the UE 910 may manage a radio link failure timer for the set of bandwidth parts. Managing the radio link failure timer may include starting, stopping, and resetting the radio link failure timer based on the in-sync and out-of-sync indications transmitted at 950. For example, the UE 910 may start a radio link failure timer for the set of bandwidth parts if the RRC layer receives a first quantity of consecutive out-of-sync indications from the PHY layer. The UE 910 may stop and reset the radio link failure timer for the set of bandwidth parts if the RRC layer receives a second quantity of consecutive in-sync indications from the PHY layer.

At 960, the UE 710 may determine the status of the radio link failure timer for the set of bandwidth parts. It should be appreciated that the operations between 945 and 955 may repeat until radio link failure has been detected and declared for the set of bandwidth parts. If the radio link failure timer for set of bandwidth parts has expired, the UE 910 may, at 965 declare radio link failure for the set of bandwidth parts. Thus, the UE 910 may perform radio link failure detection based on the quality of reference signals in an RLM-RS associated with all of the bandwidth parts in the set of bandwidth parts.

Figure 10:
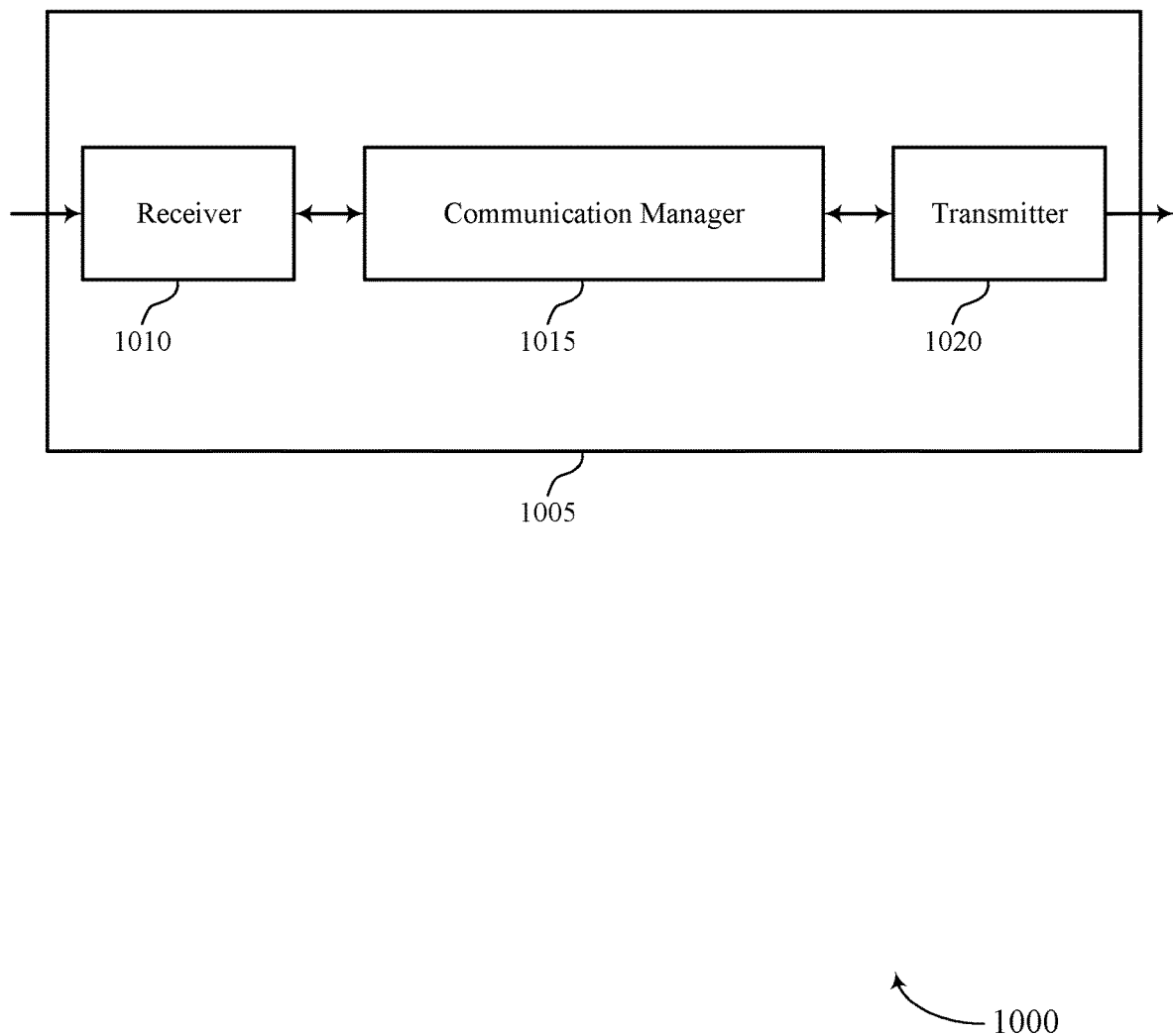
FIGS. 10 and 11 show block diagrams of devices that support techniques for radio link management in accordance with aspects of the present disclosure.

FIG. 10 shows a block diagram 1000 of a device 1005 that supports techniques for radio link management in accordance with aspects of the present disclosure. The device 1005 may be an example of aspects of a UE 115 as described herein. The device 1005 may include a receiver 1010, a communication manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for radio link management, etc.). Information may be passed on to other components of the device 1005. The receiver 1010 may be an example of aspects of the transceiver 1315 described with reference to FIG. 13. The receiver 1010 may utilize a single antenna or a set of antennas.

The communication manager 1015 may receive, from a base station, a first message including a configuration of a first radio link monitoring reference signal for a first bandwidth part associated with a first beam, determine a second bandwidth part to monitor for radio link management in addition to the first bandwidth part, the second bandwidth part associated with a second beam, and determine a configuration of a second radio link monitoring reference signal for the second bandwidth part based on the configuration for the first radio link monitoring reference signal and a frequency offset associated with the second bandwidth part.

The communication manager 1015 may also receive an indication of a type of beam failure recovery procedure, determine a set of bandwidth parts to monitor based on the type of beam failure recovery procedure, the set of bandwidth parts including a bandwidth part associated with a failed beam between the UE and a base station, determine, based on monitoring the set of bandwidth parts, a subset of bandwidth parts from the set of bandwidth parts for the beam failure recovery procedure, and attempt, as part of the beam failure recovery procedure, a random access procedure over a bandwidth part of the subset of bandwidth parts.

The communication manager 1015 may also communicate to the base station an indication that the configuration information for the first connection has been saved, establish a second connection with the base station based on the saved configuration information for the first connection and communicating the indication, save configuration information for the first connection based on detecting the radio link failure, and detect that radio link failure has occurred for a first connection between the UE and a base station.

The communication manager 1015 may also determine that a radio link monitoring reference signal for a set of bandwidth parts includes multiple signals, determine a radio link failure status for a base station based on the qualities of the multiple signals of the radio link monitoring reference signal, monitor the set of bandwidth parts for the radio link monitoring reference signal, and measure a quality of each signal of the multiple signals of the radio link monitoring reference signal. The communication manager 1015 may be an example of aspects of the communication manager 1310 described herein.

By including or configuring the communication manager 1015 in accordance with examples as described herein, the device 1005 may support techniques for efficient utilization of communication resources, improved communication reliability, and reduced processing.

The communication manager 1015, or its sub-components, may be implemented in hardware, code (e.g., software or firmware) executed by a processor, or any combination thereof. If implemented in code executed by a processor, the functions of the communication manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 1015, or its sub-components, may be physically located at various positions, including being distributed such that portions of functions are implemented at different physical locations by one or more physical components. In some examples, the communication manager 1015, or its sub-components, may be a separate and distinct component in accordance with various aspects of the present disclosure. In some examples, the communication manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1315 described with reference to FIG. 13. The transmitter 1020 may utilize a single antenna or a set of antennas.

Figure 11:
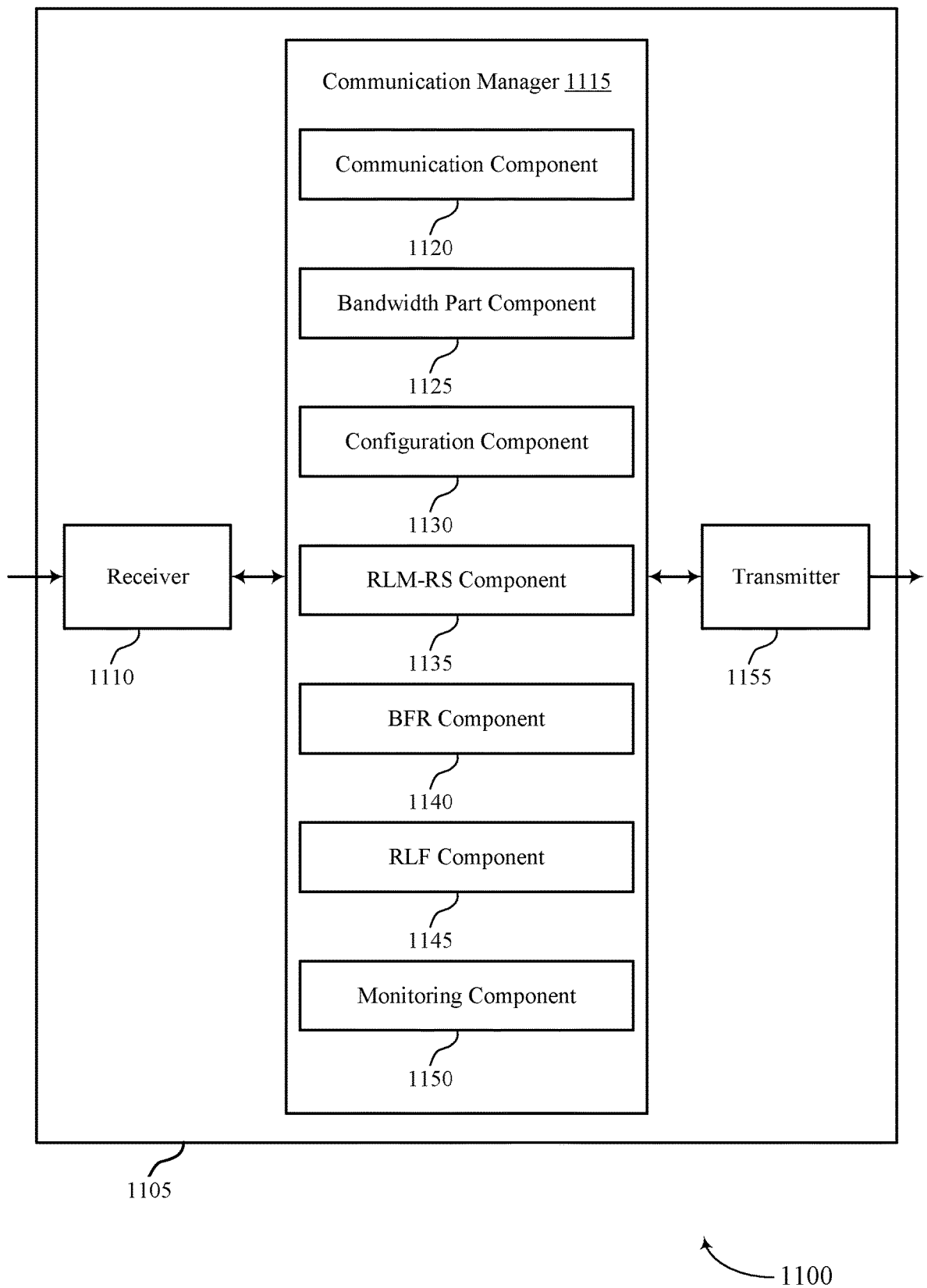

FIG. 11 shows a block diagram 1100 of a device 1105 that supports techniques for radio link management in accordance with aspects of the present disclosure. The device 1105 may be an example of aspects of a device 1005, or a UE 115 as described herein. The device 1105 may include a receiver 1110, a communication manager 1115, and a transmitter 1155. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for radio link management, etc.). Information may be passed on to other components of the device 1105. The receiver 1110 may be an example of aspects of the transceiver 1315 described with reference to FIG. 13. The receiver 1110 may utilize a single antenna or a set of antennas.

The communication manager 1115 may be an example of aspects of the communication manager 1015 as described herein. The communication manager 1115 may include a communication component 1120, a bandwidth part component 1125, a configuration component 1130, an RLM-RS component 1135, a BFR component 1140, a RLF component 1145, and a monitoring component 1150. The communication manager 1115 may be an example of aspects of the communication manager 1310 described herein.

The communication component 1120 may receive, from a base station, a first message including a configuration of a first radio link monitoring reference signal for a first bandwidth part associated with a first beam. The configuration component 1130 may determine a configuration of a second radio link monitoring reference signal for the second bandwidth part based on the configuration for the first radio link monitoring reference signal and a frequency offset associated with the second bandwidth part.

The bandwidth part component 1125 may determine a second bandwidth part to monitor for radio link management in addition to the first bandwidth part, the second bandwidth part associated with a second beam. The bandwidth part component 1125 may determine a set of bandwidth parts to monitor based on the type of beam failure recovery procedure, the set of bandwidth parts including a bandwidth part associated with a failed beam between the UE and a base station and determine, based on monitoring the set of bandwidth parts, a subset of bandwidth parts from the set of bandwidth parts for the beam failure recovery procedure.

The BFR component 1140 may attempt, as part of the beam failure recovery procedure, a random access procedure over a bandwidth part of the subset of bandwidth parts. The communication component 1120 may receive an indication of a type of beam failure recovery procedure. The configuration component 1130 may save configuration information for the first connection based on detecting the radio link failure. The RLF component 1145 may detect that radio link failure has occurred for a first connection between the UE and a base station.

The communication component 1120 may communicate to the base station an indication that the configuration information for the first connection has been saved and establish a second connection with the base station based on the saved configuration information for the first connection and communicating the indication.

The RLM-RS component 1135 may determine that a radio link monitoring reference signal for a set of bandwidth parts includes multiple signals. The RLF component 1145 may determine a radio link failure status for a base station based on the qualities of the multiple signals of the radio link monitoring reference signal.

The monitoring component 1150 may monitor the set of bandwidth parts for the radio link monitoring reference signal and measure a quality of each signal of the multiple signals of the radio link monitoring reference signal.

The transmitter 1155 may transmit signals generated by other components of the device 1105. In some examples, the transmitter 1155 may be collocated with a receiver 1110 in a transceiver module. For example, the transmitter 1155 may be an example of aspects of the transceiver 1315 described with reference to FIG. 13. The transmitter 1155 may utilize a single antenna or a set of antennas.

Figure 12:
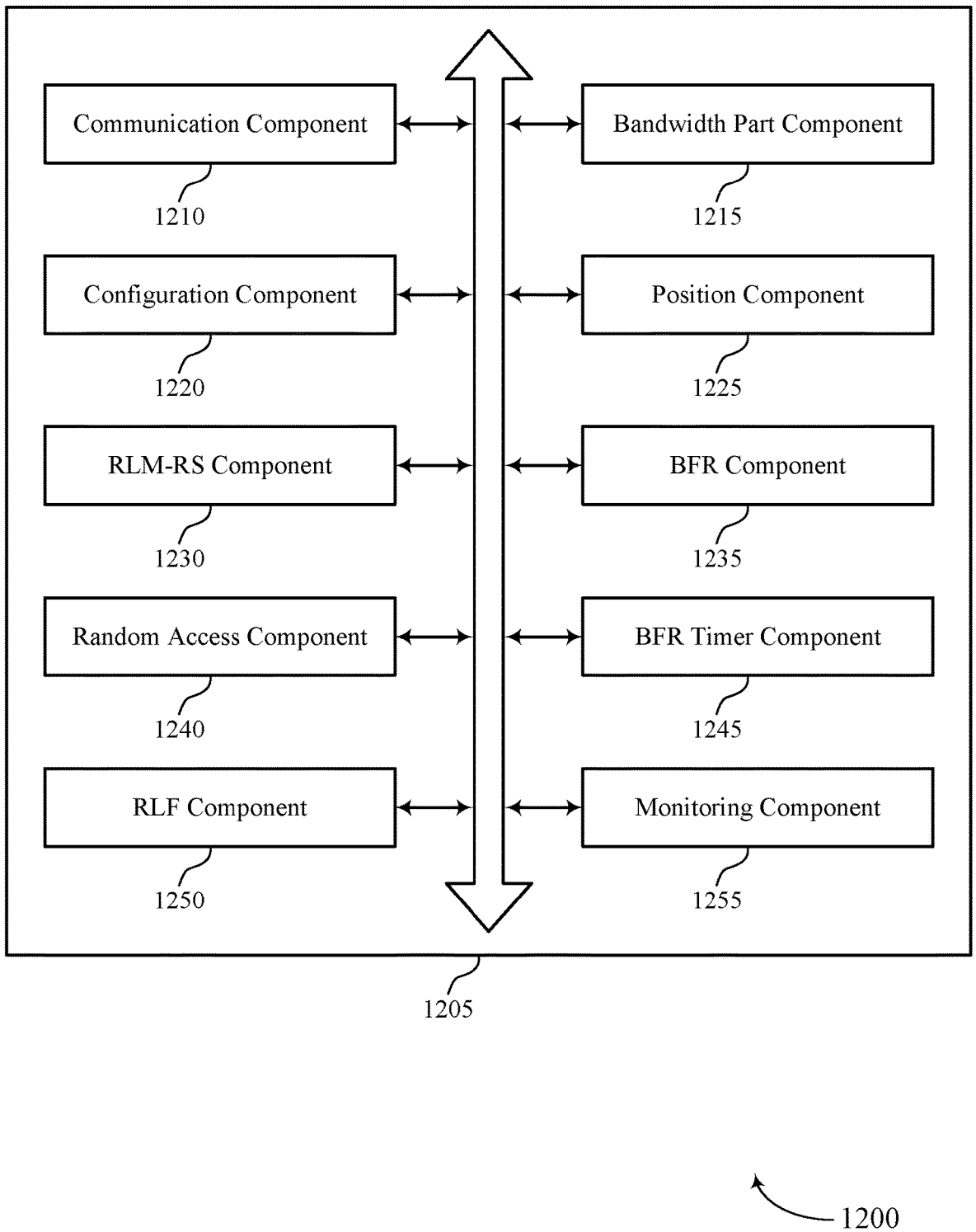
FIG. 12 shows a block diagram of a communication manager that supports techniques for radio link management in accordance with aspects of the present disclosure.

FIG. 12 shows a block diagram 1200 of a communication manager 1205 that supports techniques for radio link management in accordance with aspects of the present disclosure. The communication manager 1205 may be an example of aspects of a communication manager 1015, a communication manager 1115, or a communication manager 1310 described herein. The communication manager 1205 may include a communication component 1210, a bandwidth part component 1215, a configuration component 1220, a position component 1225, an RLM-RS component 1230, a BFR component 1235, a random access component 1240, a BFR timer component 1245, a RLF component 1250, and a monitoring component 1255. Each of these modules may communicate, directly or indirectly, with one another (e.g., via one or more buses).

The communication component 1210 may receive, from a base station, a first message including a configuration of a first radio link monitoring reference signal for a first bandwidth part associated with a first beam. In some examples, the communication component 1210 may receive an indication of a type of beam failure recovery procedure. In some examples, the communication component 1210 may communicate to the base station an indication that the configuration information for the first connection has been saved. In some examples, the communication component 1210 may establish a second connection with the base station based on the saved configuration information for the first connection and communicating the indication. In some examples, the communication component 1210 may receive an indication of the second bandwidth part from the base station, where the second bandwidth part is determined based on the indication. In some examples, the communication component 1210 may receive an indication of the frequency offset from the base station.

In some examples, the communication component 1210 may receive from the base station an indication of a type of radio link monitoring reference signal for the first bandwidth part. In some examples, the communication component 1210 may receive from the base station an indication of the set of bandwidth parts, where the set of bandwidth parts is determined based on the indication. In some examples, transmit an identifier of the UE to the base station as part of the random access procedure, where the identifier includes an identifier the UE used to establish the first connection. In some examples, the communication component 1210 may transmit to the base station as part of the random access procedure a message requesting RRC information, where the indication is included in the message. In some cases, the indication of the second bandwidth part includes an identifier for the second bandwidth part. In some cases, the indication includes a bit. In some cases, the indication further includes an identifier of the base station or an identifier of a cell associated with the base station.

The bandwidth part component 1215 may determine a second bandwidth part to monitor for radio link management in addition to the first bandwidth part, the second bandwidth part associated with a second beam. In some examples, the bandwidth part component 1215 may determine a set of bandwidth parts to monitor based on the type of beam failure recovery procedure, the set of bandwidth parts including a bandwidth part associated with a failed beam between the UE and a base station.

In some examples, the bandwidth part component 1215 may determine, based on monitoring the set of bandwidth parts, a subset of bandwidth parts from the set of bandwidth parts for the beam failure recovery procedure. In some examples, the bandwidth part component 1215 may determine a frequency difference between the first bandwidth part and the second bandwidth part, where the frequency offset is determined based on the frequency difference.

In some examples, the bandwidth part component 1215 may determine the set of bandwidth parts based on location of the UE relative to coverage areas of beams associated with the set of bandwidth parts. In some examples, the bandwidth part component 1215 may receive from the base station an indication of the set of bandwidth parts, where the set of bandwidth parts is determined based on the indication. In some examples, the bandwidth part component 1215 may determine the set of bandwidth parts based on a location of the UE relative to coverage areas of beams associated with the set of bandwidth parts.

The configuration component 1220 may determine a configuration of a second radio link monitoring reference signal for the second bandwidth part based on the configuration for the first radio link monitoring reference signal and a frequency offset associated with the second bandwidth part. In some examples, the configuration component 1220 may save configuration information for the first connection based on detecting the radio link failure. In some examples, receiving a configuration for the second bandwidth part from the base station, where the configuration includes the indication of the frequency offset. In some cases, the configuration information includes a radio bearer configuration, a radio bearer state variable, a medium access control (MAC) configuration, a MAC state variable, a master cell group secondary cell configuration, or a cell configuration, or a combination thereof.

The RLM-RS component 1230 may determine that a radio link monitoring reference signal for a set of bandwidth parts includes multiple signals. In some examples, the RLM-RS component 1230 may determine that the type of radio link monitoring reference signal for the first bandwidth part applies to the second radio link monitoring reference signal for the second bandwidth part. In some examples, the RLM-RS component 1230 may determine a quality of each radio link monitoring reference signal associated with the set of bandwidth parts. In some examples, the RLM-RS component 1230 may compare the quality of each radio link monitoring reference signal with a threshold quality, where the subset of bandwidth parts is determined based on each bandwidth part in the subset of bandwidth parts being associated with at least one radio link reference signal that satisfies the threshold quality.

The BFR component 1235 may attempt, as part of the beam failure recovery procedure, a random access procedure over a bandwidth part of the subset of bandwidth parts. In some examples, the BFR component 1235 may determine that the random access procedure has failed. In some examples, the BFR component 1235 may attempt, as part of the beam failure recovery procedure and based on determining that the random access procedure has failed, a second random access procedure over the bandwidth part using a second transmit power higher than the first transmit power. In some examples, the BFR component 1235 may determine that the beam failure recovery procedure has failed based on expiry of the beam failure recovery timer.

The RLF component 1250 may detect that radio link failure has occurred for a first connection between the UE and a base station. In some examples, the RLF component 1250 may determine a radio link failure status for a base station based on the qualities of the multiple signals of the radio link monitoring reference signal. In some examples, the RLF component 1250 may manage a radio link failure timer for the set of bandwidth parts, where the radio link failure status for the base station is determined based on a status of the radio link failure timer. In some examples, the RLF component 1250 may start the radio link failure timer when a threshold quantity of the multiple signals have a quality lower than a threshold quality. In some examples, the RLF component 1250 may stop and resetting the radio link failure timer when a threshold quantity of the multiple signals have a quality higher than a threshold quality.

The monitoring component 1255 may monitor the set of bandwidth parts for the radio link monitoring reference signal. In some examples, the monitoring component 1255 may measure a quality of each signal of the multiple signals of the radio link monitoring reference signal.

The position component 1225 may determine that the UE is within a threshold proximity of a coverage area of the second beam, where the second bandwidth part is determined based on determining that the UE is within the threshold proximity of the coverage area of the second beam.

The random access component 1240 may determine, for each bandwidth part in the set of bandwidth parts, a unique PRACH sequence for each radio link monitoring reference signal associated with that bandwidth part. In some examples, the random access component 1240 may transmit a message including a PRACH sequence for a radio link monitoring reference signal of the bandwidth part that satisfies a threshold quality. In some examples, the random access component 1240 may determine that the random access procedure has failed. In some examples, the random access component 1240 may attempt, as part of the beam failure recovery procedure and based on determining that the random access procedure has failed, a second random access procedure over a second bandwidth part of the subset of bandwidth parts. In some examples, the random access component 1240 may perform a random access procedure with the base station, where the indication is communicated during the random access procedure.

The BFR timer component 1245 may start a beam failure recovery timer based on attempting the beam failure recovery procedure. In some examples, the BFR timer component 1245 may determine that the beam failure recovery timer has expired. In some examples, the BFR timer component 1245 may start a beam failure recovery timer based on attempting the beam failure recovery procedure. In some examples, the BFR timer component 1245 may determine that the random access procedure has been successfully completed. In some examples, the BFR timer component 1245 may stop and reset the beam failure recovery timer based on determining that the random access procedure has been successfully completed.

Figure 13:
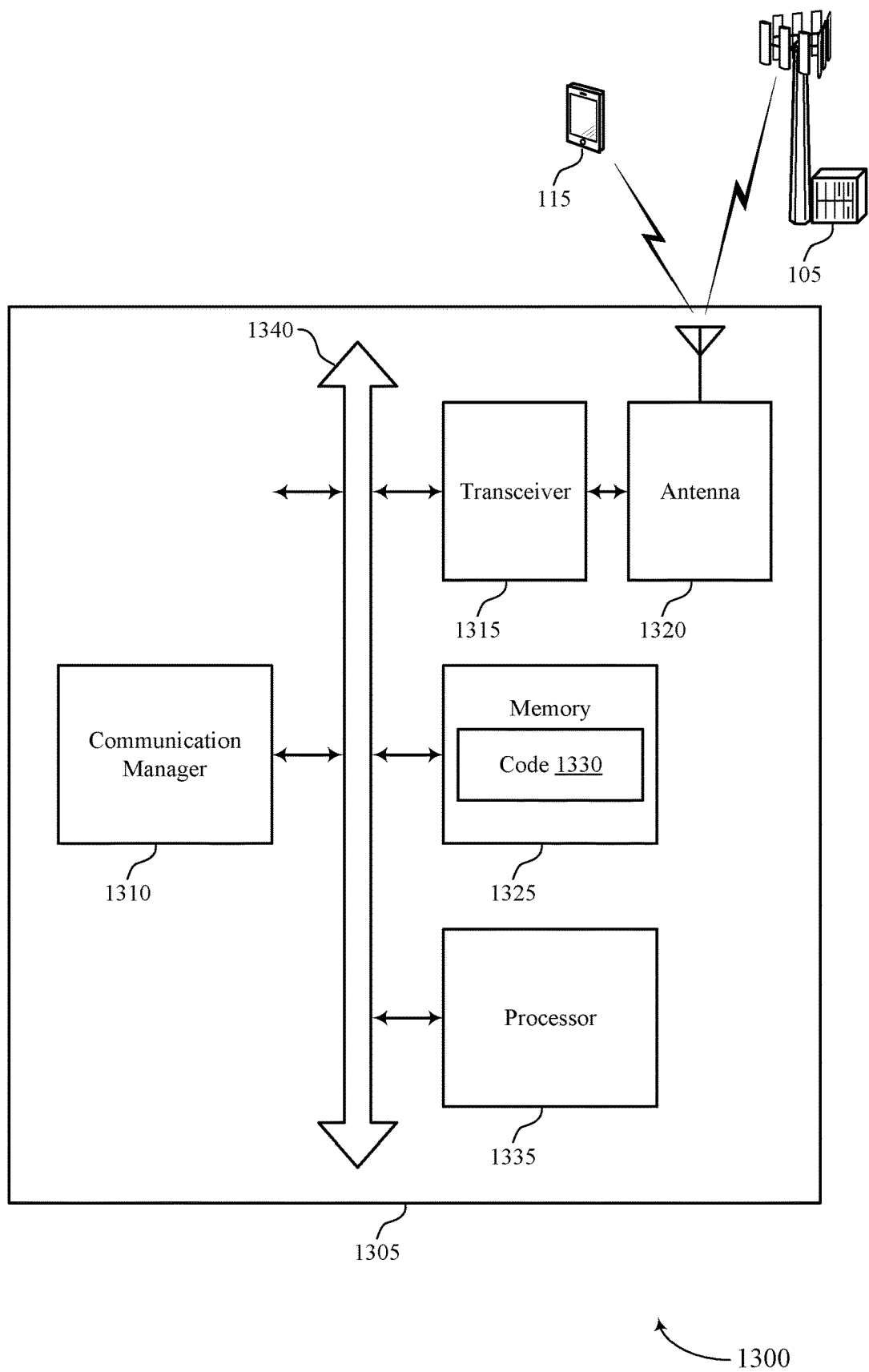
FIG. 13 shows a diagram of a system including a device that supports techniques for radio link management in accordance with aspects of the present disclosure.

FIG. 13 shows a diagram of a system 1300 including a device 1305 that supports techniques for radio link management in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communication manager 1310, a transceiver 1315, an antenna 1320, memory 1325, and a processor 1335. These components may be in electronic communication via one or more buses (e.g., bus 1340).

The communication manager 1310 may receive, from a base station, a first message including a configuration of a first radio link monitoring reference signal for a first bandwidth part associated with a first beam, determine a second bandwidth part to monitor for radio link management in addition to the first bandwidth part, the second bandwidth part associated with a second beam, and determine a configuration of a second radio link monitoring reference signal for the second bandwidth part based on the configuration for the first radio link monitoring reference signal and a frequency offset associated with the second bandwidth part. The communication manager 1310 may also receive an indication of a type of beam failure recovery procedure, determine a set of bandwidth parts to monitor based on the type of beam failure recovery procedure, the set of bandwidth parts including a bandwidth part associated with a failed beam between the UE and a base station, determine, based on monitoring the set of bandwidth parts, a subset of bandwidth parts from the set of bandwidth parts for the beam failure recovery procedure, and attempt, as part of the beam failure recovery procedure, a random access procedure over a bandwidth part of the subset of bandwidth parts. The communication manager 1310 may also communicate to the base station an indication that the configuration information for the first connection has been saved, establish a second connection with the base station based on the saved configuration information for the first connection and communicating the indication, save configuration information for the first connection based on detecting the radio link failure, and detect that radio link failure has occurred for a first connection between the UE and a base station. The communication manager 1310 may also determine that a radio link monitoring reference signal for a set of bandwidth parts includes multiple signals, determine a radio link failure status for a base station based on the qualities of the multiple signals of the radio link monitoring reference signal, monitor the set of bandwidth parts for the radio link monitoring reference signal, and measure a quality of each signal of the multiple signals of the radio link monitoring reference signal.

The transceiver 1315 may communicate bi-directionally, via one or more antennas, wired, or wireless links as described above. For example, the transceiver 1315 may represent a wireless transceiver and may communicate bi-directionally with another wireless transceiver. The transceiver 1315 may also include a modem to modulate the packets and provide the modulated packets to the antennas for transmission, and to demodulate packets received from the antennas.

In some cases, the wireless device may include a single antenna 1320. However, in some cases the device may have more than one antenna 1320, which may be capable of concurrently transmitting or receiving multiple wireless transmissions.

The memory 1325 may include RAM and ROM. The memory 1325 may store computer-readable, computer-executable code 1330 including instructions that, when executed, cause the processor to perform various functions described herein. In some cases, the memory 1325 may contain, among other things, a BIOS which may control basic hardware or software operation such as the interaction with peripheral components or devices.

The code 1330 may include instructions to implement aspects of the present disclosure, including instructions to support wireless communications. The code 1330 may be stored in a non-transitory computer-readable medium such as system memory or other type of memory. In some cases, the code 1330 may not be directly executable by the processor 1335 but may cause a computer (e.g., when compiled and executed) to perform functions described herein.

The processor 1335 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1335 may be configured to operate a memory array using a memory controller. In other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting techniques for radio link management).

Figure 14:
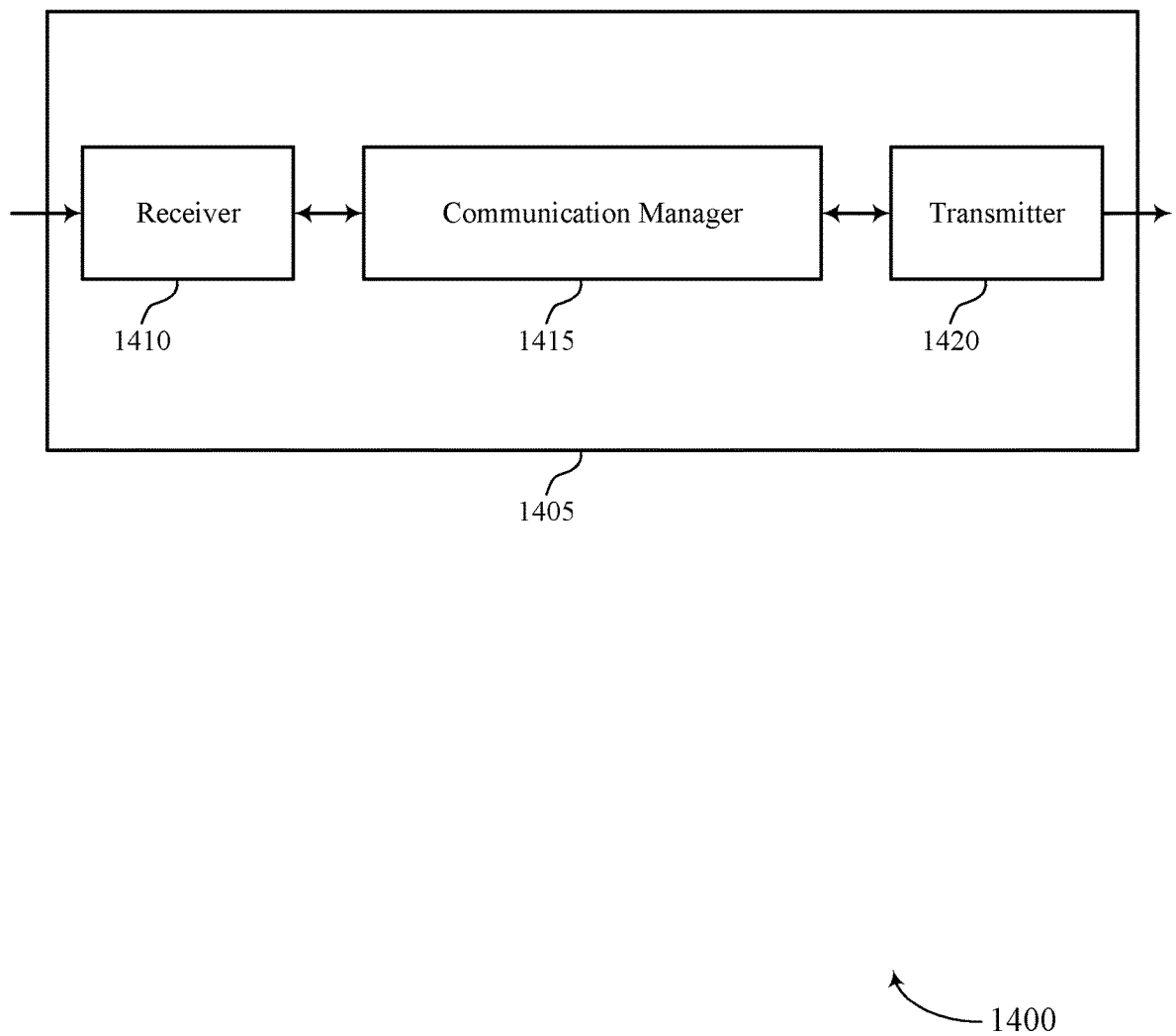
FIGS. 14 and 15 show block diagrams of devices that support techniques for radio link management in accordance with aspects of the present disclosure.

FIG. 14 shows a block diagram 1400 of a device 1405 that supports techniques for radio link management in accordance with aspects of the present disclosure. The device 1405 may be an example of aspects of a base station 105 as described herein. The device 1405 may include a receiver 1410, a communication manager 1415, and a transmitter 1420.

The device 1405 may also include a processor. Each of these components may be in communication with one another (e.g., via one or more buses).

The receiver 1410 may receive information such as packets, user data, or control information associated with various information channels (e.g., control channels, data channels, and information related to techniques for radio link management, etc.). Information may be passed on to other components of the device 1405. The receiver 1410 may be an example of aspects of the transceiver 1720 described with reference to FIG. 17. The receiver 1410 may utilize a single antenna or a set of antennas.

The communication manager 1415 may transmit, to a UE, a first message including a first configuration of a radio link monitoring reference signal for a first bandwidth part associated with a first beam, transmit, to the UE, a second message including an identifier for the second bandwidth part the UE is to monitor, determine a second bandwidth part the UE is to monitor, in addition to the first bandwidth part, for radio link management, the second bandwidth part associated with a second beam, and transmit a first radio link reference signal with the first configuration over the first beam and a second radio link reference signal with a second configuration over the second beam, where the first configuration and the second configuration are the same except for a frequency offset.

The communication manager 1415 may also transmit to a UE an indication of a type of beam failure recovery procedure, transmit to the UE an indication of a set of bandwidth parts the UE is to monitor as part of the beam failure recovery procedure, the set of bandwidth parts including a bandwidth part associated with an active beam between the UE and the base station, receive a random access message from the UE over a bandwidth part in the set of bandwidth parts, and establish a connection with the UE over the bandwidth part based on a random access procedure triggered by the random access message.

The communication manager 1415 may also determine the configuration information for the previous connection based on the indication and an identifier of the UE, receive, from a UE during a random access procedure, an indication that the UE has saved configuration information for a previous connection between the UE and the base station, and establish a second connection with the UE based on the configuration for the previous connection.

The communication manager 1415 may also determine a set of bandwidth parts for a UE to monitor for radio link management, transmit a radio link monitoring reference signal for the set of bandwidth parts, the radio link monitoring reference signal including multiple signals, and transmit an indication of the set of bandwidth parts to the UE. The communication manager 1415 may be an example of aspects of the communication manager 1710 described herein.

By including or configuring the communication manager 1415 in accordance with examples as described herein, the device 1405 may support techniques for efficient utilization of communication resources, improved communication reliability, and reduced processing.

The communication manager 1415, or its sub-components, may be implemented in hardware, code (e.g., software or firmware) executed by a processor, or any combination thereof. If implemented in code executed by a processor, the functions of the communication manager 1415, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communication manager 1415, or its sub-components, may be physically located at various positions, including being distributed such that portions of functions are implemented at different physical locations by one or more physical components. In some examples, the communication manager 1415, or its sub-components, may be a separate and distinct component in accordance with various aspects of the present disclosure. In some examples, the communication manager 1415, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
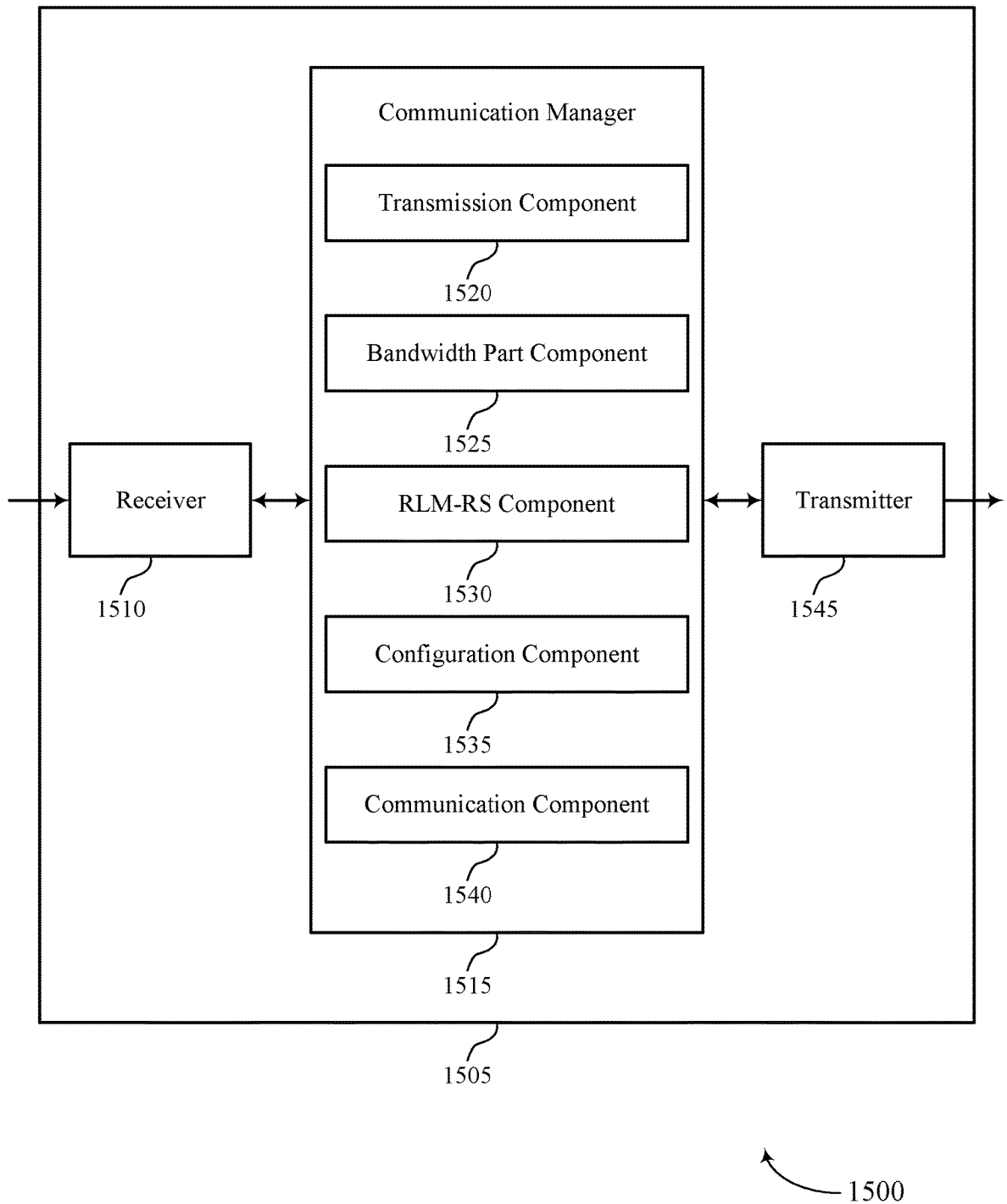

FIG. 15 shows a block diagram 1500 of a device 1505 that supports techniques for radio link management in accordance with aspects of the present disclosure. The device 1505 may be an example of aspects of a device 1405, or a base station 105 as described herein. The device 1505 may include a receiver 1510, a communication manager 1515, and a transmitter 1545. The device 1505 may also include a processor. Each of these components may be in communication with one another (e.g., via one or more buses).

The receiver 1510 may receive information such as packets, user data, or control information associated with various information channels (e.g., control channels, data channels, and information related to techniques for radio link management, etc.). Information may be passed on to other components of the device 1505. The receiver 1510 may be an example of aspects of the transceiver 1720 described with reference to FIG. 17. The receiver 1510 may utilize a single antenna or a set of antennas.

The communication manager 1515 may be an example of aspects of the communication manager 1415 as described herein. The communication manager 1515 may include a transmission component 1520, a bandwidth part component 1525, an RLM-RS component 1530, a configuration component 1535, and a communication component 1540. The communication manager 1515 may be an example of aspects of the communication manager 1710 described herein.

The transmission component 1520 may transmit, to a UE, a first message including a first configuration of a radio link monitoring reference signal for a first bandwidth part associated with a first beam and transmit, to the UE, a second message including an identifier for the second bandwidth part the UE is to monitor. The bandwidth part component 1525 may determine a second bandwidth part the UE is to monitor, in addition to the first bandwidth part, for radio link management, the second bandwidth part associated with a second beam. The RLM-RS component 1530 may transmit a first radio link reference signal with the first configuration over the first beam and a second radio link reference signal with a second configuration over the second beam, where the first configuration and the second configuration are the same except for a frequency offset.

The communication component 1540 may transmit to a UE an indication of a type of beam failure recovery procedure, transmit to the UE an indication of a set of bandwidth parts the UE is to monitor as part of the beam failure recovery procedure, the set of bandwidth parts including a bandwidth part associated with an active beam between the UE and the base station, receive a random access message from the UE over a bandwidth part in the set of bandwidth parts, and establish a connection with the UE over the bandwidth part based on a random access procedure triggered by the random access message. The communication component 1540 may receive, from a UE during a random access procedure, an indication that the UE has saved configuration information for a previous connection between the UE and the base station and establish a second connection with the UE based on the configuration for the previous connection.

The configuration component 1535 may determine the configuration information for the previous connection based on the indication and an identifier of the UE. The RLM-RS component 1530 may transmit a radio link monitoring reference signal for the set of bandwidth parts, the radio link monitoring reference signal including multiple signals. The communication component 1540 may transmit an indication of the set of bandwidth parts to the UE. The bandwidth part component 1525 may determine a set of bandwidth parts for a UE to monitor for radio link management.

The transmitter 1545 may transmit signals generated by other components of the device 1505. In some examples, the transmitter 1545 may be collocated with a receiver 1510 in a transceiver module. For example, the transmitter 1545 may be an example of aspects of the transceiver 1720 described with reference to FIG. 17. The transmitter 1545 may utilize a single antenna or a set of antennas.

Figure 16:
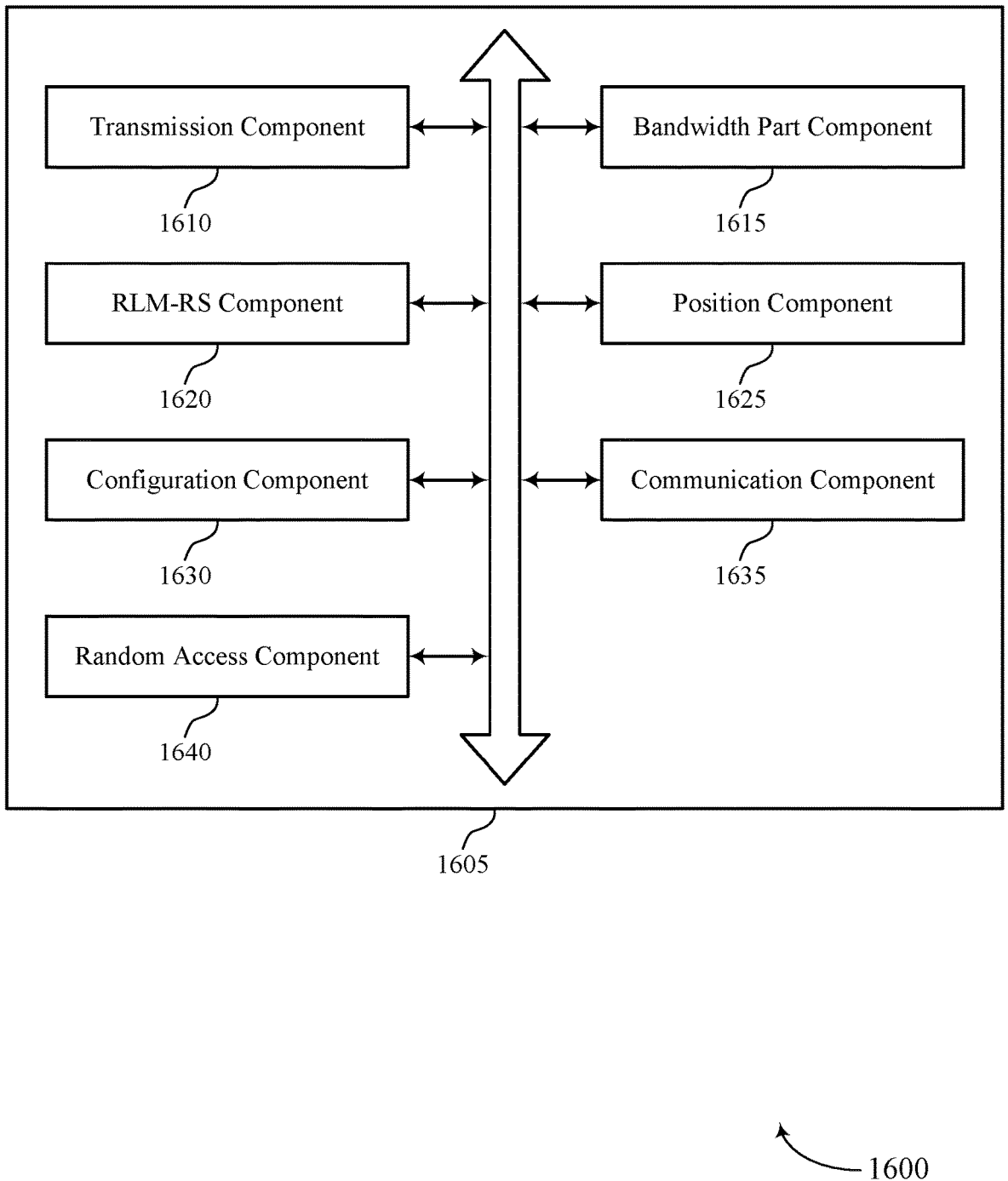
FIG. 16 shows a block diagram of a communication manager that supports techniques for radio link management in accordance with aspects of the present disclosure.

FIG. 16 shows a block diagram 1600 of a communication manager 1605 that supports techniques for radio link management in accordance with aspects of the present disclosure. The communication manager 1605 may be an example of aspects of a communication manager 1415, a communication manager 1515, or a communication manager 1710 described herein. The communication manager 1605 may include a transmission component 1610, a bandwidth part component 1615, an RLM-RS component 1620, a position component 1625, a configuration component 1630, a communication component 1635, and a random access component 1640. Each of these modules may communicate, directly or indirectly, with one another (e.g., via one or more buses).

The transmission component 1610 may transmit, to a UE, a first message including a first configuration of a radio link monitoring reference signal for a first bandwidth part associated with a first beam. In some examples, the transmission component 1610 may transmit, to the UE, a second message including an identifier for the second bandwidth part the UE is to monitor. In some examples, the transmission component 1610 may transmit an indication of the frequency offset to the UE. In some examples, the transmission component 1610 may transmit an indication of a type of radio link monitoring reference signal for the first bandwidth part, where the type applies to the first radio link reference signal and the second radio link reference signal.

The bandwidth part component 1615 may determine a second bandwidth part the UE is to monitor, in addition to the first bandwidth part, for radio link management, the second bandwidth part associated with a second beam. In some examples, the bandwidth part component 1615 may determine a set of bandwidth parts for a UE to monitor for radio link management. In some examples, the bandwidth part component 1615 may determine a frequency difference between the first bandwidth part and the second bandwidth part, where the frequency offset is determined based on the frequency difference. In some examples, the bandwidth part component 1615 may determine the set of bandwidth parts based on location of the UE relative to coverage areas of beams associated with the set of bandwidth parts.

In some examples, the bandwidth part component 1615 may determine that the UE is within a threshold proximity of the coverage areas associated with the set of bandwidth parts, where the set of bandwidth parts is determined based on determining that the UE is within the threshold proximity. In some examples, the bandwidth part component 1615 may determine a speed of the UE, a trajectory of the UE, or a combination thereof, where the set of bandwidth parts is determined based on the speed of the UE, the trajectory of the UE, or the combination thereof.

The RLM-RS component 1620 may transmit a first radio link reference signal with the first configuration over the first beam and a second radio link reference signal with a second configuration over the second beam, where the first configuration and the second configuration are the same except for a frequency offset. In some examples, the RLM-RS component 1620 may transmit a radio link monitoring reference signal for the set of bandwidth parts, the radio link monitoring reference signal including multiple signals.

In some examples, the RLM-RS component 1620 may transmit the multiple radio link monitoring reference signals associated with each bandwidth part over that bandwidth part. In some examples, the RLM-RS component 1620 may multiplex the multiple signals in the time domain or the frequency domain before transmitting the radio link monitoring reference signal. In some cases, the multiple signals include one or more synchronization signal block (SSB) signals, one or more CSI reference signals (CSI-RS), or a combination thereof.

The configuration component 1630 may determine the configuration information for the previous connection based on the indication and an identifier of the UE. In some examples, transmit a configuration for the second bandwidth part to the UE, where the configuration includes the indication of the frequency offset. In some examples, the configuration component 1630 may determine the configuration information for the UE based on the configuration information being associated with the identifier of the UE. In some examples, the configuration component 1630 may determine the configuration information for the UE based on the configuration information being associated with the identifier of base station or the identifier of the cell associated with the base station.

In some cases, the configuration information includes a radio bearer configuration, a radio bearer state variable, a MAC configuration, a MAC state variable, a master cell group secondary cell configuration, or a cell configuration, or a combination thereof.

The communication component 1635 may transmit to a UE an indication of a type of beam failure recovery procedure. In some examples, the communication component 1635 may transmit to the UE an indication of a set of bandwidth parts the UE is to monitor as part of the beam failure recovery procedure, the set of bandwidth parts including a bandwidth part associated with an active beam between the UE and the base station. In some examples, the communication component 1635 may receive a random access message from the UE over a bandwidth part in the set of bandwidth parts. In some examples, the communication component 1635 may establish a connection with the UE over the bandwidth part based on a random access procedure triggered by the random access message.

In some examples, the communication component 1635 may receive, from a UE during a random access procedure, an indication that the UE has saved configuration information for a previous connection between the UE and the base station. In some examples, the communication component 1635 may establish a second connection with the UE based on the configuration for the previous connection. In some examples, the communication component 1635 may transmit an indication of the set of bandwidth parts to the UE. In some examples, the communication component 1635 may receive from the UE a message, where the indication is included in the message. In some cases, the indication is a bit.

The position component 1625 may determine that the UE is within a threshold proximity of a coverage area of the second beam, where the second bandwidth part is determined based on determining that the UE is within the threshold proximity of the coverage area of the second beam. The random access component 1640 may determine a unique PRACH sequence for each of the multiple radio link monitoring reference signals associated with the bandwidth part, where the random access message includes a PRACH sequence for one of the radio link monitoring reference signals associated with the bandwidth part. In some examples, the random access component 1640 may determine a beam selected by the UE based on a PRACH sequence included in the random access message and the bandwidth part over which the random access is received. In some examples, receiving the identifier of the UE during the random access procedure, where the identifier includes an identifier the UE used to establish the previous connection.

Figure 17:
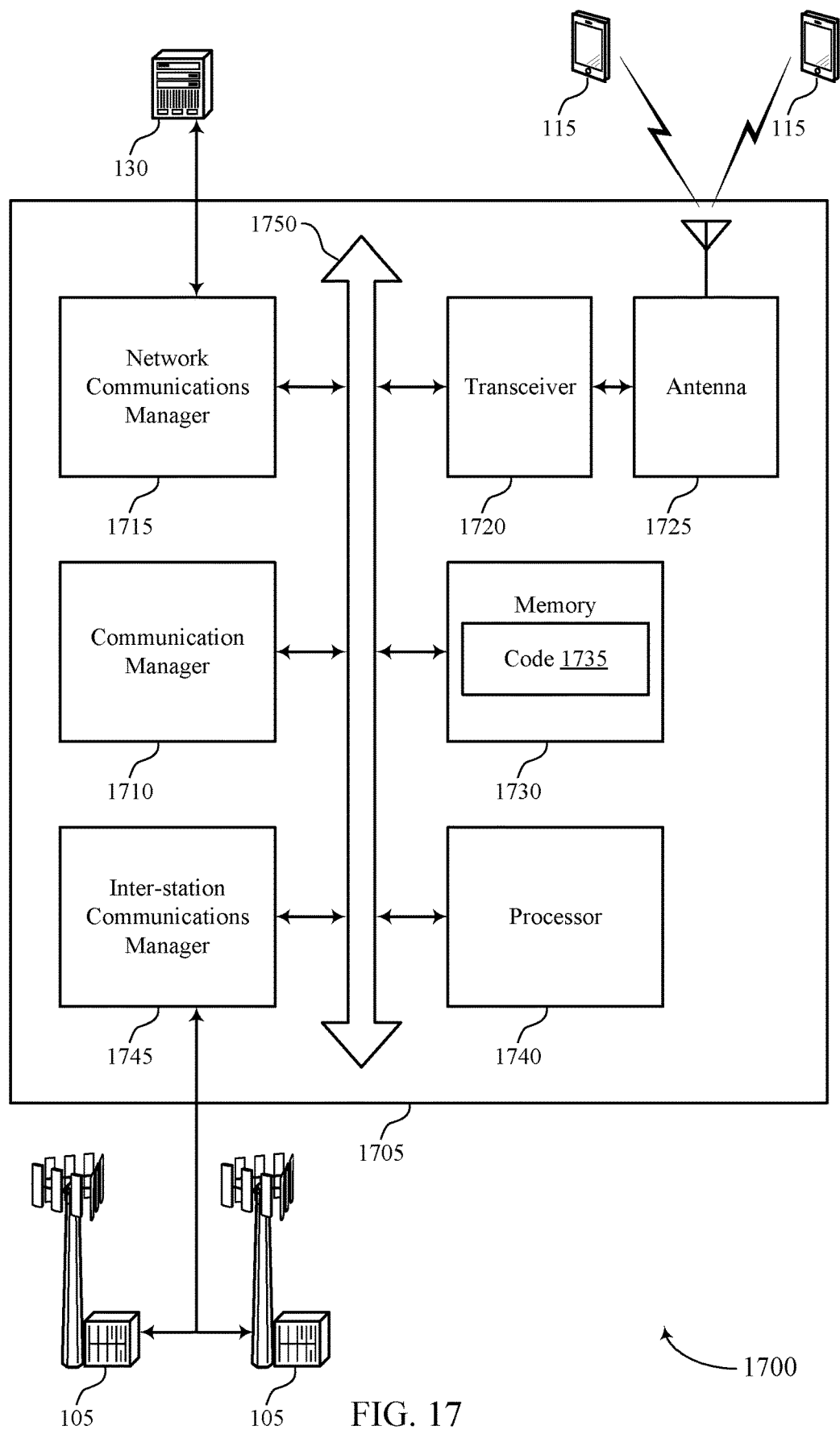
FIG. 17 shows a diagram of a system including a device that supports techniques for radio link management in accordance with aspects of the present disclosure.

FIG. 17 shows a diagram of a system 1700 including a device 1705 that supports techniques for radio link management in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communication manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communication manager 1710 may transmit, to a UE, a first message including a first configuration of a radio link monitoring reference signal for a first bandwidth part associated with a first beam, transmit, to the UE, a second message including an identifier for the second bandwidth part the UE is to monitor, determine a second bandwidth part the UE is to monitor, in addition to the first bandwidth part, for radio link management, the second bandwidth part associated with a second beam, and transmit a first radio link reference signal with the first configuration over the first beam and a second radio link reference signal with a second configuration over the second beam, where the first configuration and the second configuration are the same except for a frequency offset.

The communication manager 1710 may also transmit to a UE an indication of a type of beam failure recovery procedure, transmit to the UE an indication of a set of bandwidth parts the UE is to monitor as part of the beam failure recovery procedure, the set of bandwidth parts including a bandwidth part associated with an active beam between the UE and the base station, receive a random access message from the UE over a bandwidth part in the set of bandwidth parts, and establish a connection with the UE over the bandwidth part based on a random access procedure triggered by the random access message.

The communication manager 1710 may also determine the configuration information for the previous connection based on the indication and an identifier of the UE, receive, from a UE during a random access procedure, an indication that the UE has saved configuration information for a previous connection between the UE and the base station, and establish a second connection with the UE based on the configuration for the previous connection.

The communication manager 1710 may also determine a set of bandwidth parts for a UE to monitor for radio link management, transmit a radio link monitoring reference signal for the set of bandwidth parts, the radio link monitoring reference signal including multiple signals, and transmit an indication of the set of bandwidth parts to the UE.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM and ROM. The memory 1730 may store computer-readable, computer-executable code 1735 including instructions that, when executed, cause the processor to perform various functions described herein. In some cases, the memory 1730 may contain, among other things, a BIOS which may control basic hardware or software operation such as the interaction with peripheral components or devices.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting techniques for radio link management).

The inter-station communications manager 1745 may manage communications with other base station 105 and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

Figure 18:
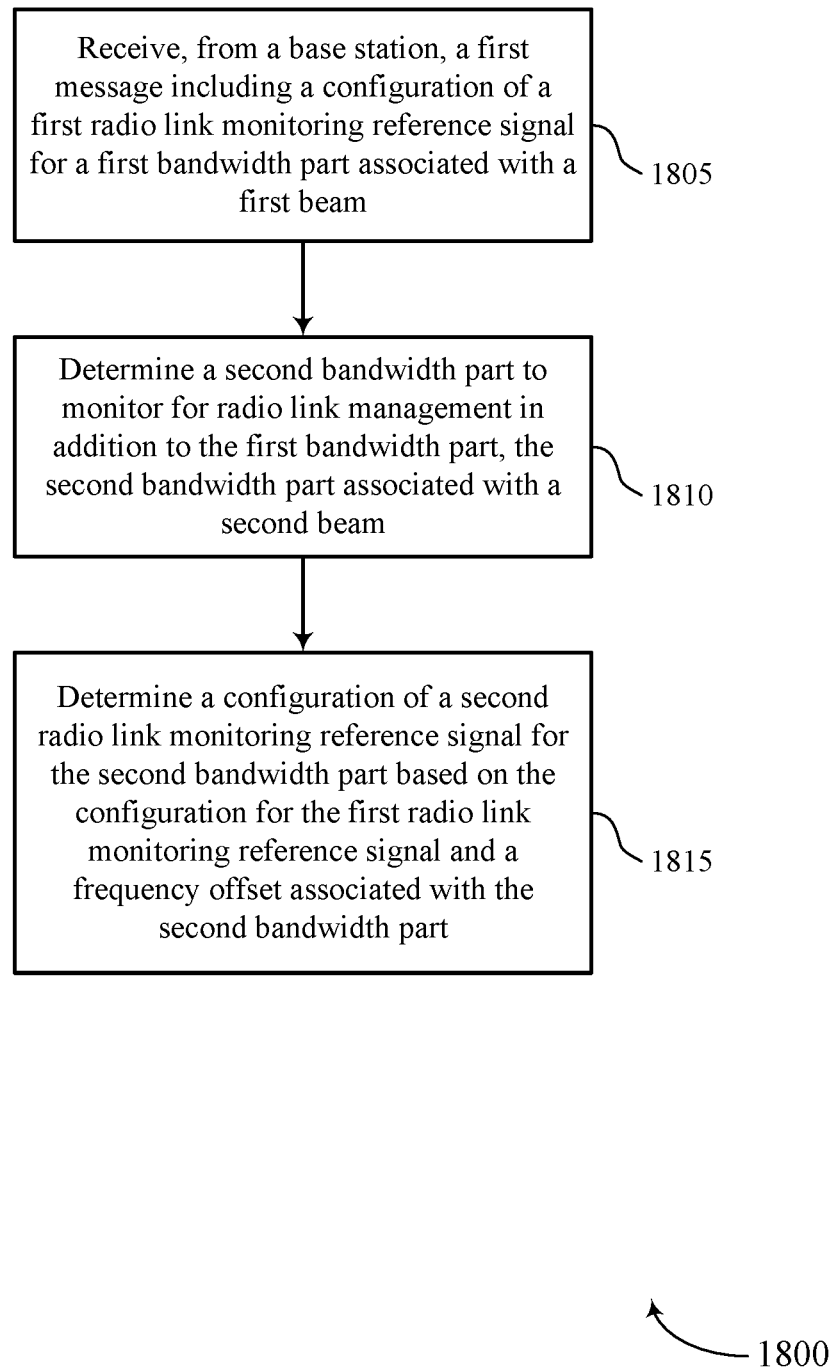
FIGS. 18 through 25 show flowcharts illustrating methods that support techniques for radio link management in accordance with aspects of the present disclosure.

FIG. 18 shows a flowchart illustrating a method 1800 that supports techniques for radio link management in accordance with aspects of the present disclosure. The operations of method 1800 may be implemented by a UE 115 or its components as described herein. For example, the operations of method 1800 may be performed by a communication manager as described with reference to FIGS. 10 through 13. In some examples, a UE may execute a set of instructions to control the functional elements of the UE to perform the described functions. Additionally or alternatively, a UE may perform aspects of the described functions using special-purpose hardware.

At 1805, the UE may receive, from a base station, a first message including a configuration of a first radio link monitoring reference signal for a first bandwidth part associated with a first beam. The operations of 1805 may be performed according to the methods described herein. In some examples, aspects of the operations of 1805 may be performed by a communication component as described with reference to FIGS. 10 through 13.

At 1810, the UE may determine a second bandwidth part to monitor for radio link management in addition to the first bandwidth part, the second bandwidth part associated with a second beam. The operations of 1810 may be performed according to the methods described herein. In some examples, aspects of the operations of 1810 may be performed by a bandwidth part component as described with reference to FIGS. 10 through 13.

At 1815, the UE may determine a configuration of a second radio link monitoring reference signal for the second bandwidth part based on the configuration for the first radio link monitoring reference signal and a frequency offset associated with the second bandwidth part. The operations of 1815 may be performed according to the methods described herein. In some examples, aspects of the operations of 1815 may be performed by a configuration component as described with reference to FIGS. 10 through 13.

Figure 19:
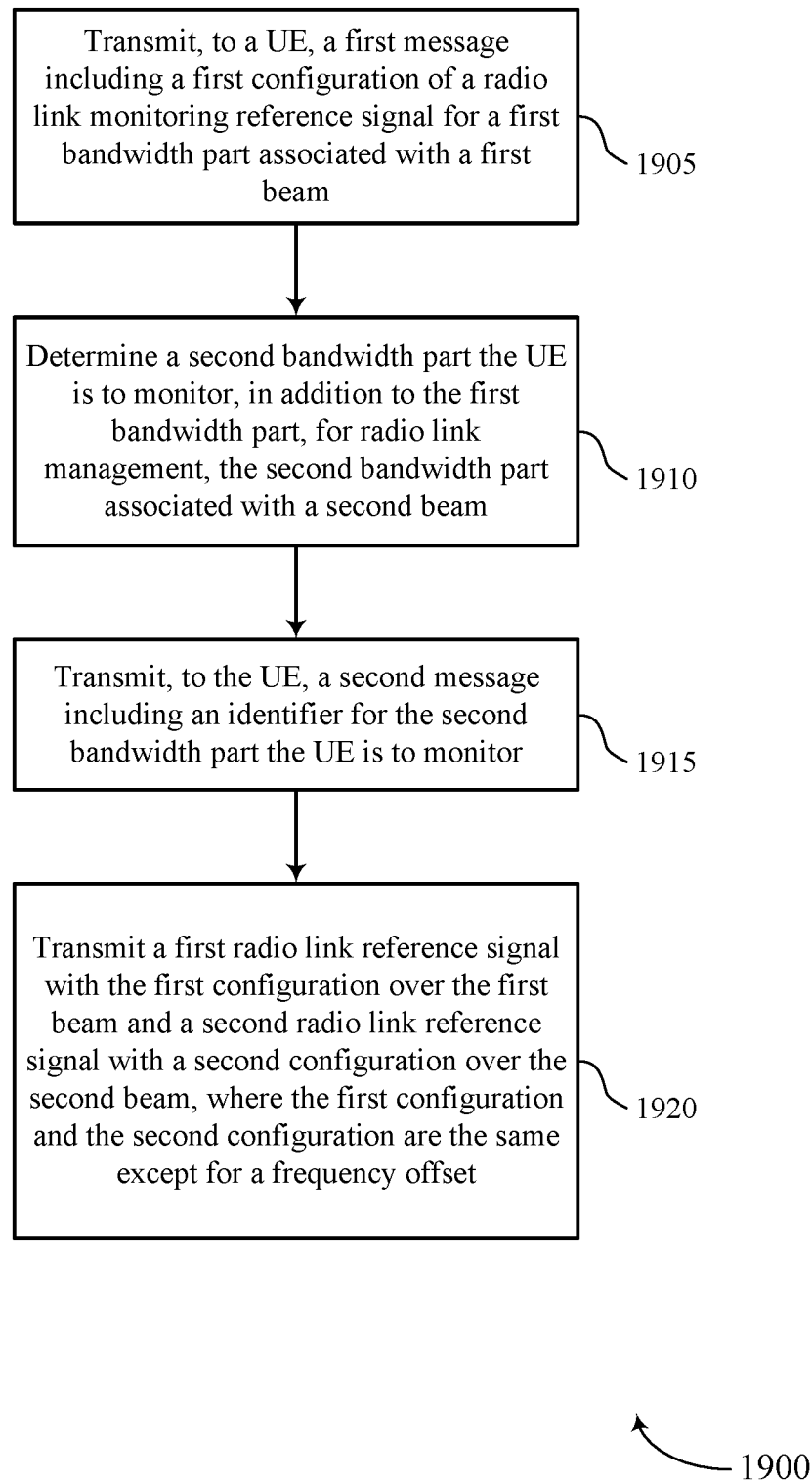

FIG. 19 shows a flowchart illustrating a method 1900 that supports techniques for radio link management in accordance with aspects of the present disclosure. The operations of method 1900 may be implemented by a base station 105 or its components as described herein. For example, the operations of method 1900 may be performed by a communication manager as described with reference to FIGS. 14 through 17. In some examples, a base station may execute a set of instructions to control the functional elements of the base station to perform the described functions. Additionally or alternatively, a base station may perform aspects of the described functions using special-purpose hardware.

At 1905, the base station may transmit, to a UE, a first message including a first configuration of a radio link monitoring reference signal for a first bandwidth part associated with a first beam. The operations of 1905 may be performed according to the methods described herein. In some examples, aspects of the operations of 1905 may be performed by a transmission component as described with reference to FIGS. 14 through 17.

At 1910, the base station may determine a second bandwidth part the UE is to monitor, in addition to the first bandwidth part, for radio link management, the second bandwidth part associated with a second beam. The operations of 1910 may be performed according to the methods described herein. In some examples, aspects of the operations of 1910 may be performed by a bandwidth part component as described with reference to FIGS. 14 through 17.

At 1915, the base station may transmit, to the UE, a second message including an identifier for the second bandwidth part the UE is to monitor. The operations of 1915 may be performed according to the methods described herein. In some examples, aspects of the operations of 1915 may be performed by a transmission component as described with reference to FIGS. 14 through 17.

At 1920, the base station may transmit a first radio link reference signal with the first configuration over the first beam and a second radio link reference signal with a second configuration over the second beam, where the first configuration and the second configuration are the same except for a frequency offset. The operations of 1920 may be performed according to the methods described herein. In some examples, aspects of the operations of 1920 may be performed by an RLM-RS component as described with reference to FIGS. 14 through 17.

Figure 20:
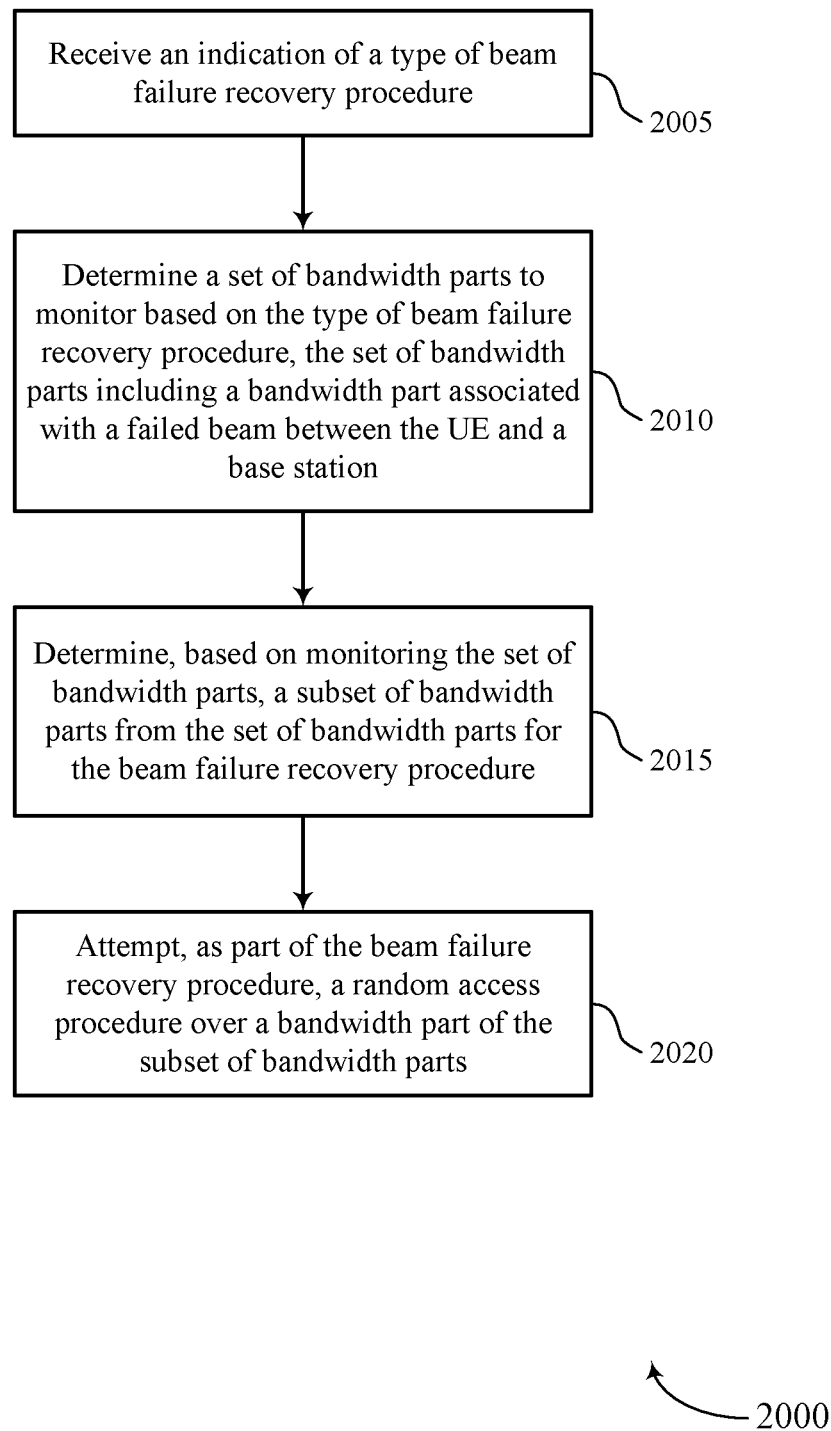

FIG. 20 shows a flowchart illustrating a method 2000 that supports techniques for radio link management in accordance with aspects of the present disclosure. The operations of method 2000 may be implemented by a UE 115 or its components as described herein. For example, the operations of method 2000 may be performed by a communication manager as described with reference to FIGS. 10 through 13. In some examples, a UE may execute a set of instructions to control the functional elements of the UE to perform the described functions. Additionally or alternatively, a UE may perform aspects of the described functions using special-purpose hardware.

At 2005, the UE may receive an indication of a type of beam failure recovery procedure. The operations of 2005 may be performed according to the methods described herein. In some examples, aspects of the operations of 2005 may be performed by a communication component as described with reference to FIGS. 10 through 13.

At 2010, the UE may determine a set of bandwidth parts to monitor based on the type of beam failure recovery procedure, the set of bandwidth parts including a bandwidth part associated with a failed beam between the UE and a base station. The operations of 2010 may be performed according to the methods described herein. In some examples, aspects of the operations of 2010 may be performed by a bandwidth part component as described with reference to FIGS. 10 through 13.

At 2015, the UE may determine, based on monitoring the set of bandwidth parts, a subset of bandwidth parts from the set of bandwidth parts for the beam failure recovery procedure. The operations of 2015 may be performed according to the methods described herein. In some examples, aspects of the operations of 2015 may be performed by a bandwidth part component as described with reference to FIGS. 10 through 13.

At 2020, the UE may attempt, as part of the beam failure recovery procedure, a random access procedure over a bandwidth part of the subset of bandwidth parts. The operations of 2020 may be performed according to the methods described herein. In some examples, aspects of the operations of 2020 may be performed by a BFR component as described with reference to FIGS. 10 through 13.

Figure 21:
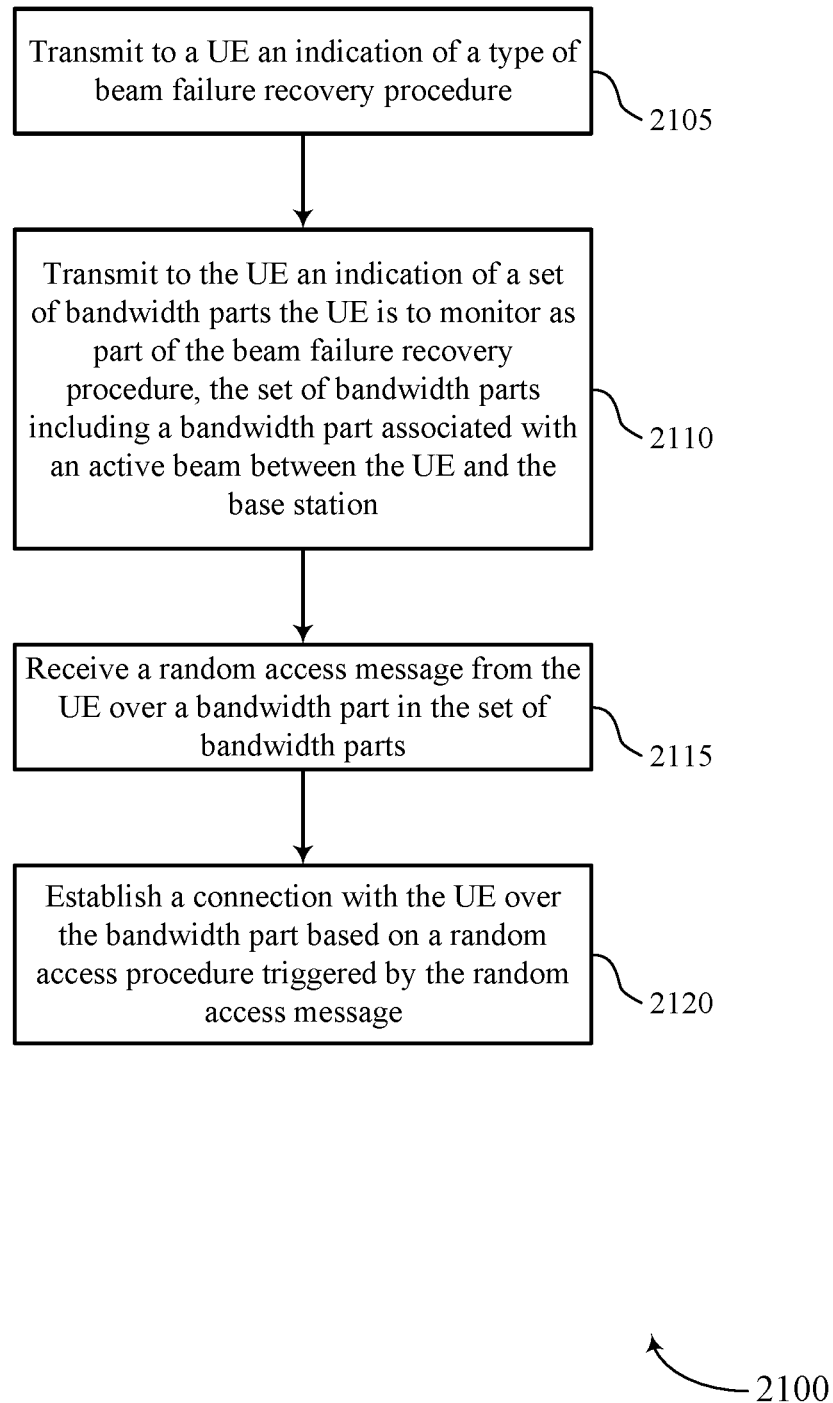

FIG. 21 shows a flowchart illustrating a method 2100 that supports techniques for radio link management in accordance with aspects of the present disclosure. The operations of method 2100 may be implemented by a base station 105 or its components as described herein. For example, the operations of method 2100 may be performed by a communication manager as described with reference to FIGS. 14 through 17. In some examples, a base station may execute a set of instructions to control the functional elements of the base station to perform the described functions. Additionally or alternatively, a base station may perform aspects of the described functions using special-purpose hardware.

At 2105, the base station may transmit to a UE an indication of a type of beam failure recovery procedure. The operations of 2105 may be performed according to the methods described herein. In some examples, aspects of the operations of 2105 may be performed by a communication component as described with reference to FIGS. 14 through 17.

At 2110, the base station may transmit to the UE an indication of a set of bandwidth parts the UE is to monitor as part of the beam failure recovery procedure, the set of bandwidth parts including a bandwidth part associated with an active beam between the UE and the base station. The operations of 2110 may be performed according to the methods described herein. In some examples, aspects of the operations of 2110 may be performed by a communication component as described with reference to FIGS. 14 through 17.

At 2115, the base station may receive a random access message from the UE over a bandwidth part in the set of bandwidth parts. The operations of 2115 may be performed according to the methods described herein. In some examples, aspects of the operations of 2115 may be performed by a communication component as described with reference to FIGS. 14 through 17.

At 2120, the base station may establish a connection with the UE over the bandwidth part based on a random access procedure triggered by the random access message. The operations of 2120 may be performed according to the methods described herein. In some examples, aspects of the operations of 2120 may be performed by a communication component as described with reference to FIGS. 14 through 17.

Figure 22:
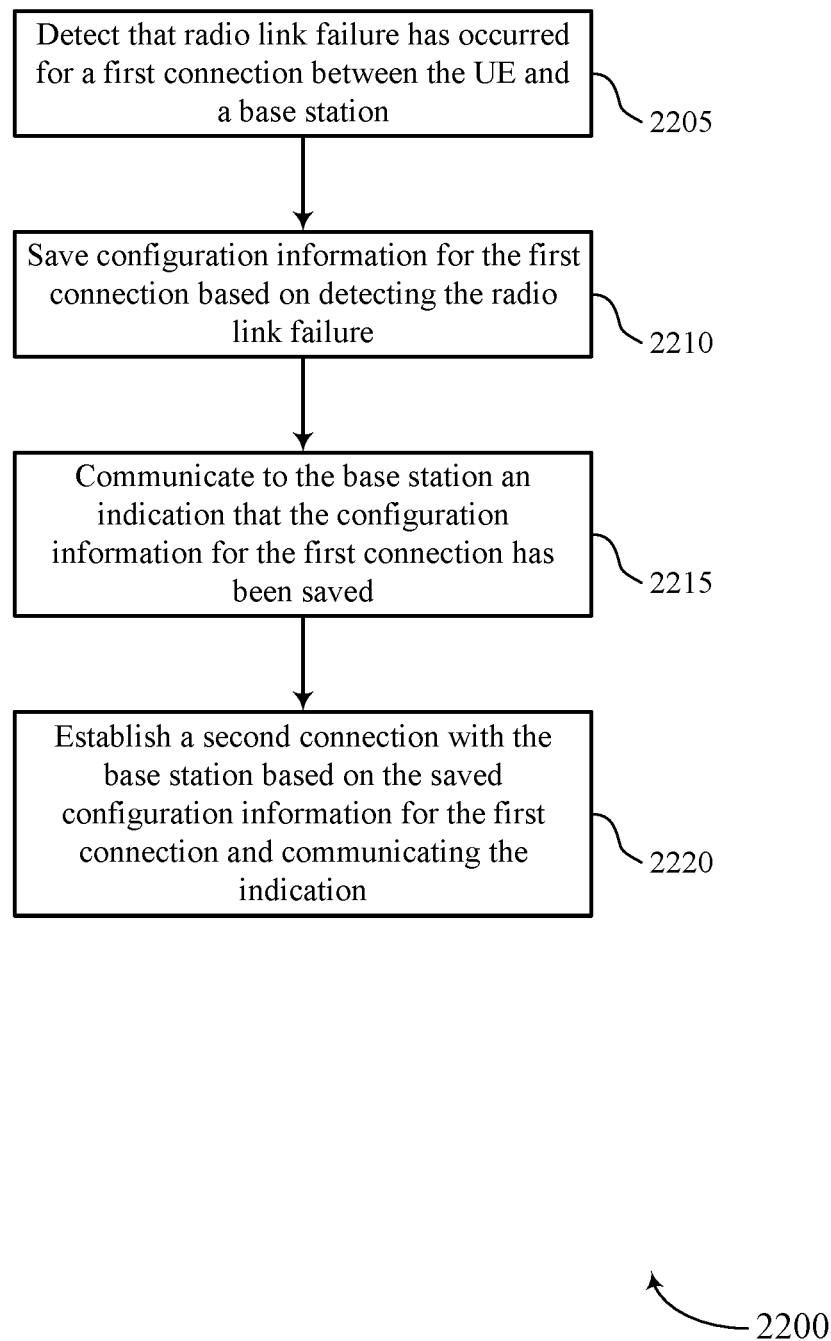

FIG. 22 shows a flowchart illustrating a method 2200 that supports techniques for radio link management in accordance with aspects of the present disclosure. The operations of method 2200 may be implemented by a UE 115 or its components as described herein. For example, the operations of method 2200 may be performed by a communication manager as described with reference to FIGS. 10 through 13. In some examples, a UE may execute a set of instructions to control the functional elements of the UE to perform the described functions. Additionally or alternatively, a UE may perform aspects of the described functions using special-purpose hardware.

At 2205, the UE may detect that radio link failure has occurred for a first connection between the UE and a base station. The operations of 2205 may be performed according to the methods described herein. In some examples, aspects of the operations of 2205 may be performed by an RLF component as described with reference to FIGS. 10 through 13.

At 2210, the UE may save configuration information for the first connection based on detecting the radio link failure. The operations of 2210 may be performed according to the methods described herein. In some examples, aspects of the operations of 2210 may be performed by a configuration component as described with reference to FIGS. 10 through 13.

At 2215, the UE may communicate to the base station an indication that the configuration information for the first connection has been saved. The operations of 2215 may be performed according to the methods described herein. In some examples, aspects of the operations of 2215 may be performed by a communication component as described with reference to FIGS. 10 through 13.

At 2220, the UE may establish a second connection with the base station based on the saved configuration information for the first connection and communicating the indication. The operations of 2220 may be performed according to the methods described herein. In some examples, aspects of the operations of 2220 may be performed by a communication component as described with reference to FIGS. 10 through 13.

Figure 23:
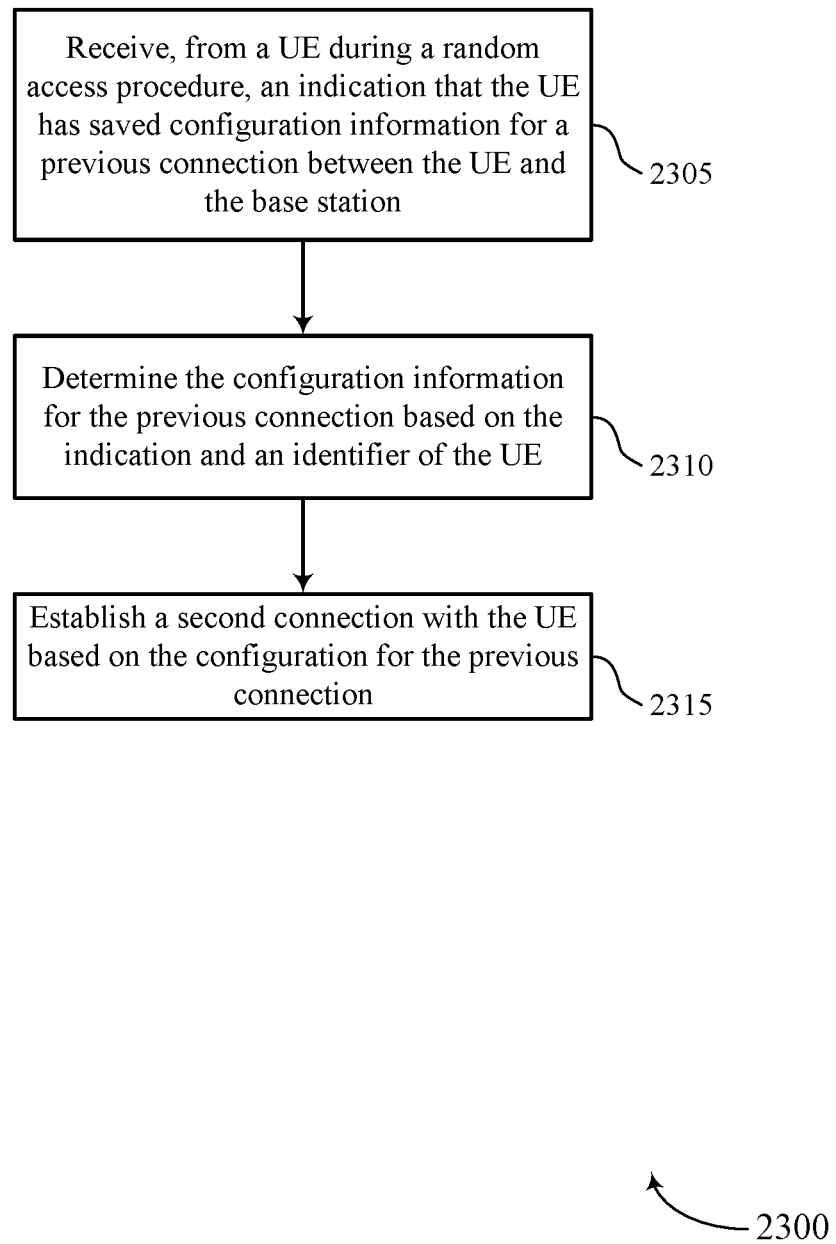

FIG. 23 shows a flowchart illustrating a method 2300 that supports techniques for radio link management in accordance with aspects of the present disclosure. The operations of method 2300 may be implemented by a base station 105 or its components as described herein. For example, the operations of method 2300 may be performed by a communication manager as described with reference to FIGS. 14 through 17. In some examples, a base station may execute a set of instructions to control the functional elements of the base station to perform the described functions. Additionally or alternatively, a base station may perform aspects of the described functions using special-purpose hardware.

At 2305, the base station may receive, from a UE during a random access procedure, an indication that the UE has saved configuration information for a previous connection between the UE and the base station. The operations of 2305 may be performed according to the methods described herein. In some examples, aspects of the operations of 2305 may be performed by a communication component as described with reference to FIGS. 14 through 17.

At 2310, the base station may determine the configuration information for the previous connection based on the indication and an identifier of the UE. The operations of 2310 may be performed according to the methods described herein. In some examples, aspects of the operations of 2310 may be performed by a configuration component as described with reference to FIGS. 14 through 17.

At 2315, the base station may establish a second connection with the UE based on the configuration for the previous connection. The operations of 2315 may be performed according to the methods described herein. In some examples, aspects of the operations of 2315 may be performed by a communication component as described with reference to FIGS. 14 through 17.

Figure 24:
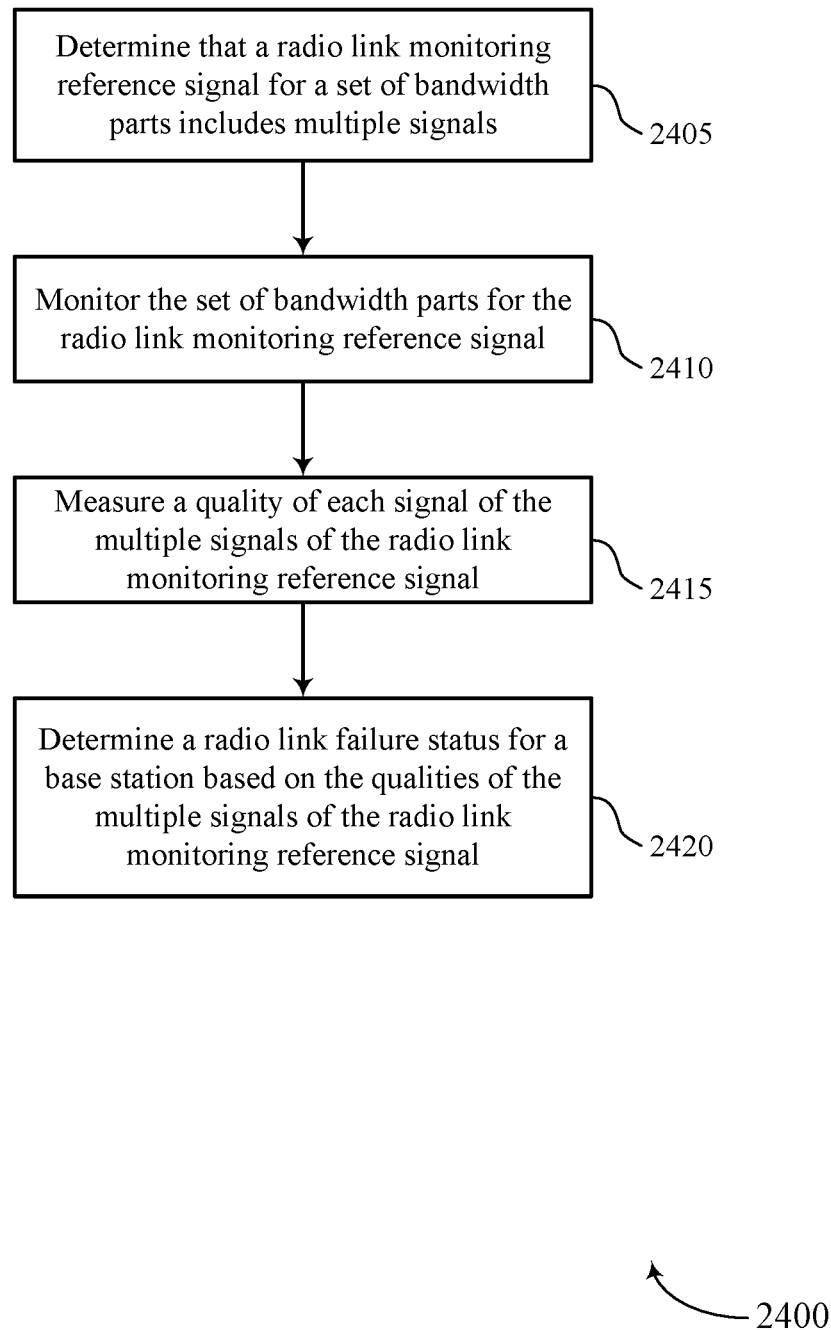

FIG. 24 shows a flowchart illustrating a method 2400 that supports techniques for radio link management in accordance with aspects of the present disclosure. The operations of method 2400 may be implemented by a UE 115 or its components as described herein. For example, the operations of method 2400 may be performed by a communication manager as described with reference to FIGS. 10 through 13. In some examples, a UE may execute a set of instructions to control the functional elements of the UE to perform the described functions. Additionally or alternatively, a UE may perform aspects of the described functions using special-purpose hardware.

At 2405, the UE may determine that a radio link monitoring reference signal for a set of bandwidth parts includes multiple signals. The operations of 2405 may be performed according to the methods described herein. In some examples, aspects of the operations of 2405 may be performed by an RLM-RS component as described with reference to FIGS. 10 through 13.

At 2410, the UE may monitor the set of bandwidth parts for the radio link monitoring reference signal. The operations of 2410 may be performed according to the methods described herein. In some examples, aspects of the operations of 2410 may be performed by a monitoring component as described with reference to FIGS. 10 through 13.

At 2415, the UE may measure a quality of each signal of the multiple signals of the radio link monitoring reference signal. The operations of 2415 may be performed according to the methods described herein. In some examples, aspects of the operations of 2415 may be performed by a monitoring component as described with reference to FIGS. 10 through 13.

At 2420, the UE may determine a radio link failure status for a base station based on the qualities of the multiple signals of the radio link monitoring reference signal. The operations of 2420 may be performed according to the methods described herein. In some examples, aspects of the operations of 2420 may be performed by an RLF component as described with reference to FIGS. 10 through 13.

Figure 25:
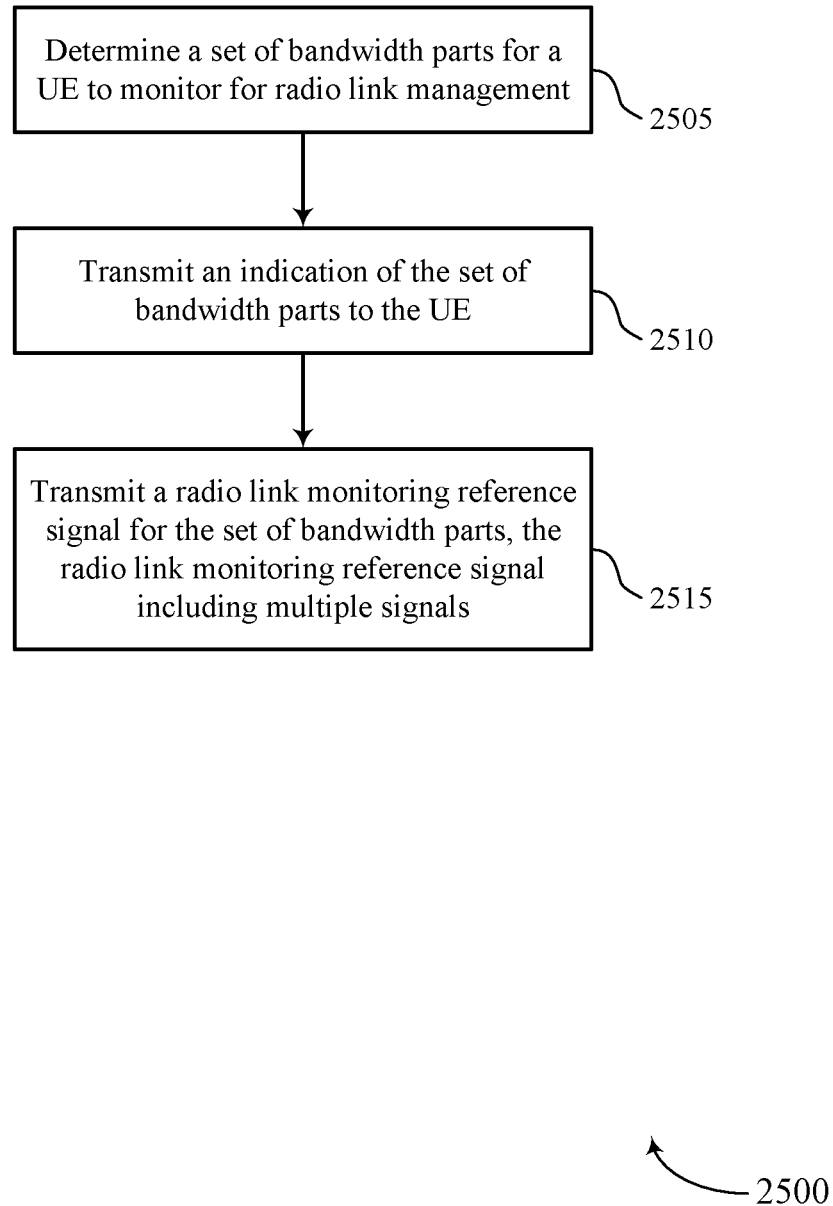

FIG. 25 shows a flowchart illustrating a method 2500 that supports techniques for radio link management in accordance with aspects of the present disclosure. The operations of method 2500 may be implemented by a base station 105 or its components as described herein. For example, the operations of method 2500 may be performed by a communication manager as described with reference to FIGS. 14 through 17. In some examples, a base station may execute a set of instructions to control the functional elements of the base station to perform the described functions. Additionally or alternatively, a base station may perform aspects of the described functions using special-purpose hardware.

At 2505, the base station may determine a set of bandwidth parts for a UE to monitor for radio link management. The operations of 2505 may be performed according to the methods described herein. In some examples, aspects of the operations of 2505 may be performed by a bandwidth part component as described with reference to FIGS. 14 through 17.

At 2510, the base station may transmit an indication of the set of bandwidth parts to the UE. The operations of 2510 may be performed according to the methods described herein. In some examples, aspects of the operations of 2510 may be performed by a communication component as described with reference to FIGS. 14 through 17.

At 2515, the base station may transmit a radio link monitoring reference signal for the set of bandwidth parts, the radio link monitoring reference signal including multiple signals. The operations of 2515 may be performed according to the methods described herein.

In some examples, aspects of the operations of 2515 may be performed by an RLM-RS component as described with reference to FIGS. 14 through 17.

The following provides an overview of aspects of the present disclosure:

Aspect 1: A method for wireless communication at a UE, comprising: receiving, from a base station, a first message comprising a configuration of a first radio link monitoring reference signal for a first bandwidth part associated with a first beam; determining a second bandwidth part to monitor for radio link management in addition to the first bandwidth part, the second bandwidth part associated with a second beam; and determining a configuration of a second radio link monitoring reference signal for the second bandwidth part based at least in part on the configuration for the first radio link monitoring reference signal and a frequency offset associated with the second bandwidth part.

Aspect 2: The method of aspect 77, further comprising: receiving an indication of the second bandwidth part from the base station, wherein the second bandwidth part is determined based at least in part on the indication.

Aspect 3: The method of aspect 78, wherein the indication of the second bandwidth part comprises an identifier for the second bandwidth part.

Aspect 4: The method of any of aspects 77 through 79, further comprising: determining that the UE is within a threshold proximity of a coverage area of the second beam, wherein the second bandwidth part is determined based at least in part on determining that the UE is within the threshold proximity of the coverage area of the second beam.

Aspect 5: The method of any of aspects 77 through 80, further comprising: receiving an indication of the frequency offset from the base station.

Aspect 6: The method of aspect 81, further comprising: receiving a configuration for the second bandwidth part from the base station, wherein the configuration comprises the indication of the frequency offset.

Aspect 7: The method of any of aspects 77 through 82, further comprising: determining a frequency difference between the first bandwidth part and the second bandwidth part, wherein the frequency offset is determined based at least in part on the frequency difference.

Aspect 8: The method of any of aspects 77 through 83, further comprising: receiving from the base station an indication of a type of radio link monitoring reference signal for the first bandwidth part; and determining that the type of radio link monitoring reference signal for the first bandwidth part applies to the second radio link monitoring reference signal for the second bandwidth part.

Aspect 9: A method for wireless communication at a base station, comprising: transmitting, to a UE, a first message comprising a first configuration of a radio link monitoring reference signal for a first bandwidth part associated with a first beam; determining a second bandwidth part the UE is to monitor, in addition to the first bandwidth part, for radio link management, the second bandwidth part associated with a second beam; transmitting, to the UE, a second message comprising an identifier for the second bandwidth part the UE is to monitor; and transmitting a first radio link reference signal with the first configuration over the first beam and a second radio link reference signal with a second configuration over the second beam, wherein the first configuration and the second configuration are the same except for a frequency offset.

Aspect 10: The method of aspect 85, further comprising: determining that the UE is within a threshold proximity of a coverage area of the second beam, wherein the second bandwidth part is determined based at least in part on determining that the UE is within the threshold proximity of the coverage area of the second beam.

Aspect 11: The method of any of aspects 85 through 86, further comprising: transmitting an indication of the frequency offset to the UE.

Aspect 12: The method of aspect 87, further comprising: transmitting a configuration for the second bandwidth part to the UE, wherein the configuration comprises the indication of the frequency offset.

Aspect 13: The method of any of aspects 87 through 88, further comprising: determining a frequency difference between the first bandwidth part and the second bandwidth part, wherein the frequency offset is determined based at least in part on the frequency difference.

Aspect 14: The method of any of aspects 85 through 89, further comprising: transmitting an indication of a type of radio link monitoring reference signal for the first bandwidth part, wherein the type applies to the first radio link reference signal and the second radio link reference signal.

Aspect 15: A method for wireless communication at a UE, comprising: receiving an indication of a type of beam failure recovery procedure; determining a set of bandwidth parts to monitor based at least in part on the type of beam failure recovery procedure, the set of bandwidth parts comprising a bandwidth part associated with a failed beam between the UE and a base station; determining, based at least in part on monitoring the set of bandwidth parts, a subset of bandwidth parts from the set of bandwidth parts for the beam failure recovery procedure; and attempting, as part of the beam failure recovery procedure, a random access procedure over a bandwidth part of the subset of bandwidth parts.

Aspect 16: The method of aspect 91, wherein each bandwidth part in the set of bandwidth parts is associated with multiple respective radio link monitoring reference signals, the method further comprising: determining a quality of each radio link monitoring reference signal associated with the set of bandwidth parts; and comparing the quality of each radio link monitoring reference signal with a threshold quality, wherein the subset of bandwidth parts is determined based at least in part on each bandwidth part in the subset of bandwidth parts being associated with at least one radio link reference signal that satisfies the threshold quality.

Aspect 17: The method of any of aspects 91 through 92, wherein each bandwidth part in the set of bandwidth parts is associated with multiple respective radio link monitoring reference signals, the method further comprising: determining, for each bandwidth part in the set of bandwidth parts, a unique physical random access channel (PRACH) sequence for each radio link monitoring reference signal associated with that bandwidth part.

Aspect 18: The method of aspect 93, wherein attempting the random access procedure comprises: transmitting a message comprising a PRACH sequence for a radio link monitoring reference signal of the bandwidth part that satisfies a threshold quality.

Aspect 19: The method of any of aspects 91 through 94, wherein the random access procedure is attempted using a first transmit power, the method further comprising: determining that the random access procedure has failed; and attempting, as part of the beam failure recovery procedure and based at least in part on determining that the random access procedure has failed, a second random access procedure over the bandwidth part using a second transmit power higher than the first transmit power.

Aspect 20: The method of any of aspects 91 through 95, further comprising: determining that the random access procedure has failed; and attempting, as part of the beam failure recovery procedure and based at least in part on determining that the random access procedure has failed, a second random access procedure over a second bandwidth part of the subset of bandwidth parts.

Aspect 21: The method of any of aspects 91 through 96, further comprising: starting a beam failure recovery timer based at least in part on attempting the beam failure recovery procedure; determining that the beam failure recovery timer has expired; and determining that the beam failure recovery procedure has failed based at least in part on expiry of the beam failure recovery timer.

Aspect 22: The method of any of aspects 91 through 97, further comprising: starting a beam failure recovery timer based at least in part on attempting the beam failure recovery procedure; determining that the random access procedure has been successfully completed; and stopping and resetting the beam failure recovery timer based at least in part on determining that the random access procedure has been successfully completed.

Aspect 23: The method of any of aspects 91 through 98, further comprising: receiving from the base station an indication of the set of bandwidth parts, wherein the set of bandwidth parts is determined based at least in part on the indication.

Aspect 24: The method of any of aspects 91 through 99, further comprising: determining the set of bandwidth parts based at least in part on location of the UE relative to coverage areas of beams associated with the set of bandwidth parts.

Aspect 25: A method for wireless communication at a base station, comprising: transmitting to a UE an indication of a type of beam failure recovery procedure; transmitting to the UE an indication of a set of bandwidth parts the UE is to monitor as part of the beam failure recovery procedure, the set of bandwidth parts comprising a bandwidth part associated with an active beam between the UE and the base station; receiving a random access message from the UE over a bandwidth part in the set of bandwidth parts; and establishing a connection with the UE over the bandwidth part based at least in part on a random access procedure triggered by the random access message.

Aspect 26: The method of aspect 25, further comprising: determining the set of bandwidth parts based at least in part on location of the UE relative to coverage areas of beams associated with the set of bandwidth parts.

Aspect 27: The method of any of aspects 25 through 26, wherein each bandwidth part in the set of bandwidth parts is associated with multiple respective radio link monitoring reference signals, further comprising: transmitting the multiple radio link monitoring reference signals associated with each bandwidth part over that bandwidth part.

Aspect 28: The method of any of aspects 25 through 27, further comprising: determining a unique physical random access channel (PRACH) sequence for each of the multiple radio link monitoring reference signals associated with the bandwidth part, wherein the random access message comprises a PRACH sequence for one of the radio link monitoring reference signals associated with the bandwidth part; and determining a beam selected by the UE based at least in part on a PRACH sequence included in the random access message and the bandwidth part over which the random access is received.

Aspect 29: A method for wireless communication at a UE, comprising: detecting that radio link failure has occurred for a first connection between the UE and a base station; saving configuration information for the first connection based at least in part on detecting the radio link failure; communicating to the base station an indication that the configuration information for the first connection has been saved; and establishing a second connection with the base station based at least in part on the saved configuration information for the first connection and communicating the indication.

Aspect 30: The method of aspect 29, further comprising: performing a random access procedure with the base station, wherein the indication is communicated during the random access procedure.

Aspect 31: The method of aspect 30, further comprising: transmitting an identifier of the UE to the base station as part of the random access procedure, wherein the identifier comprises an identifier the UE used to establish the first connection.

Aspect 32: The method of any of aspects 30 through 31, further comprising: transmitting to the base station as part of the random access procedure a message requesting RRC information, wherein the indication is included in the message.

Aspect 33: The method of any of aspects 29 through 32, wherein the indication comprises a bit.

Aspect 34: The method of aspect 33, wherein the indication further comprises an identifier of the base station or an identifier of a cell associated with the base station.

Aspect 35: The method of any of aspects 33 through 34, wherein the configuration information comprises a radio bearer configuration, a radio bearer state variable, a medium access control (MAC) configuration, a MAC state variable, a master cell group secondary cell configuration, or a cell configuration, or a combination thereof.

Aspect 36: A method for wireless communication at a base station, comprising: receiving, from a UE during a random access procedure, an indication that the UE has saved configuration information for a previous connection between the UE and the base station; determining the configuration information for the previous connection based at least in part on the indication and an identifier of the UE; and establishing a second connection with the UE based at least in part on the configuration for the previous connection.

Aspect 37: The method of aspect 36, further comprising: receiving the identifier of the UE during the random access procedure, wherein the identifier comprises an identifier the UE used to establish the previous connection; and determining the configuration information for the UE based at least in part on the configuration information being associated with the identifier of the UE.

Aspect 38: The method of any of aspects 36 through 37, further comprising: receiving from the UE a message, wherein the indication is included in the message.

Aspect 39: The method of any of aspects 36 through 38, wherein the indication is a bit.

Aspect 40: The method of aspect 39, wherein the indication further comprises an identifier of the base station or an identifier of a cell associated with the base station, the method further comprising: determining the configuration information for the UE based at least in part on the configuration information being associated with the identifier of base station or the identifier of the cell associated with the base station.

Aspect 41: The method of any of aspects 36 through 40, wherein the configuration information comprises a radio bearer configuration, a radio bearer state variable, a medium access control (MAC) configuration, a MAC state variable, a master cell group secondary cell configuration, or a cell configuration, or a combination thereof.

Aspect 42: A method for wireless communication at a UE, comprising: determining that a radio link monitoring reference signal for a set of bandwidth parts comprises multiple signals; monitoring the set of bandwidth parts for the radio link monitoring reference signal; measuring a quality of each signal of the multiple signals of the radio link monitoring reference signal; and determining a radio link failure status for a base station based at least in part on the qualities of the multiple signals of the radio link monitoring reference signal.

Aspect 43: The method of aspect 42, further comprising: managing a radio link failure timer for the set of bandwidth parts, wherein the radio link failure status for the base station is determined based at least in part on a status of the radio link failure timer.

Aspect 44: The method of aspect 43, wherein managing the radio link failure timer comprises: starting the radio link failure timer when a threshold quantity of the multiple signals have a quality lower than a threshold quality.

Aspect 45: The method of any of aspects 43 through 44, wherein managing the radio link failure timer comprises: stopping and resetting the radio link failure timer when a threshold quantity of the multiple signals have a quality higher than a threshold quality.

Aspect 46: The method of any of aspects 42 through 45, further comprising: receiving from the base station an indication of the set of bandwidth parts, wherein the set of bandwidth parts is determined based at least in part on the indication.

Aspect 47: The method of any of aspects 42 through 46, further comprising: determining the set of bandwidth parts based at least in part on a location of the UE relative to coverage areas of beams associated with the set of bandwidth parts.

Aspect 48: A method for wireless communication at a base station, comprising: determining a set of bandwidth parts for a UE to monitor for radio link management; transmitting an indication of the set of bandwidth parts to the UE; and transmitting a radio link monitoring reference signal for the set of bandwidth parts, the radio link monitoring reference signal comprising multiple signals.

Aspect 49: The method of aspect 48, further comprising: multiplexing the multiple signals in the time domain or the frequency domain before transmitting the radio link monitoring reference signal.

Aspect 50: The method of any of aspects 48 through 49, wherein the multiple signals comprise one or more synchronization signal block (SSB) signals, one or more CSI reference signals (CSI-RS), or a combination thereof.

Aspect 51: The method of any of aspects 48 through 50, wherein each bandwidth part in the set of bandwidth parts is associated with a respective beam having a respective coverage area, the method further comprising: determining that the UE is within a threshold proximity of the coverage areas associated with the set of bandwidth parts, wherein the set of bandwidth parts is determined based at least in part on determining that the UE is within the threshold proximity.

Aspect 52: The method of aspect 51, further comprising: determining a speed of the UE, a trajectory of the UE, or a combination thereof, wherein the set of bandwidth parts is determined based at least in part on the speed of the UE, the trajectory of the UE, or the combination thereof.

Aspect 53: An apparatus for wireless communication at a UE, comprising a processor; memory coupled with the processor; and instructions stored in the memory and executable by the processor to cause the apparatus to perform a method of any of aspects 77 through 84.

Aspect 54: An apparatus for wireless communication at a UE, comprising at least one means for performing a method of any of aspects 77 through 84.

Aspect 55: A non-transitory computer-readable medium storing code for wireless communication at a UE, the code comprising instructions executable by a processor to perform a method of any of aspects 77 through 84.

Aspect 56: An apparatus for wireless communication at a base station, comprising a processor; memory coupled with the processor; and instructions stored in the memory and executable by the processor to cause the apparatus to perform a method of any of aspects 85 through 90.

Aspect 57: An apparatus for wireless communication at a base station, comprising at least one means for performing a method of any of aspects 85 through 90.

Aspect 58: A non-transitory computer-readable medium storing code for wireless communication at a base station, the code comprising instructions executable by a processor to perform a method of any of aspects 85 through 90.

Aspect 59: An apparatus for wireless communication at a UE, comprising a processor; memory coupled with the processor; and instructions stored in the memory and executable by the processor to cause the apparatus to perform a method of any of aspects 91 through 100.

Aspect 60: An apparatus for wireless communication at a UE, comprising at least one means for performing a method of any of aspects 91 through 100.

Aspect 61: A non-transitory computer-readable medium storing code for wireless communication at a UE, the code comprising instructions executable by a processor to perform a method of any of aspects 91 through 100.

Aspect 62: An apparatus for wireless communication at a base station, comprising a processor; memory coupled with the processor; and instructions stored in the memory and executable by the processor to cause the apparatus to perform a method of any of aspects 25 through 28.

Aspect 63: An apparatus for wireless communication at a base station, comprising at least one means for performing a method of any of aspects 25 through 28.

Aspect 64: A non-transitory computer-readable medium storing code for wireless communication at a base station, the code comprising instructions executable by a processor to perform a method of any of aspects 25 through 28.

Aspect 65: An apparatus for wireless communication at a UE, comprising a processor; memory coupled with the processor; and instructions stored in the memory and executable by the processor to cause the apparatus to perform a method of any of aspects 29 through 35.

Aspect 66: An apparatus for wireless communication at a UE, comprising at least one means for performing a method of any of aspects 29 through 35.

Aspect 67: A non-transitory computer-readable medium storing code for wireless communication at a UE, the code comprising instructions executable by a processor to perform a method of any of aspects 29 through 35.

Aspect 68: An apparatus for wireless communication at a base station, comprising a processor; memory coupled with the processor; and instructions stored in the memory and executable by the processor to cause the apparatus to perform a method of any of aspects 36 through 41.

Aspect 69: An apparatus for wireless communication at a base station, comprising at least one means for performing a method of any of aspects 36 through 41.

Aspect 70: A non-transitory computer-readable medium storing code for wireless communication at a base station, the code comprising instructions executable by a processor to perform a method of any of aspects 36 through 41.

Aspect 71: An apparatus for wireless communication at a UE, comprising a processor; memory coupled with the processor; and instructions stored in the memory and executable by the processor to cause the apparatus to perform a method of any of aspects 42 through 47.

Aspect 72: An apparatus for wireless communication at a UE, comprising at least one means for performing a method of any of aspects 42 through 47.

Aspect 73: A non-transitory computer-readable medium storing code for wireless communication at a UE, the code comprising instructions executable by a processor to perform a method of any of aspects 42 through 47.

Aspect 74: An apparatus for wireless communication at a base station, comprising a processor; memory coupled with the processor; and instructions stored in the memory and executable by the processor to cause the apparatus to perform a method of any of aspects 48 through 52.

Aspect 75: An apparatus for wireless communication at a base station, comprising at least one means for performing a method of any of aspects 48 through 52.

Aspect 76: A non-transitory computer-readable medium storing code for wireless communication at a base station, the code comprising instructions executable by a processor to perform a method of any of aspects 48 through 52.

Aspect 77: A method for wireless communication at a UE, comprising: receiving from a base station an indication of a type of radio link failure detection procedure; monitoring a set of bandwidth parts based at least in part on the indicated type of radio link failure detection procedure, the set of bandwidth parts comprising a bandwidth part associated with an active beam between the UE and the base station; and determining a radio link failure status based at least in part on monitoring the set of bandwidth parts.

Aspect 78: The method of aspect 77, wherein the set of bandwidth parts comprises bandwidth parts each associated with at least one radio link monitoring reference signal of a threshold quality, the method further comprising: attempting a beam failure recovery procedure over one or more bandwidth parts in the set of bandwidth parts based at least in part on detecting that the active beam has failed, wherein the radio link failure status is determined based at least in part on a status of the beam failure recovery procedure.

Aspect 79: The method of aspect 78, further comprising: determining a pool of bandwidth parts, wherein each bandwidth part in the pool of bandwidth parts is associated with multiple respective radio link monitoring reference signals; measuring the radio link monitoring reference signals associated with the pool of bandwidth parts; and determining the set of bandwidth parts based at least in part on the measuring, wherein the set of bandwidth parts is a subset of the pool of bandwidth parts.

Aspect 80: The method of aspect 79, further comprising: receiving from the base station an indication of the pool of bandwidth parts, wherein the pool of bandwidth parts is determined based at least in part on the indication.

Aspect 81: The method of any of aspects 79 through 80, further comprising: determining the pool of bandwidth parts based at least in part on a location of the UE relative to coverage areas of beams associated with the pool of bandwidth parts.

Aspect 82: The method of any of aspects 78 through 81, further comprising: starting a radio link failure timer based at least in part on attempting the beam failure recovery procedure; and stopping the radio link failure timer based at least in part on the beam failure recovery procedure being successful.

Aspect 83: The method of any of aspects 78 through 82, further comprising: starting a radio link failure timer based at least in part on attempting the beam failure recovery procedure; and determining that the beam failure recovery procedure has failed, wherein radio link failure is determined based at least in part on the radio link failure timer expiring due to the failure of the beam failure recovery procedure.

Aspect 84: The method of any of aspects 78 through 83, wherein attempting the beam failure recovery procedure comprises: attempting a random access procedure with the base station over the one or more bandwidth parts in the set of bandwidth parts, wherein the UE increases a transmit power used for sequential attempted random access procedures over a bandwidth part until a maximum transmit power is reached, a random access procedure is completed, or a beam failure recovery timer expires.

Aspect 85: The method of aspect 84, wherein attempting the beam failure recovery procedure comprises: determining that a random access procedure attempted with the maximum transmit power over the bandwidth part has failed; and attempting to complete a random access procedure with the base station over a second bandwidth part of the set of bandwidth parts, wherein the UE increases a transmit power used for sequential attempted random access procedures over the second bandwidth part until the maximum transmit power is reached, a random access procedure is completed, or the beam failure recovery timer expires.

Aspect 86: The method of aspect 77, further comprising: determining, based at least in part on the monitoring, a failure status for each bandwidth part in the set of bandwidth parts, wherein the radio link failure status is determined based at least in part on the failure statuses for the set of bandwidth parts.

Aspect 87: The method of aspect 86, wherein determining the failure status for each bandwidth part comprises: determining that each bandwidth part has failed, and wherein determining the radio link failure status comprises: determining that radio link failure has occurred.

Aspect 88: The method of any of aspects 86 through 87, further comprising: managing a respective failure timer for each bandwidth part in the set of bandwidth parts based at least in part on indications for that bandwidth part communicated from a physical layer of the UE to an RRC layer of the UE, wherein the failure status for a bandwidth part is determined based at least in part on a status of the failure timer for that bandwidth part.

Aspect 89: The method of aspect 88, wherein each bandwidth part in the set of bandwidth parts is associated with multiple respective radio link monitoring reference signals, and wherein managing a failure timer for a bandwidth part comprises: starting the failure timer based at least in part on the RRC layer receiving a threshold quantity of out-of-sync indications for the bandwidth part, wherein an out-of-sync indication is transmitted by the physical layer when all of the radio link monitoring reference signals associated with the bandwidth part have a quality lower than a threshold quality.

Aspect 90: The method of any of aspects 88 through 89, wherein each bandwidth part in the set of bandwidth parts is associated with multiple respective radio link monitoring reference signals, and wherein managing a failure timer for a bandwidth part comprises: stopping and resetting the failure timer based at least in part on the RRC layer receiving a threshold quantity of in-sync indications for the bandwidth part, wherein an in-sync indication is transmitted by the physical layer when at least one radio link monitoring reference signal associated with the bandwidth part has a quality higher than a threshold quality.

Aspect 91: The method of aspect 90, wherein the bandwidth part is associated with a beam other than the active beam, the method further comprising: completing a random access procedure with the base station over the bandwidth part, wherein the in-sync indication for the bandwidth part is transmitted by the physical layer based at least in part on completing the random access procedure over the bandwidth part.

Aspect 92: The method of any of aspects 86 through 91, further comprising: receiving from the base station an indication of the set of bandwidth parts, wherein the set of bandwidth parts is determined based at least in part on the indication.

Aspect 93: The method of any of aspects 86 through 92, further comprising: determining the set of bandwidth parts based at least in part on a location of the UE relative to coverage areas of beams associated with the set of bandwidth parts.

Aspect 94: The method of aspect 77, further comprising: managing, based at least in part on the monitoring, a common radio link failure timer for the set of bandwidth parts, wherein the radio link failure status is determined based at least in part on a status of the radio link failure timer for the set of bandwidth parts.

Aspect 95: The method of aspect 94, wherein each bandwidth part in the set of bandwidth parts is associated with multiple respective radio link monitoring reference signals, the method further comprising: determining a quality of each radio link monitoring reference signal associated with the set of bandwidth parts, wherein the radio link failure timer is managed based at least in part on the qualities of the radio link monitoring reference signals associated with the set of bandwidth parts.

Aspect 96: The method of any of aspects 94 through 95, wherein each bandwidth part in the set of bandwidth parts is associated with multiple respective radio link monitoring reference signals, and wherein managing the radio link failure timer comprises: starting the radio link failure timer based at least in part on an RRC layer of the UE receiving a threshold quantity of out-of-sync indications for the set of bandwidth parts, wherein an out-of-sync indication is transmitted by a physical layer of the UE when all of the radio link monitoring reference signals associated with the set of bandwidth parts have a quality lower than a threshold quality.

Aspect 97: The method of any of aspects 94 through 96, wherein each bandwidth part in the set of bandwidth parts is associated with multiple respective radio link monitoring reference signals, and wherein managing the radio link failure timer comprises: stopping and resetting the radio link failure timer based at least in part on an RRC layer of the UE receiving a threshold quantity of in-sync indications for the set of bandwidth parts, wherein an in-sync indication is transmitted by a physical layer of the UE when at least one radio link monitoring reference signal associated with the set of bandwidth parts has a quality higher than a threshold quality.

Aspect 98: The method of aspect 97, wherein the at least one radio link monitoring reference signal is for a bandwidth part associated with a beam other than the active beam, the method further comprising: completing a random access procedure with the base station over the bandwidth part, wherein the in-sync indication for the set of bandwidth parts is transmitted by the physical layer based at least in part on completing the random access procedure over the bandwidth part.

Aspect 99: The method of any of aspects 94 through 98, further comprising: receiving from the base station an indication of the set of bandwidth parts, wherein the set of bandwidth parts is determined based at least in part on the indication.

Aspect 100: The method of any of aspects 94 through 99, further comprising: determining the set of bandwidth parts based at least in part on location of the UE relative to coverage areas of beams associated with the set of bandwidth parts.

Aspect 101: An apparatus for wireless communication at a UE, comprising a processor; memory coupled with the processor; and instructions stored in the memory and executable by the processor to cause the apparatus to perform a method of any of aspects 77 through 100.

Aspect 102: An apparatus for wireless communication at a UE, comprising at least one means for performing a method of any of aspects 77 through 100.

Aspect 103: A non-transitory computer-readable medium storing code for wireless communication at a UE, the code comprising instructions executable by a processor to perform a method of any of aspects 77 through 100.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving an indication of a type of a beam failure recovery procedure, the type of the beam failure recovery procedure corresponding to whether the UE monitors active bandwidth parts and other bandwidth parts for a plurality of reference signals;
    determining a set of bandwidth parts to monitor based at least in part on the type of the beam failure recovery procedure, the set of bandwidth parts comprising a first bandwidth part associated with a failed beam between the UE and a network device;
    determining, based at least in part on monitoring the set of bandwidth parts, a subset of bandwidth parts from the set of bandwidth parts for the beam failure recovery procedure, the subset of bandwidth parts determined based at least in part on each bandwidth part in the subset of bandwidth parts being associated with at least one reference signal having a quality greater than or equal to a threshold quality; and
    attempting, as part of the beam failure recovery procedure, a random access procedure over a second bandwidth part of the subset of bandwidth parts.

2. The method of claim 1, wherein each bandwidth part in the set of bandwidth parts is associated with multiple respective radio link monitoring reference signals, the method further comprising:
    determining respective qualities of each radio link monitoring reference signal associated with the set of bandwidth parts; and
    comparing the respective qualities of each radio link monitoring reference signal with the threshold quality.

3. The method of claim 1, wherein each bandwidth part in the set of bandwidth parts is associated with multiple respective radio link monitoring reference signals, the method further comprising:
    determining, for each bandwidth part in the set of bandwidth parts, a unique physical random access channel (PRACH) sequence for each radio link monitoring reference signal associated with that bandwidth part; and wherein attempting the random access procedure comprises:
    transmitting a message comprising a PRACH sequence for a radio link monitoring reference signal of the second bandwidth part that satisfies the threshold quality.

4. The method of claim 1, wherein the random access procedure is attempted using a first transmit power, the method further comprising:
    determining that the random access procedure has failed; and
    attempting, as part of the beam failure recovery procedure and based at least in part on determining that the random access procedure has failed, a second random access procedure over the second bandwidth part using a second transmit power higher than the first transmit power.

5. The method of claim 1, further comprising:
    determining that the random access procedure has failed; and
    attempting, as part of the beam failure recovery procedure and based at least in part on determining that the random access procedure has failed, a second random access procedure over a third bandwidth part of the subset of bandwidth parts.

6. The method of claim 1, further comprising:
    starting a beam failure recovery timer based at least in part on attempting the beam failure recovery procedure;
    determining that the beam failure recovery timer has expired; and
    determining that the beam failure recovery procedure has failed based at least in part on expiry of the beam failure recovery timer.

7. The method of claim 1, further comprising:
    starting a beam failure recovery timer based at least in part on attempting the beam failure recovery procedure;
    determining that the random access procedure has been successfully completed; and
    stopping and resetting the beam failure recovery timer based at least in part on determining that the random access procedure has been successfully completed.

8. The method of claim 1, further comprising:
    receiving an indication of the set of bandwidth parts, wherein the set of bandwidth parts is determined based at least in part on the indication.

9. The method of claim 1, further comprising:
determining the set of bandwidth parts based at least in part on location of the UE relative to coverage areas of beams associated with the set of bandwidth parts.

10. A method for wireless communication at a network device, comprising:
transmitting an indication of a type of a beam failure recovery procedure, the type of the beam failure recovery procedure corresponding to whether a user equipment (UE) monitors active bandwidth parts and other bandwidth parts for a plurality of reference signals;
transmitting to the UE an indication of a set of bandwidth parts the UE is to monitor as part of the beam failure recovery procedure, the set of bandwidth parts selected based at least in part on a location of the UE relative to coverage areas of beams associated with the set of bandwidth parts and comprising a bandwidth part associated with an active beam between the UE and the network device;
receiving a random access message from the UE over the bandwidth part in the set of bandwidth parts; and
establishing a connection with the UE over the bandwidth part based at least in part on a random access procedure triggered by the random access message.

11. The method of claim 10, wherein each bandwidth part in the set of bandwidth parts is associated with multiple respective radio link monitoring reference signals, further comprising:
transmitting the multiple respective radio link monitoring reference signals associated with each bandwidth part over that bandwidth part.

12. The method of claim 11, further comprising:
determining a unique physical random access channel (PRACH) sequence for each of the multiple respective radio link monitoring reference signals associated with the bandwidth part, wherein the random access message comprises a PRACH sequence for one of the multiple respective radio link monitoring reference signals associated with the bandwidth part; and
determining a beam selected by the UE based at least in part on the PRACH sequence included in the random access message and the bandwidth part over which the random access message is received.

13. An apparatus for wireless communication at a user equipment (UE), comprising:
one or more processors;
one or more memories in electronic communication with the one or more processors; and
instructions stored in the one or more memories and executable by the one or more processors to cause the apparatus to:
receive an indication of a type of a beam failure recovery procedure, the type of the beam failure recovery procedure corresponding to whether the UE monitors active bandwidth parts and other bandwidth parts for a plurality of reference signals;
determine a set of bandwidth parts to monitor based at least in part on the type of the beam failure recovery procedure, the set of bandwidth parts comprising a first bandwidth part associated with a failed beam between the UE and a network device;
determine, based at least in part on monitoring the set of bandwidth parts, a subset of bandwidth parts from the set of bandwidth parts for the beam failure recovery procedure, the subset of bandwidth parts determined based at least in part on each bandwidth part in the subset of bandwidth parts being associated with at least one reference signal having a quality greater than or equal to a threshold quality; and
attempt, as part of the beam failure recovery procedure, a random access procedure over a second bandwidth part of the subset of bandwidth parts.

14. A method for wireless communication at a user equipment (UE), comprising:
receiving an indication of a type of radio link failure detection procedure, the type of the radio link failure detection procedure corresponding to whether the UE monitors active bandwidth parts and other bandwidth parts for a plurality of reference signals;
monitoring a set of bandwidth parts based at least in part on the indicated type of radio link failure detection procedure, the set of bandwidth parts comprising a bandwidth part associated with an active beam between the UE and a network device;
generating internal indications for managing one or more radio link failure timers associated with the set of bandwidth parts based at least in part on the type of radio link failure detection procedure and monitoring the set of bandwidth parts; and
determining a radio link failure status based at least in part on the one or more radio link failure timers.

15. The method of claim 14, further comprising:
determining, based at least in part on the monitoring, a respective failure status for each bandwidth part in the set of bandwidth parts, wherein the radio link failure status is determined based at least in part on the respective failure status for each bandwidth part in the set of bandwidth parts.

16. The method of claim 15, wherein determining the respective failure status for each bandwidth part comprises:
determining that each bandwidth part has failed, and wherein determining the radio link failure status comprises:
determining that radio link failure has occurred.

17. The method of claim 15, further comprising:
managing a respective radio link failure timer for each bandwidth part in the set of bandwidth parts based at least in part on respective internal indications for that bandwidth part, wherein the internal indications are communicated from a physical layer of the UE to a radio resource control (RRC) layer of the UE, and wherein the respective failure status for each bandwidth part is determined based at least in part on a status of the respective radio link failure timer for that bandwidth part.

18. The method of claim 17, wherein each bandwidth part in the set of bandwidth parts is associated with multiple respective radio link monitoring reference signals, and wherein managing a radio link failure timer for a respective bandwidth part in the set of bandwidth parts comprises:
starting the radio link failure timer based at least in part on the RRC layer receiving a threshold quantity of out-of-sync indications for the respective bandwidth part, wherein an out-of-sync indication is transmitted by the physical layer when all of the multiple respective radio link monitoring reference signals associated with the respective bandwidth part have a quality lower than a threshold quality.

19. The method of claim 17, wherein each bandwidth part in the set of bandwidth parts is associated with multiple respective radio link monitoring reference signals, and wherein managing a radio link failure timer for a respective bandwidth part in the set of bandwidth parts comprises:

stopping and resetting the radio link failure timer based at least in part on the RRC layer receiving a threshold quantity of in-sync indications for the bandwidth part, wherein an in-sync indication is transmitted by the physical layer when at least one radio link monitoring reference signal associated with the respective bandwidth part has a quality higher than a threshold quality.

20. The method of claim 19, wherein the bandwidth part is associated with a beam other than the active beam, the method further comprising:

completing a random access procedure with the network device over the bandwidth part, wherein the in-sync indication for the bandwidth part is transmitted by the physical layer based at least in part on completing the random access procedure over the bandwidth part.

21. The method of claim 15, further comprising:

receiving an indication of the set of bandwidth parts, wherein the set of bandwidth parts is determined based at least in part on the indication.

22. The method of claim 15, further comprising:

determining the set of bandwidth parts based at least in part on a location of the UE relative to coverage areas of beams associated with the set of bandwidth parts.

23. The method of claim 14, further comprising:

managing, based at least in part on the monitoring, a common radio link failure timer for the set of bandwidth parts, wherein the radio link failure status is determined based at least in part on a status of the common radio link failure timer for the set of bandwidth parts.

24. The method of claim 23, wherein each bandwidth part in the set of bandwidth parts is associated with multiple respective radio link monitoring reference signals, the method further comprising:

determining a quality of each radio link monitoring reference signal associated with the set of bandwidth parts, wherein the common radio link failure timer is managed based at least in part on the quality of each radio link monitoring reference signal associated with the set of bandwidth parts.

25. The method of claim 23, wherein each bandwidth part in the set of bandwidth parts is associated with multiple respective radio link monitoring reference signals, and wherein managing the common radio link failure timer comprises:

starting the common radio link failure timer based at least in part on a radio resource control (RRC) layer of the UE receiving a threshold quantity of out-of-sync indications for the set of bandwidth parts, wherein an out-of-sync indication is transmitted by a physical layer of the UE when all of the multiple respective radio link monitoring reference signals associated with each bandwidth part in the set of bandwidth parts have a quality lower than a threshold quality.

26. The method of claim 23, wherein each bandwidth part in the set of bandwidth parts is associated with multiple respective radio link monitoring reference signals, and wherein managing the common radio link failure timer comprises:

stopping and resetting the common radio link failure timer based at least in part on a radio resource control (RRC) layer of the UE receiving a threshold quantity of in-sync indications for the set of bandwidth parts, wherein an in-sync indication is transmitted by a physical layer of the UE when at least one radio link monitoring reference signal associated with the set of bandwidth parts has a quality higher than a threshold quality.

27. The method of claim 26, wherein the at least one radio link monitoring reference signal is for a second bandwidth part associated with a beam other than the active beam, the method further comprising:

completing a random access procedure with the network device over the bandwidth part, wherein the in-sync indication for the set of bandwidth parts is transmitted by the physical layer based at least in part on completing the random access procedure over the bandwidth part.

28. The method of claim 23, further comprising:

receiving an indication of the set of bandwidth parts, wherein the set of bandwidth parts is determined based at least in part on the indication.

29. The method of claim 23, further comprising:

determining the set of bandwidth parts based at least in part on location of the UE relative to coverage areas of beams associated with the set of bandwidth parts.

\* \* \* \* \*